(12) United States Patent
Mandella et al.

(10) Patent No.: US 11,577,159 B2
(45) Date of Patent: Feb. 14, 2023

(54) REALISTIC VIRTUAL/AUGMENTED/MIXED REALITY VIEWING AND INTERACTIONS

(71) Applicant: Electronic Scripting Products, Inc., Palo Alto, CA (US)

(72) Inventors: Michael J. Mandella, San Jose, CA (US); Hector H. Gonzalez-Banos, Mountain View, CA (US); Marek Alboszta, Montara, CA (US)

(73) Assignee: ELECTRONIC SCRIPTING PRODUCTS INC., Palo Alto, CA (US)

( * ) Notice: Subject to any disclaimer, the term of this patent is extended or adjusted under 35 U.S.C. 154(b) by 248 days.

(21) Appl. No.: 17/120,036

(22) Filed: Dec. 11, 2020

(65) Prior Publication Data

US 2021/0283496 A1 Sep. 16, 2021

Related U.S. Application Data

(63) Continuation-in-part of application No. 15/165,955, filed on May 26, 2016, now abandoned.

(51) Int. Cl.
*A63F 13/245* (2014.01)
*A63F 13/211* (2014.01)
(Continued)

(52) U.S. Cl.
CPC .......... *A63F 13/245* (2014.09); *A63F 13/211* (2014.09); *G06F 3/011* (2013.01); *G06F 3/0304* (2013.01)

(58) Field of Classification Search
CPC . G06F 3/012; G06F 3/011–017; G06F 3/0304
See application file for complete search history.

(56) References Cited

U.S. PATENT DOCUMENTS 3,028,500 A 4/1962 Wallmark
3,209,201 A 9/1965 Anger
(Continued)

FOREIGN PATENT DOCUMENTS

EP 0649549 B1 2/1997
EP 1128319 A1 1/2001
(Continued)

OTHER PUBLICATIONS

Foxlin, Eric et al., "VIS-Tracker: A Wearable Vision-Inertial Self Tracker", IEEE VR 2003, Mar. 22-26, 2003, Los Angeles, CA, U.S.
(Continued)

*Primary Examiner* — Patrick F Marinelli
(74) *Attorney, Agent, or Firm* — Marek Alboszta

(57) ABSTRACT

The present invention discloses systems and methods for both viewing and interacting with a virtual reality (VR), an augmented reality (AR) or a mixed reality (MR). More specifically, the systems and methods allow the user to interact with aspects of such realities including virtual items presented in such realities or within such environments by manipulating a control device that has an inside-out camera mounted on-board. The apparatus or system uses two distinct representations including a reduced representation in determining the pose of the control device and uses these representations to compute an interactive pose portion of the control device to be used for interacting with the virtual item. The reduced representation is consonant with a constrained motion of the control device.

9 Claims, 32 Drawing Sheets

(51) Int. Cl.
*G06F 3/01* (2006.01)
*G06F 3/03* (2006.01)

(56) References Cited

U.S. PATENT DOCUMENTS

| | | | |
|---|---|---|---|
| 3,370,460 | A | 2/1968 | Haake et al. |
| 3,678,283 | A | 7/1972 | LaBaw |
| 3,918,814 | A | 11/1975 | Weiser |
| 4,070,649 | A | 1/1978 | Wright, Jr. et al. |
| 4,471,162 | A | 9/1984 | Aono et al. |
| 4,495,646 | A | 1/1985 | Gharachorloo |
| 4,649,504 | A | 3/1987 | Krouglicof et al. |
| 4,749,849 | A | 6/1988 | Hoeberechts et al. |
| 4,777,329 | A | 10/1988 | Mallicoat |
| 4,877,951 | A | 10/1989 | Muro |
| 4,885,433 | A | 12/1989 | Schier |
| 5,005,979 | A | 4/1991 | Sontag et al. |
| 5,059,789 | A | 10/1991 | Salcudean |
| 5,103,486 | A | 4/1992 | Grippi |
| 5,166,668 | A | 11/1992 | Aoyagi |
| 5,215,397 | A | 6/1993 | Taguchi et al. |
| 5,226,091 | A | 7/1993 | Howell |
| 5,237,647 | A | 8/1993 | Roberts et al. |
| 5,294,792 | A | 3/1994 | Lewis et al. |
| 5,321,416 | A | 6/1994 | Basset et al. |
| 5,322,441 | A | 6/1994 | Lewis et al. |
| 5,333,209 | A | 7/1994 | Sinden et al. |
| 5,388,059 | A | 2/1995 | DeMenthon |
| 5,398,691 | A | 3/1995 | Martin et al. |
| 5,434,371 | A | 7/1995 | Brooks |
| 5,477,012 | A | 12/1995 | Sekendur |
| 5,484,966 | A | 1/1996 | Segen |
| 5,517,579 | A | 5/1996 | Baron et al. |
| 5,533,141 | A | 7/1996 | Futatsugi et al. |
| 5,544,255 | A | 8/1996 | Smithies et al. |
| 5,548,092 | A | 8/1996 | Shriver |
| 5,577,135 | A | 11/1996 | Grajski et al. |
| 5,581,276 | A | 12/1996 | Cipolla et al. |
| 5,587,558 | A | 12/1996 | Matsushima |
| 5,588,139 | A | 12/1996 | Lanier et al. |
| 5,592,401 | A | 1/1997 | Kramer |
| 5,615,132 | A | 3/1997 | Horton et al. |
| 5,640,589 | A | 6/1997 | Takayama et al. |
| 5,645,077 | A | 7/1997 | Foxlin |
| 5,647,017 | A | 7/1997 | Smithies et al. |
| 5,652,412 | A | 7/1997 | Lazzouni et al. |
| 5,661,506 | A | 8/1997 | Lazzouni et al. |
| 5,694,153 | A | 12/1997 | Aoyagi et al. |
| 5,717,168 | A | 2/1998 | DeBuisser et al. |
| 5,737,740 | A | 4/1998 | Henderson et al. |
| 5,742,263 | A | 4/1998 | Wang et al. |
| 5,742,264 | A | 4/1998 | Inagaki et al. |
| 5,748,808 | A | 5/1998 | Taguchi et al. |
| 5,750,939 | A | 5/1998 | Makinwa et al. |
| 5,768,417 | A | 6/1998 | Errico et al. |
| 5,774,602 | A | 6/1998 | Taguchi et al. |
| 5,781,661 | A | 7/1998 | Hiraiwa et al. |
| 5,812,269 | A | 9/1998 | Svetkoff et al. |
| 5,818,955 | A | 10/1998 | Smithies et al. |
| 5,850,058 | A | 12/1998 | Tano et al. |
| 5,852,434 | A | 12/1998 | Sekendur |
| 5,856,844 | A | 1/1999 | Batterman et al. |
| 5,869,834 | A | 2/1999 | Wipenmnyr |
| 5,870,492 | A | 2/1999 | Shimizu et al. |
| 5,884,239 | A | 3/1999 | Romanik |
| 5,889,505 | A | 3/1999 | Toyama et al. |
| 5,902,968 | A | 5/1999 | Sato et al. |
| 5,923,318 | A | 7/1999 | Zhai et al. |
| 5,930,380 | A | 7/1999 | Kashi et al. |
| 5,939,702 | A | 8/1999 | Knighton et al. |
| 5,945,981 | A | 8/1999 | Paull et al. |
| 5,959,617 | A | 9/1999 | Bird et al. |
| 5,960,124 | A | 9/1999 | Taguchi et al. |
| 5,977,958 | A | 11/1999 | Baron et al. |
| 5,981,884 | A | 11/1999 | Sato et al. |
| 6,009,210 | A | 12/1999 | Kang |
| 6,023,275 | A | 2/2000 | Horvitz et al. |
| 6,028,955 | A | 2/2000 | Cohen et al. |
| 6,031,936 | A | 2/2000 | Nakamura |
| 6,044,165 | A | 3/2000 | Perona et al. |
| 6,050,490 | A | 4/2000 | Leichner et al. |
| 6,064,751 | A | 5/2000 | Smithies et al. |
| 6,081,261 | A | 6/2000 | Wolff et al. |
| 6,084,985 | A | 7/2000 | Dolfing et al. |
| 6,091,835 | A | 7/2000 | Smithies et al. |
| 6,100,877 | A | 8/2000 | Chery et al. |
| 6,104,387 | A | 8/2000 | Chery et al. |
| 6,104,388 | A | 8/2000 | Nagai et al. |
| 6,108,444 | A | 8/2000 | Syeda-Mahmood |
| 6,111,565 | A | 8/2000 | Chery et al. |
| 6,124,847 | A | 9/2000 | Chery et al. |
| 6,130,666 | A | 10/2000 | Persidsky |
| 6,147,681 | A | 11/2000 | Chery et al. |
| 6,148,528 | A | 11/2000 | Jackson |
| 6,153,836 | A | 11/2000 | Goszyk |
| 6,167,376 | A | 12/2000 | Ditzik |
| 6,176,837 | B1 | 1/2001 | Foxlin |
| 6,177,927 | B1 | 1/2001 | Chery et al. |
| 6,181,329 | B1 | 1/2001 | Stork et al. |
| 6,184,873 | B1 | 2/2001 | Ward et al. |
| 6,188,392 | B1 | 2/2001 | OConnor et al. |
| 6,195,475 | B1 | 2/2001 | Beausoleil et al. |
| 6,208,330 | B1 | 3/2001 | Hasegawa et al. |
| 6,212,296 | B1 | 4/2001 | Stork et al. |
| 6,213,398 | B1 | 4/2001 | Southworth et al. |
| 6,243,503 | B1 | 6/2001 | Teufel et al. |
| 6,249,274 | B1 | 6/2001 | Svancarek et al. |
| 6,262,719 | B1 | 7/2001 | Bi et al. |
| 6,292,177 | B1 | 9/2001 | Holtzman et al. |
| 6,303,921 | B1 | 10/2001 | Hastings et al. |
| 6,324,296 | B1 | 11/2001 | McSheery et al. |
| 6,330,359 | B1 | 12/2001 | Kawabata |
| 6,334,003 | B1 | 12/2001 | Yokota |
| 6,335,723 | B1 | 1/2002 | Wood et al. |
| 6,335,724 | B1 | 1/2002 | Takekawa et al. |
| 6,335,727 | B1 | 1/2002 | Morishita et al. |
| 6,342,917 | B1 | 1/2002 | Amenta |
| 6,348,914 | B1 | 2/2002 | Tuli |
| 6,366,697 | B1 | 4/2002 | Goldberg et al. |
| 6,373,047 | B1 | 4/2002 | Adan et al. |
| 6,375,572 | B1 | 4/2002 | Masuyama et al. |
| 6,396,481 | B1 | 5/2002 | Challa et al. |
| 6,411,915 | B1 | 6/2002 | Nguyen et al. |
| 6,414,673 | B1 | 7/2002 | Wood et al. |
| 6,415,256 | B1 | 7/2002 | Ditzik |
| 6,417,836 | B1 | 7/2002 | Kumar et al. |
| 6,421,042 | B1 | 7/2002 | Omura et al. |
| 6,422,775 | B1 | 7/2002 | Bramlett et al. |
| 6,424,340 | B1 | 7/2002 | Holtzman et al. |
| 6,429,856 | B1 | 8/2002 | Omura et al. |
| 6,437,314 | B1 | 8/2002 | Usuda et al. |
| 6,454,482 | B1 | 9/2002 | Silverbrook et al. |
| 6,456,749 | B1 | 9/2002 | Kasabach et al. |
| 6,474,159 | B1 | 11/2002 | Foxlin et al. |
| 6,474,888 | B1 | 11/2002 | Lapstun et al. |
| 6,492,981 | B1 | 12/2002 | Stork et al. |
| 6,493,736 | B1 | 12/2002 | Forcier |
| 6,502,114 | B1 | 12/2002 | Forcier |
| 6,556,190 | B2 | 4/2003 | Fleck et al. |
| 6,565,611 | B1 | 5/2003 | Wilcox et al. |
| 6,573,887 | B1 | 6/2003 | Odonnell, Jr. |
| 6,577,299 | B1 | 6/2003 | Schiller et al. |
| 6,587,809 | B2 | 7/2003 | Majoe |
| 6,592,039 | B1 | 7/2003 | Smith et al. |
| 6,621,921 | B1 | 9/2003 | Matsugu et al. |
| 6,625,296 | B2 | 9/2003 | Price et al. |
| 6,625,299 | B1 | 9/2003 | Meisner et al. |
| 6,627,870 | B1 | 9/2003 | Lapstun et al. |
| 6,628,847 | B1 | 9/2003 | Kasabach et al. |
| 6,641,482 | B2 | 11/2003 | Masuyama et al. |
| 6,650,320 | B1 | 11/2003 | Zimmerman |
| 6,661,920 | B1 | 12/2003 | Skinner |
| 6,681,629 | B2 | 1/2004 | Foxlin et al. |
| 6,686,579 | B2 | 2/2004 | Fagin et al. |

(56) References Cited

U.S. PATENT DOCUMENTS

| | | |
|---|---|---|
| 6,686,910 B2 | 2/2004 | ODonnell, Jr. |
| 6,687,876 B1 | 2/2004 | Schilit et al. |
| 6,689,966 B2 | 2/2004 | Wiebe |
| 6,720,949 B1 | 4/2004 | Pryor et al. |
| 6,724,930 B1 | 4/2004 | Kosaka et al. |
| 6,727,885 B1 | 4/2004 | Ishino et al. |
| 6,747,690 B2 | 6/2004 | Molgaard |
| 6,748,112 B1 | 6/2004 | Nguyen et al. |
| 6,750,848 B1 | 6/2004 | Pryor |
| 6,753,828 B2 | 6/2004 | Tuceryan et al. |
| 6,781,133 B2 | 8/2004 | Karplus et al. |
| 6,797,895 B2 | 9/2004 | Lapstun et al. |
| 6,798,403 B2 | 9/2004 | Kitada et al. |
| 6,811,489 B1 | 11/2004 | Shimizu et al. |
| 6,842,175 B1 | 1/2005 | Schmalstieg et al. |
| 6,844,871 B1 | 1/2005 | Hinckley et al. |
| 6,852,032 B2 | 2/2005 | Ishino |
| 6,922,632 B2 | 7/2005 | Foxlin |
| 6,952,003 B2 | 10/2005 | Skurnik et al. |
| 6,952,026 B2 | 10/2005 | Lindholm |
| 6,982,697 B2 | 1/2006 | Wilson et al. |
| 6,993,206 B2 | 1/2006 | Ishino et al. |
| 6,995,445 B2 | 2/2006 | Forrest et al. |
| 7,000,469 B2 | 2/2006 | Foxlin et al. |
| 7,022,966 B2 | 4/2006 | Gonzo et al. |
| 7,023,536 B2 | 4/2006 | Zhang et al. |
| 7,061,429 B2 | 6/2006 | Fager et al. |
| 7,063,256 B2 | 6/2006 | Anderson et al. |
| 7,084,887 B1 | 8/2006 | Sato et al. |
| 7,088,440 B2 | 8/2006 | Buermann et al. |
| 7,102,616 B1 | 9/2006 | Sleator |
| 7,110,100 B2 | 9/2006 | Buermann et al. |
| 7,120,875 B2 | 10/2006 | Daily et al. |
| 7,139,983 B2 | 11/2006 | Kelts |
| 7,158,118 B2 | 1/2007 | Liberty |
| 7,203,384 B2 | 4/2007 | Carl |
| 7,215,322 B2 | 5/2007 | Genc et al. |
| 7,236,156 B2 | 6/2007 | Liberty et al. |
| 7,268,774 B2 | 9/2007 | Pittel et al. |
| 7,279,646 B2 | 10/2007 | Xu |
| 7,343,278 B2 | 3/2008 | Billinghurst et al. |
| 7,379,841 B2 | 5/2008 | Ohta |
| 7,414,611 B2 | 8/2008 | Liberty |
| 7,424,388 B2 | 9/2008 | Sato |
| 7,445,550 B2 | 11/2008 | Barney et al. |
| 7,474,809 B2 | 1/2009 | Carl et al. |
| 7,477,780 B2 | 1/2009 | Boncyk et al. |
| 7,500,917 B2 | 3/2009 | Barney et al. |
| 7,566,858 B2 | 7/2009 | Hotelling et al. |
| 7,567,701 B2 | 7/2009 | Fontius |
| 7,596,466 B2 | 9/2009 | Ohta |
| 7,596,767 B2 | 9/2009 | Wilson |
| 7,629,974 B2 | 12/2009 | Ohta |
| 7,655,937 B2 | 2/2010 | Hotelling et al. |
| 7,690,994 B2 | 4/2010 | Dohta |
| 7,714,895 B2 | 5/2010 | Pretlove et al. |
| 7,716,008 B2 | 5/2010 | Ohta |
| 7,729,515 B2 | 6/2010 | Mandella et al. |
| 7,760,194 B2 | 7/2010 | Sakurai |
| 7,768,498 B2 | 8/2010 | Wey |
| 7,775,439 B2 | 8/2010 | Kimber et al. |
| 7,778,444 B2 | 8/2010 | Lee et al. |
| 7,831,064 B2 | 11/2010 | Ohta |
| 7,833,100 B2 | 11/2010 | Dohta |
| 7,834,848 B2 | 11/2010 | Ohta |
| 7,872,638 B2 | 1/2011 | Sato |
| 7,880,726 B2 | 2/2011 | Nakadaira et al. |
| 7,896,733 B2 | 3/2011 | Tanabe |
| 7,927,216 B2 | 4/2011 | Ikeda et al. |
| 7,931,535 B2 | 4/2011 | Ikeda et al. |
| 7,942,745 B2 | 5/2011 | Ikeda et al. |
| 7,961,909 B2 | 6/2011 | Mandella et al. |
| 7,999,812 B2 | 8/2011 | Bassett et al. |
| 8,041,536 B2 | 10/2011 | Ohta |
| 8,102,365 B2 | 1/2012 | Alten |
| 8,106,884 B2 | 1/2012 | Nam et al. |
| 8,384,665 B1 | 2/2013 | Powers, III et al. |
| 8,542,219 B2 | 9/2013 | Carl et al. |
| 8,675,911 B2 | 3/2014 | Barbier et al. |
| 9,086,732 B2 | 7/2015 | Gagner et al. |
| 9,132,342 B2 | 9/2015 | Balachandreswaran et al. |
| 9,495,801 B2 | 11/2016 | Ebstyne et al. |
| 10,013,808 B2 | 7/2018 | Jones et al. |
| 2001/0020936 A1 | 9/2001 | Tsuji |
| 2001/0043737 A1 | 11/2001 | Rogina et al. |
| 2002/0001029 A1 | 1/2002 | Abe |
| 2002/0028017 A1 | 3/2002 | Munich et al. |
| 2002/0048404 A1 | 4/2002 | Fahraeus et al. |
| 2002/0049530 A1 | 4/2002 | Poropat |
| 2002/0105484 A1 | 8/2002 | Navab et al. |
| 2002/0118181 A1 | 8/2002 | Sekendur |
| 2002/0145587 A1 | 10/2002 | Watanabe |
| 2002/0148655 A1 | 10/2002 | Cho et al. |
| 2002/0158848 A1 | 10/2002 | Sekendur |
| 2002/0163511 A1 | 11/2002 | Sekendur |
| 2002/0180714 A1 | 12/2002 | Duret |
| 2003/0006973 A1 | 1/2003 | Omura et al. |
| 2003/0006975 A1 | 1/2003 | Moriya et al. |
| 2003/0014212 A1 | 1/2003 | Ralston et al. |
| 2003/0025713 A1 | 2/2003 | Wang et al. |
| 2003/0025951 A1 | 2/2003 | Pollard et al. |
| 2003/0029919 A1 | 2/2003 | Lynggaard et al. |
| 2003/0034961 A1 | 2/2003 | Kao |
| 2003/0038790 A1 | 2/2003 | Koyama et al. |
| 2003/0044048 A1 | 3/2003 | Zhang et al. |
| 2003/0061188 A1 | 3/2003 | Wiebe et al. |
| 2003/0076980 A1 | 4/2003 | Zhang et al. |
| 2003/0106985 A1 | 6/2003 | Fagin et al. |
| 2003/0107558 A1 | 6/2003 | Bryborn et al. |
| 2003/0146906 A1 | 8/2003 | Lin |
| 2003/0156145 A1 | 8/2003 | Hullender et al. |
| 2003/0163525 A1 | 8/2003 | Hendriks et al. |
| 2003/0195820 A1 | 10/2003 | Silverbrook et al. |
| 2003/0210228 A1 | 11/2003 | Ebersole et al. |
| 2004/0001647 A1 | 1/2004 | Lake et al. |
| 2004/0032970 A1 | 2/2004 | Kiraly |
| 2004/0104935 A1 | 6/2004 | Williamson et al. |
| 2004/0189675 A1 | 9/2004 | Pretlove et al. |
| 2004/0207597 A1 | 10/2004 | Marks |
| 2004/0258306 A1 | 12/2004 | Hashimoto |
| 2005/0059488 A1 | 3/2005 | Larsen et al. |
| 2005/0073508 A1 | 4/2005 | Pittel et al. |
| 2005/0074162 A1 | 4/2005 | Tu et al. |
| 2005/0107979 A1 | 5/2005 | Buermann et al. |
| 2005/0123171 A1 | 6/2005 | Kobayashi et al. |
| 2005/0168437 A1 | 8/2005 | Carl et al. |
| 2005/0195387 A1 | 9/2005 | Zhang et al. |
| 2005/0280804 A1 | 12/2005 | Buermann et al. |
| 2006/0028457 A1 | 2/2006 | Burns |
| 2006/0082546 A1 | 4/2006 | Wey |
| 2006/0109245 A1 | 5/2006 | Wilson et al. |
| 2006/0152487 A1 | 7/2006 | Grunnet-Jepsen et al. |
| 2006/0152489 A1 | 7/2006 | Sweetser et al. |
| 2006/0173268 A1 | 8/2006 | Mullick et al. |
| 2006/0176287 A1 | 8/2006 | Pittel et al. |
| 2006/0176288 A1 | 8/2006 | Pittel et al. |
| 2006/0267940 A1 | 11/2006 | Groom et al. |
| 2007/0049374 A1 | 3/2007 | Ikeda et al. |
| 2007/0050597 A1 | 3/2007 | Ikeda |
| 2007/0060228 A1 | 3/2007 | Akasaka et al. |
| 2007/0060383 A1 | 3/2007 | Dohta |
| 2007/0060384 A1 | 3/2007 | Dohta |
| 2007/0060385 A1 | 3/2007 | Dohta |
| 2007/0072674 A1 | 3/2007 | Ohta et al. |
| 2007/0080967 A1 | 4/2007 | Miller |
| 2007/0081695 A1 | 4/2007 | Foxlin et al. |
| 2007/0189737 A1 | 8/2007 | Chaudhri et al. |
| 2007/0211027 A1 | 9/2007 | Ohta |
| 2007/0211239 A1 | 9/2007 | Mandella et al. |
| 2007/0213109 A1 | 9/2007 | Sato et al. |
| 2007/0222750 A1 | 9/2007 | Ohta |
| 2007/0256546 A1 | 11/2007 | Hikino et al. |
| 2007/0259717 A1 | 11/2007 | Mattice et al. |
| 2008/0080791 A1 | 4/2008 | Carl et al. |

(56) References Cited

U.S. PATENT DOCUMENTS

| | | |
|---|---|---|
| 2008/0096654 A1 | 4/2008 | Mondesir et al. |
| 2008/0100825 A1 | 5/2008 | Zalewski |
| 2008/0106517 A1 | 5/2008 | Kerr et al. |
| 2008/0167818 A1 | 7/2008 | Kimber et al. |
| 2008/0192007 A1 | 8/2008 | Wilson |
| 2008/0192070 A1 | 8/2008 | Wilson |
| 2008/0204411 A1 | 8/2008 | Wilson |
| 2008/0225127 A1 | 9/2008 | Ming |
| 2008/0267453 A1 | 10/2008 | Avrahami |
| 2008/0279423 A1 | 11/2008 | Zhang et al. |
| 2008/0285801 A1 | 11/2008 | Heinzmann |
| 2008/0309511 A1 | 12/2008 | Kerr et al. |
| 2008/0318595 A1 | 12/2008 | Rofougaran |
| 2009/0009513 A1 | 1/2009 | VanDenHengel et al. |
| 2009/0066647 A1 | 3/2009 | Kerr et al. |
| 2009/0066648 A1 | 3/2009 | Kerr et al. |
| 2009/0122146 A1 | 5/2009 | Zalewski et al. |
| 2009/0153389 A1 | 6/2009 | Kerr et al. |
| 2009/0153475 A1 | 6/2009 | Kerr et al. |
| 2009/0153478 A1 | 6/2009 | Kerr et al. |
| 2009/0158203 A1 | 6/2009 | Kerr et al. |
| 2009/0158222 A1 | 6/2009 | Kerr et al. |
| 2009/0164952 A1 | 6/2009 | Wilson |
| 2009/0203445 A1 | 8/2009 | Dohta et al. |
| 2009/0326850 A1 | 12/2009 | Ohta |
| 2010/0001998 A1 | 1/2010 | Mandella et al. |
| 2010/0208057 A1 | 8/2010 | Meier et al. |
| 2010/0277412 A1 | 11/2010 | Pryor |
| 2011/0153198 A1 | 6/2011 | Kokkas et al. |
| 2011/0194731 A1 | 8/2011 | BenHimane et al. |
| 2011/0254950 A1 | 10/2011 | Bibby et al. |
| 2011/0286631 A1 | 11/2011 | Wagner et al. |
| 2012/0038549 A1 | 2/2012 | Mandella et al. |
| 2012/0063638 A1 | 3/2012 | Lim et al. |
| 2012/0105310 A1 | 5/2012 | Sverdrup et al. |
| 2012/0230570 A1 | 9/2012 | Zheng et al. |
| 2012/0249741 A1 | 10/2012 | Maciocci et al. |
| 2013/0051626 A1 | 2/2013 | Abadpour et al. |
| 2013/0286053 A1 | 10/2013 | Fleck et al. |
| 2014/0098242 A1 | 4/2014 | Sharma et al. |
| 2014/0119593 A1 | 5/2014 | Filler |
| 2014/0206443 A1 | 7/2014 | Sharp et al. |
| 2015/0163345 A1 | 6/2015 | Cornaby et al. |
| 2015/0309316 A1 | 10/2015 | Osterhout et al. |
| 2015/0309562 A1 | 10/2015 | Shams et al. |
| 2015/0317833 A1 | 11/2015 | Ebstyne et al. |
| 2016/0180594 A1 | 6/2016 | Todeschini |
| 2016/0225192 A1 | 8/2016 | Jones et al. |
| 2016/0267720 A1 | 9/2016 | Mandella et al. |
| 2016/0307374 A1 | 10/2016 | Kurz et al. |
| 2017/0075117 A1 | 3/2017 | Lin et al. |
| 2017/0076425 A1 | 3/2017 | Folse |
| 2017/0285343 A1 | 10/2017 | Belenkii et al. |
| 2017/0285738 A1 | 10/2017 | Khalid |
| 2018/0039079 A1 | 2/2018 | Lin et al. |
| 2018/0136723 A1 | 5/2018 | Shuster et al. |
| 2018/0286136 A1 | 10/2018 | Jones et al. |

FOREIGN PATENT DOCUMENTS

| | | |
|---|---|---|
| EP | 1573498 B1 | 12/2011 |
| GB | 2351817 A | 1/2001 |
| JP | 2000-293303 A | 10/2000 |
| JP | 2001-100908 A | 4/2001 |
| JP | 2005-165776 A | 6/2005 |
| JP | 2003-420573 A | 7/2005 |
| WO | 1991-003792 A1 | 3/1991 |
| WO | 1996-014633 A1 | 5/1996 |
| WO | 1996-32697 A1 | 10/1996 |
| WO | 1997-005542 A | 2/1997 |
| WO | 1999-57900 A1 | 11/1999 |
| WO | 2000-30337 A2 | 5/2000 |
| WO | 2001-088679 A2 | 5/2001 |
| WO | 2002-017222 A2 | 2/2002 |
| WO | 2002-058029 A2 | 7/2002 |
| WO | 2002-064380 A1 | 8/2002 |
| WO | 2002-069247 A1 | 9/2002 |
| WO | 2002-084634 A1 | 10/2002 |
| WO | 2004-099851 A2 | 11/2004 |
| WO | 2005-066744 A1 | 7/2005 |

OTHER PUBLICATIONS

Frey, William et al., "Off-the-Shelf, Real-Time, Human Body Motion Capture for Synthetic Environments", Environments, Computer Science Department Naval Postgraduate School, Monterey, California, USA, 1996, pp. 1-26.

Geiger, Christian et al., "Mobile AR4ALL", Proceedings of IEEE and ACM International Symposium on Augmented Reality, Paderborn, Germany, Oct. 29, 2001, pp. 1-2.

Gibbons, Jeremy "Metamorphisms: Streaming Representation-Changers", Computing Laboratory, University of Oxford, Jan. 10, 2005, pp. 1-51, http://www.cs.ox.ac.uk/publications/publication380-abstract.html, United Kingdom.

Goldstein, Herbert et al., Classical Mechanics, 3rd Edition, Addison Wesley, 2002, Chapter 4 and Appendices A&B.

Gordon, Gary et al., "Silicon Optical Navigation", Agilent Technical Bulletin, 2004, pp. 1-7.

Gortler, Steven J., et al., "The Lumigraph", Microsoft Research, Aug. 4, 1996, 10 pgs.

Greff-Buaes, Alexandre, "A Low Cost One-Camera Optical Tracking System for Indoor Wide-Area Augmented and Virtual Reality Environments", Dissertation, Federal University of Rio Grande do Sul, Dept. of EE, Porto Alegre, Brasil, Feb. 2006.

Hager, Gregory D. et al., "Fast and Globally Convergent Pose Estimation from Video Images", IEEE Transactions on Pattern Analysis and Machine Intelligence, vol. 22, No. 6, Jun. 2000, pp. 610-622.

Hamamatsu, PSD Position Sensitive Detector S9037-S9038 Series, Selection Guide of Hamamatsu, Solid State Division, Oct. 2002.

Hand, Chris, "A Survey of 3D Interaction Techniques", Department of Computer Science, De Montfort University, The Gateway, Leicester, UK, vol. 016, No. 005, 1997, pp. 269-281.

Haralick, Robert M., et al., "Computer and Robot Vision v.2", Addison-Wesley Publishing Company, 1993, pp. 66-68.

Hartley, Richard and Zisserman, Andrew, "Multiple View Geometry in computer vision", Second Edition, Cambridge University Press, New York, 2003.

Henrysson, Anders et al., "Face to Face Collaborative AR on Mobile Phones", ISMAR 2005, Oct. 5, 2005, pp. 1-11.

Heo, Sejong et al., "Motion and Structure Estimation Using Fusion of Inertial and Vision Data for Helmet Tracker", International Journal of Aeronautical&Space Sciences, Mar. 1, 2010, vol. 11, No. 1, pp. 31-40.

Hinckley, Ken et al., "The Video Mouse: A Camera-Based Multi-Degree-of-Freedom Input Device ", Microsoft Research, CHI Letters, vol. 1, 1, UIST '99 Asheville NC, pp. 103-112.

Hoff, William A., et al., "Computer vision-based registration techniques for augmented reality", Proceedings of Intelligent Robots and Computer Vision XV, SPIE vol. 2904, Nov. 18-22, 1996, Boston MA, pp. 538-548.

Hoff, William A., "Fusion of Data from Head-Mounted and Fixed Sensors", First International Workshop on Augmented Reality, Nov. 1, 1998, San Francisco, California, 20 pgs.

Hollerer, Tobias H. et al., "Mobile Augmented Reality", Telegeoinformatics: Location-Based Computing and Services, Chapter 9, H. Karimi and A. Hammad eds., Taylor & Francis Books Ltd., Jan. 1, 2004.

Hollerer, Tobias Hans, "User Interfaces for Mobile Augmented Systems", PhD Thesis, Columbia University, 2004, 238 pgs.

Holloway, Richard et al., "Virtual Environments: A Survey of the Technology", University of North Carolina at Chapel Hill, Sep. 1993.

Hua, Hong et al., "Calibration of a Head-Mounted Projective Display for Augmented Reality Systems", Proceedings of the International Symposium on Mixed and Augmented Reality (ISMAR), IEEE Computer Society, Oct. 1, 2002, 10 pgs.

(56) References Cited

OTHER PUBLICATIONS

Huttenlocher, Daniel P. et al., "Recognizing Solid Objects by Alignment with an Image", Cornell University CS Dept. & MIT Dept. of Brain and Cognitive Science and Artificial Intelligence Laboratory, International Journal of Computer Vision, 5:2, 1990, pp. 195-212.
Imran, Saad Ali et al., "Robust L Homography Estimation Using Reduced Image Feature Covariances from an RGB Image", Journal of Electronic Imaging 21(4), Oct.-Dec. 2012, pp. 1-10, SPIE DigitalLibrary.org/jei.
Joguet, Cedric et al., "Pen-Like' Natural Graphic Gesture Capture Disposal, Based on Micro-System", Department of Systems for Information and Health, CEA-Leti Grenoble, France, 2003, pp. 1-4.
Johansson, Bjorn et al., "A System for Automatic Pose-Estimation from a Single Image in a City Scene", Centre for Mathematical Sciences, Lund University, Sweden, 2002, 6 pgs.
Kalkusch, Michael et al., "Structured Visual Markers for Indoor Pathfinding", Vienna University of Technology, IEEE 1st International Workshop, Augmented Reality Toolkit, Sep. 29-29, 2002, Austria.
Kanatani, K., "Geometric Computation for Machine Vision", 1993, Oxford Engineering Science Series 37, Chapters 2-3.
Kang, Sing Bing et al., "A Multibaseline Stereo System with Active Illumination and Real-time Image Acquisition", Cambridge Research Lab, 1995, pp. 1-6 Digital Equipment Corp, Cambridge, MA, USA.
Kang, Sing Bing, "Hands-free navigation in VR environments by tracking the head", Cambridge Research Laboratory, Technical Report Series, CRL 97/1, Mar. 1997, 28 pgs.
Kato, Hirokazu et al., "A Mixed Reality 3D Conferencing Application", Human Interface Technology Laboratory, University of Washington, Seattle, USA, 1999, 9 pgs. (pp. 199-207).
Kato, Hirokazu et al., "Marker Tracking and HMD Calibration for a Video-based Augmented Reality Conferencing System", Proceedings of the 2nd IEEE on ACM International Workshop on Augmented Reality '99, San Francisco, USA, Oct. 20-21, 1999 (10 pgs.).
Kessler, Drew G. et al., "The Simple Virtual Environment Library: An Extensible Framework for Building VE Applications", MIT Press, Presence: Teleoperators and Virtual Environments 2000, vol. 9, No. 2, pp. 187-208.
Kotake, Daisuke et al., "A Hybrid and Linear Registration Method Utilizing Inclination Constraint", Fourth IEEE and ACM, ISMAR 2005, pp. 140-149.
Kragic, Danica et al., "Issues and Strategies for Robotic Object Manipulation in Domestic Settings", Computer Vision and Active Perception Lab, Centre for Autonomous Systems, Workshop on Advances, Royal Institute of Technology, Sweden, Sep. 2004, 13 pgs.
Laberge, Dominic, "Visual Tracking for Human Computer Interaction", Master of Computer Science Thesis, School of Information Technology and Engineering, University of Ottawa, Aug. 22, 2003, 111 pgs.
Larsson, Ulrica et al., "Development and evaluation of a 6DOF Interface to be used in medical application", Thesis, Linkpings University, Sweden, Jun. 5, 2002.
LaViola, Joseph J. "Bringing VR and Spatial 3D Interaction ..",IEEE Computer Graphics and Applications, #0272-1716/08, Sep.-Oct. 2008, pp. 10.
Lee, Jiann-Der, "A Fast Geometrical Approach to Camera Extrinsic Parameters", Dept. of Electrical Engineering, Computers Math. Applications, vol. 32, No. 12, Elsevier Science Ltd, 1996, pp. 93-100.
Lee, Jong Weon et al., "Tracking with Omni-directional Vision for Outdoor AR Systems", Proceedings of the International Symposium on Mixed and Augmented Reality (ISMAR'-02), IEEE Computer Society, 2002, 10 pgs.
Lopez-Nicolas, G. et al., "Shortest Path Homography-Based Visual Control for Differential Drive Robots", Universidad de Zaragoza, Vision Systems: Applications, ISBN 978-3-902613-01-1, Jun. 2007, pp. 583-597.
Lovell-Smith, Crispin D. "A Prototype Optical Tracking System: Investigation and Development", Master's Thesis, University of Canterbury Dept of EE, Jun. 2009, Christchurch, New Zealand.
Maeda, Masaki et al., "A Wearable AR Navigation System using Vision Based Tracking with Infrared", Technical Report of the Institute of Electronics, Information and Communication Engineers (IEICE), vol. 103, Issue 584, Jan. 22, 2004, 2 pgs., Japan.
Maeda, Makaki et al., "Proposal of a Three-dimensional User Position and Orientation Detection Technique Using Infrared Identifiers for a Wearable System", The 65th National Convention of the Information Processing Society of Japan (IPSJ), 3T4B-4, Mar. 25, 2003, 4 pgs., Japan.
Maeda, Masaki et al., "Tracking of User Position and Orientation by Stereo Measurement of Infrared Markers and Orientation Sensing", Proceedings: The 8th International Symposium on Wearable Computers (ISWC), IEEE Computer Society, Oct. 31-Nov. 3, 2004, 8 pgs.
Mak, Lin Chi et al., "A 6 DoF Visual Tracking System for a Miniature Helicopter", 2nd Int'l Conference on Sensing Tech., Palmerston North, New Zealand, Nov. 26-28, 2007, pp. 32-37.
Malis, Ezio et al., "Deeper Understanding of the Homography Decomposition for Vision-Based Control", INRIA Institut national de Recherche en Informatique et an Automatique, Report No. 6303, Sep. 2007, pp. 1-93, INRIA Sophia Antipolis.
Marquez-Neila, Pablo et al., "Speeding-Up Homography Estimation in Mobile Devices", Journal of Real-Time Image Processing, 2013, pp. 1-4, PCR: Perception for Computer and Robots, http://www.dia.fi.upm.es/~pcr/fast_homography.html.
Mathieu, Herve, "The Cyclope: A 6 DOF Optical Tracker Based on a Single Camera", 2nd Intuition Int. Workshop on VR/VE Industry: Challenges and Opportunities, May 3, 2005.
Mehling, Michael, "Implementation of a Low Cost Marker Based Infrared Optical Tracking System", PhD Thesis Fachhochschule Stuttgart OHochschule der Medien, Vienna, Austria, Feb. 26, 2006.
Mohring, Mathias et al., "Video See-Through AR on Consumer Cell-Phones", IEEE—Computer Science, Weimar, Germany, Nov. 2, 2004 (2 pgs.).
Montijano, E. et al., "Fast Pose Estimation for Visual Navigation Using Homographies", 2009 IEEE/RSJ International Conference on Intelligent Robots and Systems, Oct. 2009, pp. 1-6, St. Louis, MO, USA.
Neumann, Ulrich et al., "Augmented Reality Tracking in Natural Environments", Computer Science Department, University of Southern California, 1999, 24 pgs.
Neumann, Ulrich et al., "Natural Feature Tracking for Augmented Reality", IEEE Transactions on Multimedia, USC Dept. of Computer Science, Mar. 1, 1999 (35 pgs.).
Newman, Joseph et al., "Ubiquitous Tracking for Augmented Reality", ISMAR, Technical University of Vienna, Austria, Nov. 2, 2004, (10 pgs.).
Nitzsche, Norbert et al., "Motion Compression for Telepresent Walking in Large-Scale Remote Environments", Technical University of Munich, Helmet- and Head-Mounted Displays VIII: Technologies and Applications, Proceedings of SPIE, vol. 5079, 2003, pp. 265-276.
Oberkampf, Denis et al., "Iterative Pose Estimation Using Coplanar Feature Points", Computer Vision Laboratory & Center for Automation Research, University of Maryland, Computer Vision and Image Understanding, vol. 63, No. 3, Academic Press, Inc., May 1996, pp. 495-511.
Papagiannakis, George et al., "A survey of mobile and wireless technologies for augmented reality systems", MIRALab, Geneva, Switzeriand and Center for the Study of Mobile Devices and Communication, Naval Postgraduate School, Monterey, CA, USA, Feb. 1, 2008, pp. 1-30.
Pears, Nick et al., "Smart Phone Interaction with Registered Displays", IEEE CS, Pervasive Computing, Apr. 1, 2009, pp. 2-9.
Pirchheim, Christian et al., "Homography-Based Planar Mapping and Tracking for Mobile Phones", Graz University of Technology, Oct. 2011, pp. 1, Mixed and Augmented Reality (ISMAR) 2011 10th IEEE International Symposium, Basel.

(56) References Cited

OTHER PUBLICATIONS

Pollefeys, Marc et al., "Video to 3D", Center for Processing of Speech and Images, K.U. Leuven, Dept. of Computer Science, University of North Carolina Chapel Hill, Working Group III/V, 2002, 6 pgs.
Poyner, Rick, "Wintab Interface Specification: 16-bit and 32-bit API Reference", LCS/Telegraphics, Revised May 9, 1996.
Prince, Simon J. D., et al., "Augmented Reality Camera Tracking with Homographies", IEEE Computer Graphics and Applications, Nov.-Dec. 2002, pp. 39-45.
Reitmayr, Gerhard et al., "Location based Applications for Mobile Augmented Reality", Vienna University of Technology, Australian Computer Society, Inc., 2003, 9 pgs.
Rekimoto, Jun et al., "CyberCode: Designing Aumented Reality Environments with Visual Tags", Interaction Laboratory, Sony Computer Science Laboratories, Inc., Tokyo, Japan, Apr. 1, 2000, 10 pgs.
Rekimoto, Jun, "Matrix: A Realtime Object Identification and Registration Method for Augmented Reality", Sony Computer Science Laboratory, Inc., Tokyo, Japan, 1998, 6 pgs.
Rekimoto, Jun, "Transvision: A Hand-Held Augmented Reality System for Collaborative Design" Sony Computer Science Laboratory, Inc., Tokyo, Japan, 1996, 6 pgs.
Remi, Paucher, "Location-based augmented reality on cellphones", UCSB—Internship Work, May 4, 2009 through Oct. 30, 2009, pp. 1-29.
Ribo, Miguel et al., "Hybrid Tracking for Outdoor Augmented Reality Applications", IEEE Xplore CGA, Nov./Dec. 2002, pp. 54-63.
Roetenberg, Daniel, "Inertial and Magnetic Sensing of Human Motion", Daniel Roetenberg, 2006 (ISBN-10: 90-9020620-5/ ISBN-13: 978-90-9020620-2).
Rolland, J.P. et al., "A comparison of optical and video see-through head-mounted displays", Department of Computer Science at Chapel Hill, NC, Proceedings of the SPIE, vol. 2351, Jan. 1994, pp. 293-307.
Rolland, Jannick P. et al., "A Survey of Tracking Technology for Virtual Environments", Center for Research & Education in Optics & Lasers (CREOL), 2001, pp. 1-48, Univ. of Florida, Orlando FL, USA.
Rosenfeld, Azriel, "Vision Based Navigation and Recognition", DARPA sponsored research, University of Maryland, Aug. 1998, 31 pgs.
Sanchez, Jorge A. et al., "Plane-Based Camera Calibration Without Direct Optimization Algorithms", Jan. 2006, pp. 1-6, Centro de Investigación en Informática para Ingeniería, Univ. Tecnológica Nacional, Facultad Regional Córdoba, Argentina.
Satoh, Kiyohide et al., "A Head Tracking Method Using Bird's-Eye View Camera and Gyroscope", Third IEEE and ACM International Symposium, ISMAR, 2004, pp. 202-211.
Schmalstieg, Dieter et al., "Experiences with Handheld Augmented Reality", ISMAR, Graz University of Technology, Austria, Nov. 13, 2007 (13 pgs.).
Schroering, Mark A. et al., "A New Input Device for 3D Sketching", Scanning, 2003, pp. 311-318 Washington University in St. Louis, USA.
Sharp, Courtney S. et al., "A Vision System for Landing an Unmanned Aerial Vehicle", Dept. of EE & CS, University of California Berkeley, Berkeley, CA, USA, 2001 IEEE Intl. Conference on Robotics and Automation Seoul, Korea, May 21-26, 2001, pp. 1-8.
Siegl, H. et al., "An AR Human Computer Interface for Object Localization in a Cognitive Vision Framework", Proceedings of the ECCV Workshop on HCI, Prague, May 16, 2004, pp. 178-186.
Simon, Gilles et al., "Pose Estimation for Planar Structures", IEEE Computer Graphics and Applications, Dec. 10, 2002, pp. 46-53.
Simon, Gilles et al., "Reconstructing while registering: a novel approach for markerless augmented reality", LORIA—UHP Nancy I—Inria Lorraine, France, Sep. 30, 2002, pp. 1-10.
Sorensen, Brett R., et al., "The Minnesota Scanner: A Prototype Sensor for Three-Dimensional Tracking of Moving Body Segments", IEEE Transactions on Robotics and Automation, vol. 5, No. 4, Aug. 1989, pp. 499-509.
Sternig, Sabine et al., "Multi-camera Multi-object Tracking by Robust Hough-based Homography Projections", Institute for Computer Graphics and Vision, Graz University of Technology, Austria, Nov. 2011, pp. 1-8.
Tan, T. N. et al., "Recovery of Intrinsic and Extrinsic Camera Parameters Using Perspective Views of Rectangles", Department of Computer Science, 1995, pp. 1-10, The University of Reading, Berkshire RG6 6AY, UK.
Thirthala, Sriram et al., "Multi-view geometry of 1D radial cameras and its application to omnidirectional camera calibration", Department of Computer Science, Oct. 2005, pp. 1-8, UNC Chapel Hill, North Carolina, US.
Thirthala, Sriram et al., "The Radical Trifocal Tensor: A Tool for Calibrating the Radial Distortion of Wide-Angle Cameras", submitted to Computer Vision and Pattern Recognition, 2005, pp. 1-8, UNC Chapel Hill, North Carolina, US.
Torr, P. H. S., and Zisserman, A., "Feature Based Methods for Structure and Motion Estimation", Microsoft Research Ltd & Dept. of Engineering Science at University of Oxford, 1999, 19 pgs.
Ude, Ales, "Nonlinear Least Squares Optimisation of Unit Quaternion Functions for Pose Estimation from Corresponding Features", Int. Proc 14th Int. Conf.: Pattern Recognition, Aug. 1998, pp. 425-427, Brisbane, Australia.
Universal Serial Bus (USB), "Device Class Definition for Human Interface Devices (HID)", Firmware Specification, USB Implementer's Forum, Jun. 27, 2001.
Van Liere, Robert et al., "Optical Tracking Using Projective Invariant Marker Pattern Properties", Center for Mathematics and Computer Science, Amsterdam, the Netherlands, IEEE Virtual Reality 2003 Proceedings 2003, pp. 191-198.
Wagner, Daniel et al., "ARToolKit on the PocketPC Platform", Vienna University of Technology, Vienna, Austria, 2003 (2 pgs.).
Wagner, Daniel et al., "First Steps Towards Handheld Augmented Reality", ISWC03, Vienna University of Technology, Vienna, Austria, Oct. 21, 2003 (9 pgs.).
Wagner, Daniel et al., "Handheld Augmented Reality Displays", Virtual Reality Conference, Graz University of Technology, Austria, Mar. 25, 2003 (2 pgs.).
Wagner, Daniel et al., "Making Augmented Reality Practical on Mobile Phones, Part 1", IEEE Computer Graphics and Applications, Projects in VR, May 5, 2009, pp. 12-15.
Wagner, Daniel et al., "Pose Tracking from Natural Features on Mobile Phones", ISMAR, Sep. 15, 2008 (10 pgs.).
Wagner, Daniel et al., "Towards Massively Multi-User Augmented Reality on Handheld Devices", PervasiveComputing, vol. 3468, Aug. 13, 2005 (12 pgs.).
Wang, Jih-Fang, "A Real-time Optical 6D Tracker for Head-mounted Display Systems", Symposium on 3D Graphics, TR90-011, The University of North Carolina at Chapel Hill, Dept. of Computer Science, USA, Mar. 1, 1990 (99 pgs.).
Wang, Jih-fang et al., "Tracking a head-mounted display in a room-sized environment with head-mounted cameras", University of North Carolina Chapel Hill, Dept. of Computer Sciences, SPIE Symposium, 1990, 11 pgs.
Welch, Greg et al., "High-Performance Wide-Area Optical Tracking: The HiBall Tracking System", Presence—Teleoperators and Virtual Environments, MIT Press, vol. 10, No. 1, Feb. 2001, pp. 1-21.
Welch, Gregory F. "Hybrid Self-Tracker: An Inertial/Optical Hybrid Three-Dimensional Tracking System", Dissertation Proposal, TR 95-048, Dept. of Computer Science, University of North Carolina at Chapel Hill, 1995, 21 pgs.
Ait-Aider, Omar et al., "Adaption of Lowe's Camera Pose Recovery Algorithm to Mobile Robot Self-Localisation", Robotica, Feb. 2002, pp. 1-15.
Alkeryd, Martin, "Evaluation of Position Sensing Techniques for an Unmanned Aerial Vehicle", Dissertation at the Dept. of EE, Linkoping University 2006, Chapters 4-8.

(56) References Cited

OTHER PUBLICATIONS

Allen, B. Danette et al., "Tracking Beyond 15 Minutes of Thought", Slides for Course 11, SIGGRAPH 2001, Los Angeles, CA, Aug. 12-17, Copyright 2001 ACM Inc., 103 pgs.
Allen, B. Danette et al., "Tracking Beyond 15 Minutes of Thought", Course Notes—Course 11, SIGGRAPH 2001, Los Angeles, CA, Aug. 12-17, Copyright 2001 ACM Inc., 195 pgs.
Ansar, Adnan et al., "Linear Pose Estimation from Points or Lines". ECCV 2002, LNCS 2353, pp. 282-296, Springer-Verlag Berlin Heidelberg 2002.
Azuma, Ronald T., "A Survey of Augmented Reality", Presence: Operators and Virtual Environments, vol. 6, No. 4, Aug. 1, 1997, pp. 355-385.
Azuma, Ronald et al., "Improving Static and Dynamic Registration in an Optical See-through HMD", Department of Computer Science at UNC at Chapel Hill, Siggraph Conference 1994, 17 pgs.
Azuma, Ronald et al., "Recent Advances in Augmented Reality", Naval Research Lab—Survey, IEEE Computer Graphics and Applications, Nov.-Dec. 2001, pp. 34-47.
Azuma, Ronald T., "The Challenge of Making Augmented Reality Work Outdoors", Mixed Reality: Merging Real and Virtual Worlds, Chapter 21, Springer-Verlag, 1999, pp. 379-390.
Barakonyi, Istvan, "Ubiquitous Animated Agents for Augmented Reality", PhD Dissertation, Vienna University of Technology, Oct. 22, 2006.
Batista, Jorge et al., "Pose View Stability Analysis for Camera Look Angles Computation", Institute of Systems and Robotics, Department of Electrical Engineering, University of Coimbra, Portugal, Nov. 15, 1995, pp. 1-32.
Bergmann, Kristian, "User Interfaces based on hand-held projection screen", PhD Thesis, Technical University of Berlin, Computer Graphics Department, Dec. 1, 2008.
Bhatnagar, Devesh K., "Position Trackers for Head Mounted Display Systems: A Survey", University of North Carolina, Chapel Hill, USA, 1993, pp. 1-22.
Billinghurst, Mark et al., "The Magic Book—Moving seamlessly between reality and virtuality", IEEE Computer Graphics and Applications, May-Jun. 2001, pp. 6-8.
Birchfield, Stan, "An Introduction to Projective Geometry (for computer vision)", Stanford University CS Department, Mar. 12, 1998, pp. 1-22.
Bishop, Gary, "Self-Tracker: A Smart Optical Sensor on Silicon", PhD Dissertation, Department of Computer Science, University of North Carolina at Chapel Hill, 1984, 65 pgs.
Bowman, Doug A. et al., "3D User Interfaces: New Directions and Perspectives", IEEE Society, #0272-1716/08, Nov./Dec. 2008, pp. 20-36.
Burdea, Grigore C. and Coiffei Philippe, "Virtual Reality Technology", Chapter 2: Input Devices: Trackers, Navigation, and Gesture Interfaces, ISBN 0-471-36089-9, IEEE Press, Wiley Interscience, Mar. 2003, pp. 16-56.
Burdea, Grigore C. and Coiffet Philippe, "Virtual Reality Technology", Chapter 4: Computing Architectures for VR, ISBN 0-471-36089-9, IEEE Press, Wiley Interscience, Mar. 2003, pp. 116-156.
Cantzler, H. et al., "A novel form of a pointing device", Intelligent Systems Lab, Vision Video and Graphics, 2003, pp. 1-6.
Carceroni, Rodrigo L., et al., "Numerical Methods for Model-Based Pose Recovery", The University of Rochester Department of Computer Science, Technical Report 659, Aug. 1997, 90 pgs.
Caudell, Thomas P. et al., "Augmented Reality: An Application of Heads-Up Display Technology to Manual Manufacturing Process", System Sciences, Boeing Computer Services, Seattle, WA, USA, Jul. 10, 1992, pp. 659-669.
Chai, Lin et al., "3-D Motion and Structure Estimation Using Inertial Sensors and Computer Vision for Augmented Reality", Teleoperators and Vritual Environments, Nov. 2000, pp. 1-40.
Chen, J. et al., "Adaptive Homography-Based Visual Servo Tracking", Department of Electrical and Computer Engineering, Clemson University, IEEE International Conference on Intelligent Robots and Systems IROS, Oct. 2003, pp. 1-7, Oak Ridge, TN, USA.

Cheng, Shun-Wen et al., "An Application of Augmented Reality Head-Up Display", Automotive Research & Testing Center, No. 6, Lukang, Changhua County, Taiwan, 2012, pp. 1-9.
Cho, Sung-Jung et al., "Magic Wand: A Hand-Drawn Gesture Input Device in 3-D Space with Inertial Sensors", IEEE Computer Society, Kokubunji Tokyo, Oct. 29, 2004, pp. 106-111.
Chow, Yang-Wai, "Low-Cost Multiple Degrees-of-Freedom Optical Tracking for 3D Interaction in Head-Mounted Display Virtual Reality", International Journal of Recent Trends in Engineering, Issue 1, vol. 1, May 2009, pp. 55-56.
Chung, James C., et al., "Exploring Virtual Worlds with Head-Mounted Displays", The University of North Carolina at Chapel Hill, Dept. of Computer Science, TR89-009, Feb. 1989, 12 pgs.
Collins, Robert et al., "A System for Automated Sight Model Acquisition and Extension—Radius", University of Massachusetts, Department of Computer Science, TEC-0062, Jun. 1995, 55 pgs.
Comport, Andrew I. et al., Real-Time Markerless Tracking for Augmented Reality: The Virtual Visual Servoing Framework:, IEEE Transactions on Visualization and Computer Graphics, vol. 12, No. 4, Jul./Aug. 2006, pp. 615-628.
Corradini, Andrea et al., "A Map-Based System Using Speech and 3D Gestures for Pervasive Computing", Center for Human-Computer Communication, Oregon Health & Science University, Portland, USA, 2003, pp. 1-6.
Dorfmuller-Ulhaas, Klaus, "Optical Tracking from User Motion to 3D Interaction", Dissertation, Vienna University of Technology, Vienna, Austria, Oct. 2002.
Dubrofsky, Elan, "Homography Estimation", Master's Essay Carleton University, The University of British Columbia, Vancouver, Canada, Mar. 2009, pp. 1-32.
Feiner, Steven et al., "A Touring Machine: Prototyping 3D Mobile Augmented Reality Systems for Exploring the Urban Environment", Proceedings of International Symposium on Wearable Computing (ISWC), Cambridge MA, USA, Oct. 13, 1997, pp. 74-81.
Fish, Alexander et al., "An Adaptive Center of Mass Detection System Employing a 2-D Dynamic Element Matching Algorithm for Object Tracking", 0-7803-7762 IEEE, Jan. 3, 2003, pp. 778-781.
Foxlin, Eric et al., "Miniature 6-DOF Inertial System for Tracking HMDs", SPIE, vol. 3362, AeroSense 98, Orlando, FL, Apr. 13-14, 1998, pp. 1-15.
Foxlin, Eric, "Chapter 7. Motion Tracking Requirements and Technologies", InterSense Inc., Extended draft version of Chapter 8, Handbook of Virtual Environment Technology, Ed., Lawrence Erlbaum Associates, 2002, 54 pgs.
Welch, Greg et al., "Motion Tracking: No Silver Bullet, but a Respectable Arsenal", IEEE Computer Graphics and Application, Motion Tracking Survey, Nov.-Dec. 2002, pp. 24-38.
Welch, Greg et al., "SCAAT: Incremental Tracking with Incomplete Information", Proceedings of the 25th annual conference on Computer Graphics and Interactive Techniques, ACM, Aug. 3-8, 1997, 12 pgs.
Welch, Gregory F., "SCAAT: Incremental Tracking with Incomplete Information", PhD Dissertation, TR96-051, University of North Carolina at Chapel Hill, Department of Computer Science, Oct. 1996, 208 pgs.
Welch, Greg et al., "The HiBall Tracker: High-Performance Wide-Area Tracking for Virtual and Augmented Environments", Symposium on Virtual Reality Software and Technology, University College London, Dec. 20-22, 1999, 11 pgs.
Yang, Allen Y. et al., "Symmetry-Based 3-D Reconstruction from Perspective Images", Computer Vision and Image Understanding 99 (2005) 210-240, pp. 1-31, Science Direct, www.elsevier.com/locate/cviu.
Zhai, Shumin, "User Performance in Relation to 3D Input Device Design", IBM Almaden Research Center, Computer Graphics, Nov. 1998, pp. 50-55.
Zhang, Zhongfei et al., "Obstacle detection based on qualitative and quantitative 3D reconstruction", IEEE Transactions on Pattern Analysis and Machine Intelligence, vol. 19, No. 1, Jan.-Feb. 1997, pp. 15-26.
Zhou, Feng et al., "Trends in Augmented Reality Tracking, Interaction and Display: A Review of Ten Years of ISMAR", IEEE ISMAR 2008, Sep. 15, 2008, pp. 1-10.

Field of View of Viewer

REALISTIC VIRTUAL/AUGMENTED/MIXED REALITY VIEWING AND INTERACTIONS

RELATED APPLICATIONS

This application is a Continuation-in-part of U.S. patent application Ser. No. 15/165,955 filed on May 26, 2016, now abandoned.

FIELD OF THE INVENTION

The present invention relates generally to the viewing of a reality, and in particular to a comfortable, pleasant, informative and realistic viewing of such a reality and interacting with such a reality by a user. The reality can be a virtual reality, an augmented reality or a mixed reality.

BACKGROUND OF THE INVENTION

When an item moves without constraints in a three-dimensional environment with respect to stationary objects, knowledge of the item's distance from and inclination to these objects can be used to derive a variety of the item's parameters of motion as well as its pose. Particularly useful stationary objects for pose recovery purposes include a ground plane, fixed points, lines, reference surfaces and other known features.

Over time, many useful coordinate systems and methods have been developed to parameterize stable reference frames defined by stationary objects. The pose of the item, as recovered and expressed in such stable frames with parameters obtained from the corresponding coordinate description of the frame, is frequently referred to as the item's absolute pose. Based on the most up-to-date science, we know that no absolute or stationary frame is available for defining truly absolute parameters. Stable frame is thus not to be construed to imply a stationary frame. More precisely stated, the stable frame in which the absolute pose is parameterized is typically not a stationary or even an inertial frame (for example, a reference frame defined on the Earth's surface is certainly stable, but not stationary and non-inertial due to gravity and Earth's rotation). Nevertheless, we shall refer to poses defined in stable frames as "absolute" in adherence to convention.

Many conventions have also been devised to track temporal changes in absolute pose of the item as it undergoes motion in the three-dimensional environment. Certain types of motion in three dimensions can be fully described by corresponding equations of motion (e.g., orbital motion, simple harmonic motion, parabolic motion, curvilinear motion, etc.). These equations of motion are typically expressed in the stable frame defined by the stationary objects.

The parameterization of stable frames is usually dictated by the symmetry of the situation and overall type of motion. For example, motion exhibiting spherical symmetry is usually described in spherical coordinates, motion exhibiting cylindrical symmetry in cylindrical coordinates and generally linear motion in Cartesian coordinates. More advanced situations may even be expressed in coordinates using other types of parameterizations, e.g., sets of linearly independent axes.

Unconstrained motion of items in many three-dimensional environments, however, may not lend itself to a simple description in terms of equations of motion. Instead, the best approach is to recover a time sequence of the item's absolute poses and reconstruct the motion from them. For a theoretical background, the reader is referred to textbooks on classical mechanics and, more specifically, to chapters addressing various types of rigid body motion. An excellent overall review is found in H. Goldstein et al., Classical Mechanics, 3rd Edition, Addison Wesley Publishing, 2002.

Items associated with human users, e.g., items that are manipulated or worn by such users, generally do not move in ways that can be described by simple equations of motion. That is because human users exercise their own will in moving such items in whatever real three-dimensional environment they find themselves. It is, however, precisely the three-dimensional motion of such items that is very useful to capture and describe. That is because such motion may communicate the desires and intentions of the human user. These desires and intentions, as expressed by corresponding movements of the item (e.g., gestures performed with the item), can form the basis for user input and interactions with the digital domain (e.g., data input or control input).

In one specific field, it is important to know the absolute pose of an item associated with a human user to derive the position of its tip while it contacts a plane surface. Such position represents a subset of the absolute pose information. Various types of items, such as elongate objects, can benefit from knowledge of their pose, which includes the position of their tip. More precisely, such items would benefit from knowing the absolute position (in world coordinates parameterizing the stable frame) of their tip while it is in contact with a plane surface embedded in the three-dimensional environment. These items include walking canes when in touch with the ground, pointers when in touch with a display or projection surface, writing devices when in touch with a writing surface, and styluses when in touch with an input screen.

The need to determine the absolute position of the tip or nib is deeply felt in the field of input devices such as pens and styluses. Here, the absolute position of the tip has to be known in order to analyze the information written or traced by the user on the writing surface. Numerous teachings of pens and related input devices providing relative tip position and absolute tip position are discussed in the prior art. Some of these teachings rely on inertial navigation devices including gyroscopes and accelerometers as described in U.S. Pat. Nos. 6,492,981; 6,212,296; 6,181,329; 5,981,884; 5,902,968. Others combine inertial navigation with force sensing as described in U.S. Pat. Nos. 6,081,261; 5,434,371. Still other techniques rely on triangulation using signal receivers and auxiliary devices on or adjacent to the writing surface as found in U.S. Pat. Nos. 6,177,927; 6,124,847; 6,104,387; 6,100,877; 5,977,958 and 5,484,966. Furthermore, various forms of radiation including short radio-frequency (RF) pulses, infra-red (IR) pulses, and even sound waves in the form of ultrasound pulses have been taught for triangulation and related techniques. A few examples of yet another set of solutions employing digitizers or tablets are discussed in U.S. Pat. Nos. 6,050,490; 5,750,939; 4,471,162.

The prior art also addresses the use of optical systems to provide relative, and in some cases, absolute position of the tip of a pen or stylus on a surface. For example, U.S. Pat. No. 6,153,836 teaches emitting two light beams from the stylus to two receivers that determine angles with respect to a two-dimensional coordinate system defined within the surface. The tip position of the stylus is found with the aid of these angles and knowledge of the location of the receivers. U.S. Pat. No. 6,044,165 teaches integration of force sensing at the tip of the pen with an optical imaging system having a camera positioned in the world coordinates and looking at the pen and paper. Still other teachings use optical systems observing the tip of the pen and its vicinity. These teachings include, among others, U.S. Pat. Nos. 6,031,936; 5,960,124; 5,850,058. According to another approach, the disclosure in U.S. Pat. No. 5,103,486 proposes using an optical ballpoint in the pen. More recently, optical systems using a light source directing light at paper have been taught, e.g., as described in U.S. Pat. Nos. 6,650,320; 6,592,039 as well as WO 00217222 and U.S. Patent Appl. Nos. 2003-0106985; 2002-0048404.

In some prior art approaches the writing surface is provided with special markings that the optical system can recognize. Some early examples of pens using special markings on the writing surface include U.S. Pat. Nos. 5,661,506; 5,652,412. More recently, such approach has been taught in U.S. Patent Appl. 2003-0107558 and related literature. For still further references, the reader is referred to U.S. Pat. Nos. 7,203,384; 7,088,440 and the references cited therein.

The rich stream of information expressing an item's absolute pose combines its three linear or translational degrees of freedom with its three rotational degrees of freedom. Typically, translations are measured along linearly independent axes such as the X, Y, and Z-axes. The translation or displacement along these axes is usually measured by the position (x, y, z) of a reference point on the item (e.g., the center of mass of the item). The three-dimensional orientation of the item is typically expressed by rotations taken around three linearly independent axes. The latter are typically expressed with three rotation angles, such as the Euler angles ($\phi$, $\theta$, $\psi$).

However the prior art comes short on several fronts when it comes to providing a rich, and comfortable virtual reality, augmented reality or mixed reality experience to the user along with the ability to interact with such a reality. In particular, the prior art does not teach a system or methods for utilizing a viewing mechanism to view a reality/environment with real and/or virtual objects, where the virtual objects may be altered or modified through interactions based on one or more properties of an inside-out camera. Examples of such one or more properties include the pose of the camera or a reduced homography. The reality viewed by the user may be a virtual reality, an augmented reality or a mixed reality. The above alteration or modification of the virtual objects may be necessary to avoid motion sickness for the user. Such a sickness occurs because of the conflict between the vestibular and ocular responses of the brain, as a result of the motion of the user and the system's inability to render appropriate and timely changes to the images/reality viewed by the user.

The prior art is also silent about the many different choices available for the properties of the inside-out camera according to which the virtual object(s) in the reality may be modified as described above. Such modification(s) may be necessary to enhance the experience of the user in viewing the reality. The prior art is also silent about the fact that the reality may be viewed from either a user viewpoint or the viewpoint of a device which is detached from the user and which may be deployed by the user to interact with the virtual/augmented or mixed reality.

Objects and Advantages

In view of the shortcomings of the prior art, it is an object of the present invention to teach systems and methods for providing a rich, pleasant and comfortable virtual reality, augmented reality or mixed reality experience to the user along with the ability to interact with such a reality.

It is also an object of the invention to provide techniques for modifying the appearance of one or more virtual items or objects in a an environment or a reality, such as a virtual reality, viewed by the user to thus facilitate interactions.

It is further an object of the invention to allow an array of choices for the properties based on which the above modification is performed. These choices include the pose of the camera, a reduced homography and any other property recoverable from the output of the camera.

The numerous objects and advantages of the systems and methods of the invention will become apparent upon reading the ensuing description in conjunction with the appended drawing figures.

SUMMARY

The objects and advantages of the present invention are secured by a system having a viewing mechanism permitting a user to view an environment, scene or reality, e.g., a virtual reality (VR), an augmented reality (AR) or a mixed reality (MR). The system is designed not only for viewing the environment but also for interacting with the environment. More specifically, the system is designed to allow the user to interact with the environment and/or aspects of the environment and in particular with virtual objects or virtual items presented in that environment.

The environment is viewed by the user via a viewing mechanism. The viewing mechanism is typically a virtual reality eyewear or head-mounted display when the environment is a virtual reality. The viewing mechanism will be an augmented reality eyewear or head-mounted unit when the environment includes common reality or scene and additional virtual items, objects or other viewable elements that can be superposed on the common reality to be viewed by the user. A mixed reality eyewear or unit is the viewing mechanism when the user is interactive with still other types of environments that mix common reality with virtual and/or augmented reality. In any of these cases, the viewing mechanism will define a user viewpoint or vantage point from which the user will view the environment.

The system allows the user to interact with the environment, e.g., to alter or modify a virtual item or object by manipulating a control device that has an inside-out device camera on-board. The inside-out device camera has a control device viewpoint defined by its own optics. Thus, the control device has its own viewpoint or vantage point on the environment.

To interact with the environment and/or with the virtual item the user moves or manipulates the control device. Thus, it is particularly advantageous to choose as control device an item or items that are easy for the user to manipulate or are otherwise manipulatable. For example, the control device can be item such as a smartphone, a tablet, a joystick, a stylus, a game controller, a gesture sensor, a digital pen, a hand-held implement, a tool or still another manipulatable control object. In fact, manipulatable objects or control devices can also be objects that can be worn by the user or otherwise attached to him or her.

The system has at least one processor or circuit in communication with the viewing mechanism and with the control device. For example, the processor can be on-board either the viewing mechanism, the control device or it can even reside in an off-board portion of the system. In fact, the processor can be distributed between the control device, the viewing mechanism and any off-board portion of the system. The most appropriate choice should ensure speedy and low-latency communication between the processor and both the viewing mechanism and the control device for smooth system operation.

The processor determines a pose of the viewing mechanism. Most commonly data from one or more on-board cameras or other photodetectors is used by the processor to determine the pose of the viewing mechanism. Data from any additional auxiliary sensors can also be used in determining the pose of the viewing mechanism by the processor. The processor also determines a pose of the control device using data from the inside-out device camera mounted on-board the control device. Data from any additional auxiliary sensors can also be used in determining the pose of the control device.

In accordance with the invention, the processor determines the pose of the control device in two different and distinct representations. The first representation used is a full representation or a full homography based on performing a complete pose estimation technique. This complete pose estimation technique can use just optical data from the inside-out device camera or it can use all available data including auxiliary data from any auxiliary sensors that are available. In determining the full representation, the processor can apply a sensor fusion algorithm when supplied with multiple data streams from different sensors. The second representation used is a reduced representation. The reduced representation is obtained using data from the inside-out device camera under a constraint on the motion of the control device that the user is expected to execute when manipulating or moving the control device. It is precisely this constraint that permits the reduced representation. The constraint can be obtained or confirmed from optical data from the inside-out device camera and/or from one or more auxiliary sensors.

The processor takes advantage of the full and the reduced representations to compute an interactive pose portion of the control device. The interactive pose portion will contain less than or represent less than the full motion executed by the user in manipulating the control device. It should be understood that interactive pose portion includes successive values of pose, thus yielding a time series of control device poses. Since a time series of poses define the motion of the control device, its dynamic motion as well as any particular static pose can represent the interactive pose portion.

The system is further equipped with a projection mechanism for altering an appearance of the virtual item from the user's viewpoint or the user's vantage point based on the interactive pose portion found by the processor. In other words, the user can interact with the virtual item by manipulating the control device. Of course, since the user is seeing the virtual item from the point of view of the viewing mechanism, the altering of the appearance of the virtual item has to be from the viewpoint of the viewing mechanism.

Although a reduced representation can include any reduced representation of the pose that reduces one or more degrees of freedom of rigid body motion it is convenient herein to use a reduced homography as such reduced representation. In particular, it is useful to deploy a reduced homography that is consonant with a constrained motion of the control device. The motion would be constrained because of the expected ways in which the user may manipulate the control device. In some cases, physical limitations on user motion can determine the motion constraint. What is important is that the interactive pose portion includes the constrained motion. In other words, it is information about the constrained motion rather than the full motion that is used by the system's projection mechanism to alter the appearance of the virtual item.

In some embodiments the constrained motion is confined to a certain plane. In such embodiments the interactive pose portion used by the projection mechanism for altering the appearance or an aspect of the appearance of the virtual item is obtained from the user's motions that manipulate the control device in that plane. Simply put, the system does not use the full motion that is executed by the control device as it is manipulated by the user to determine how to adjust or change the virtual item's appearance. Rather, the system of invention uses a reduced aspect of the full motion to adjust or change the virtual item's appearance. In the case of motion confined to the plane, only motion confined to that plane is used for altering the appearance of the virtual object. A simple example of this constraint is clear when the control device is a stylus or a digital pen and the virtual item is digital ink produced by the motions of the tip or nib of such a control device within a plane. Clearly, the digital pen or stylus can be moved many different ways in three-dimensional space, but only its motion in a certain plane (e.g., an agreed upon virtual writing plane) is relevant to the generation of digital ink.

In cases where the motion is constrained to a certain plane, the processor can compute the additional pose portion (e.g., by differentiating between the full and reduced representations). This additional pose portion corresponds to motion of the control device that is out of the plane. Although this motion is not deployed for altering the appearance of the virtual item, it can nevertheless be very useful. Specifically, the additional pose portion can be used as additional input that is not directly related to the virtual item. Such input can relate to actions such as system commands, external input or even file commands. For example, in the case of the virtual item being digital ink the command meant by an out-of-plane motion may mean "save the digital ink", "interpret the digital ink", or "execute the digital ink".

The system of the invention may further employ one or more auxiliary sensors for providing auxiliary pose data about the viewing mechanism to the at least one processor. Such auxiliary sensors may be embodied by inertial sensors, acoustic sensors, magnetic sensors, optical flow sensors or still other suitable sensors that can provide motion data. Similarly, the system can further employ one or more auxiliary sensors on for providing auxiliary pose data about the control device to the at least one processor. As in the case of the viewing mechanism, such auxiliary sensors may be embodied by inertial sensors, acoustic sensors, magnetic sensors, optical flow sensors or still other suitable sensors that can provide motion data.

The specifics of the invention and enabling details are described below with reference to the appended drawing figures.

DESCRIPTION OF THE DRAWING FIGURES

Figure 4:
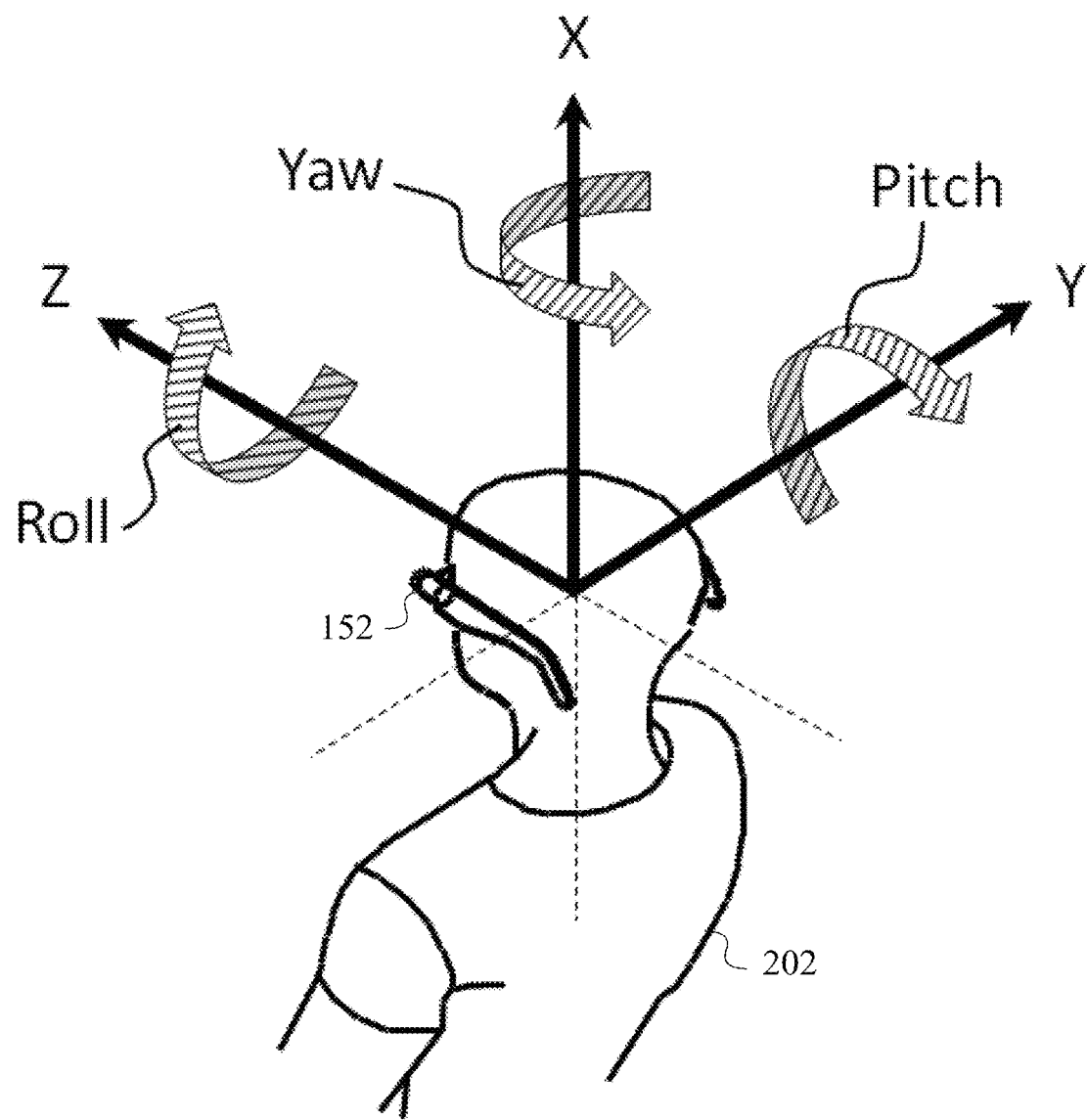
FIG. 4 shows the 6 degree of freedom (6 DOF) available to a human user (specifically his/her head), who is wearing the eyeglasses of FIG. 3A.
Figure 5A:
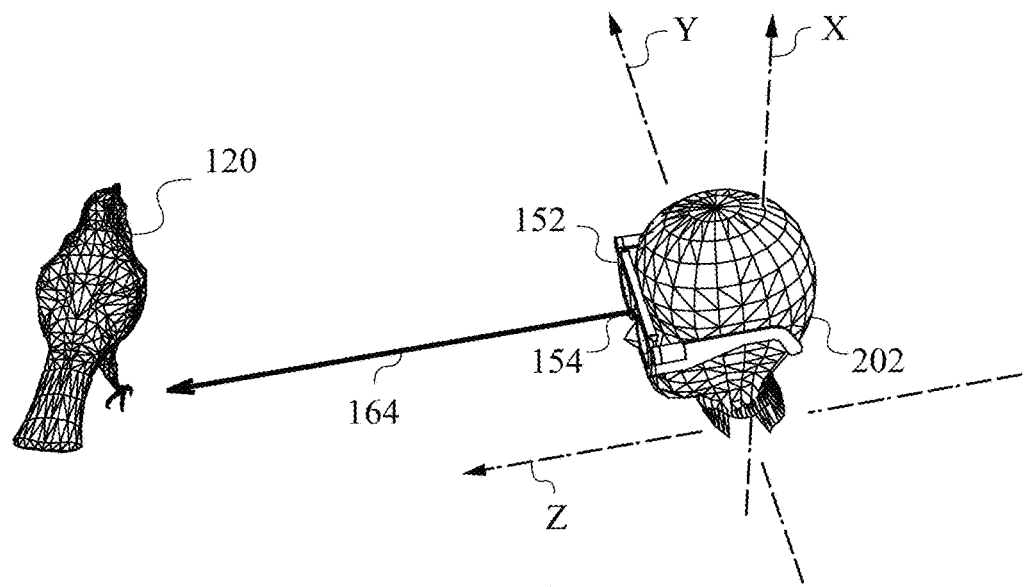
Figure 5B:
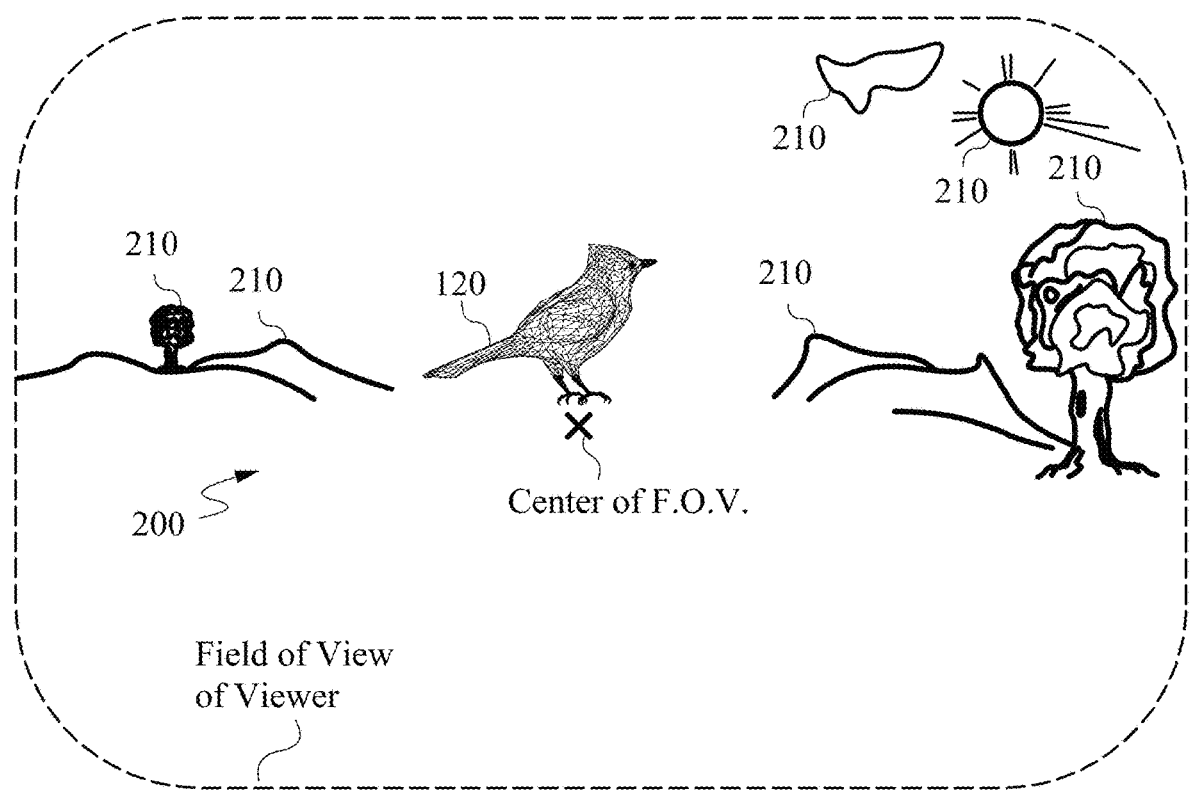

FIG. 5A-B illustrate the canonical position of the head of the user of FIG. 4, or more simply just the canonical position of the user of FIG. 4, viewing a virtual object in an environment comprising both real and virtual objects.

Figure 6A:
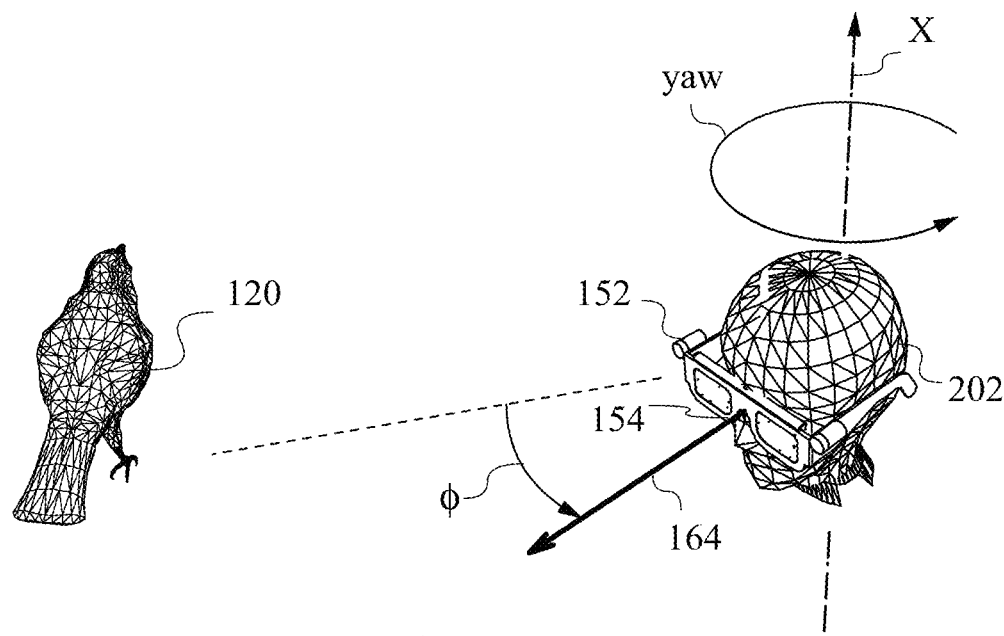
Figure 6B:
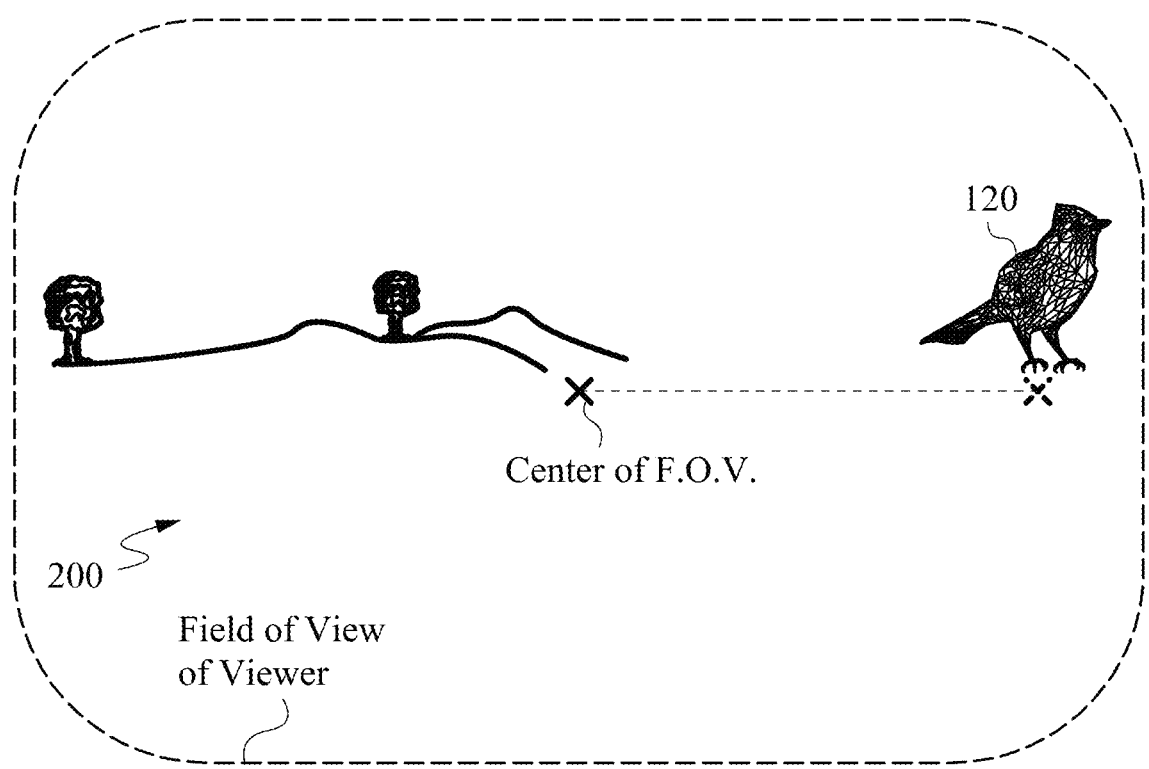

FIG. 6A-B show the Yaw rotation of the user from his/her canonical position in FIG. 5A-B, and the respective change to the virtual object normally expected by the user in the seen environment.

Figure 7A:
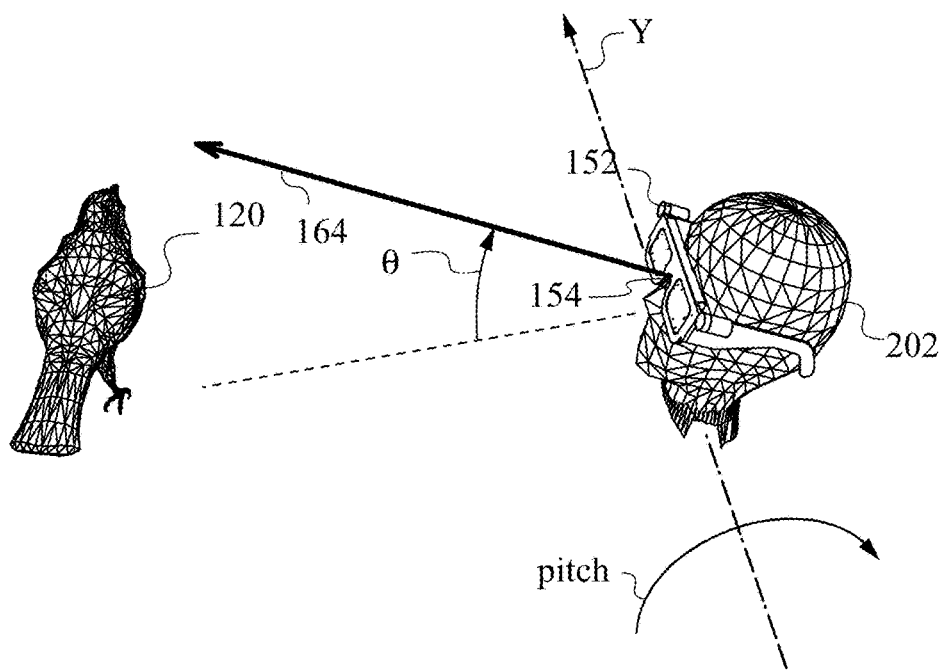
Figure 7B:
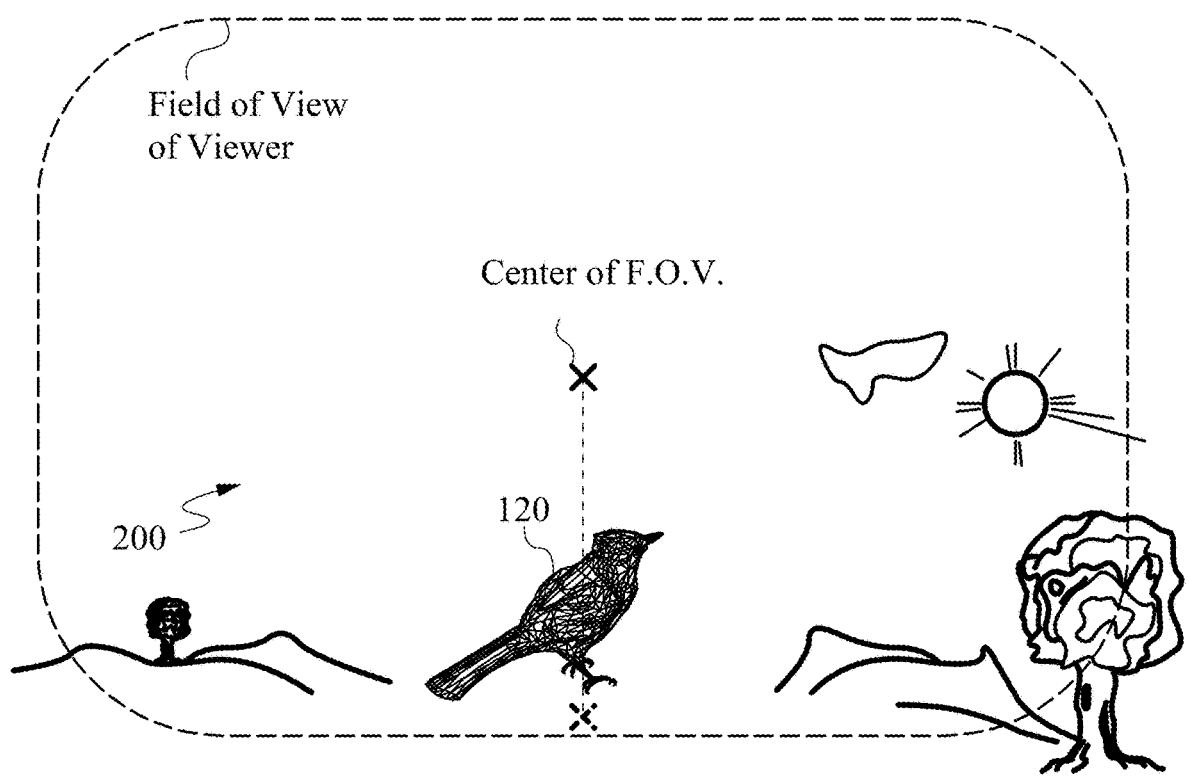

FIG. 7A-B show the Pitch rotation of the user from his/her canonical position in FIG. 5A-B, and the respective change to the virtual object normally expected by the user in the seen environment.

Figure 8A:
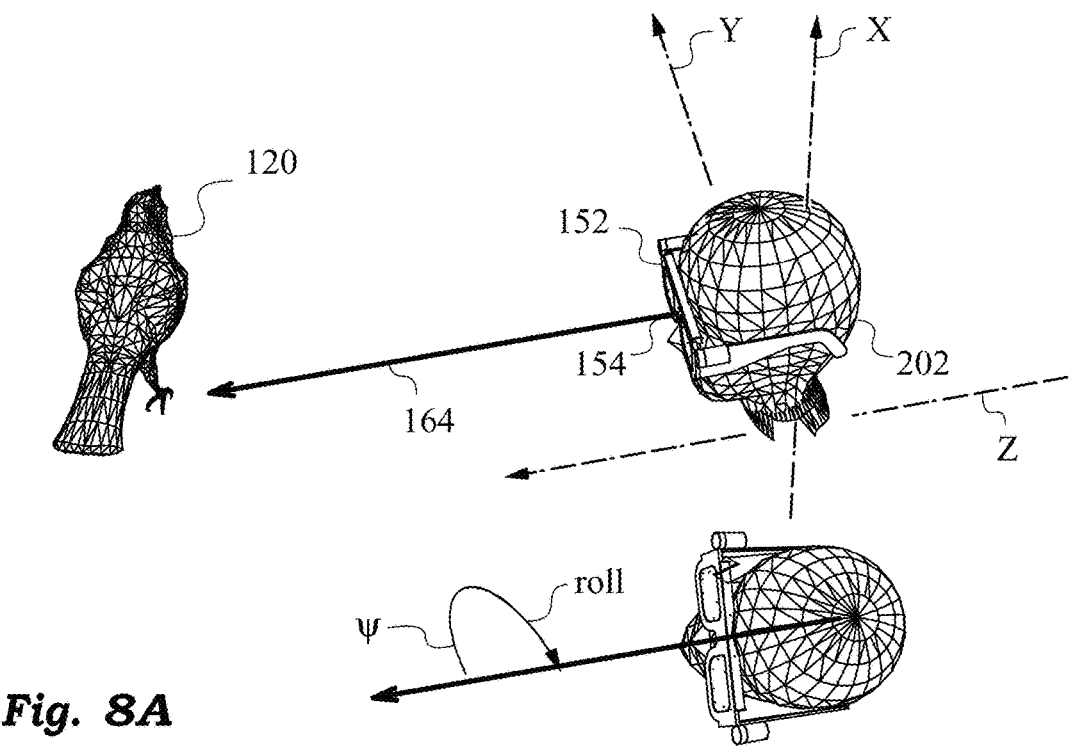
Figure 8B:
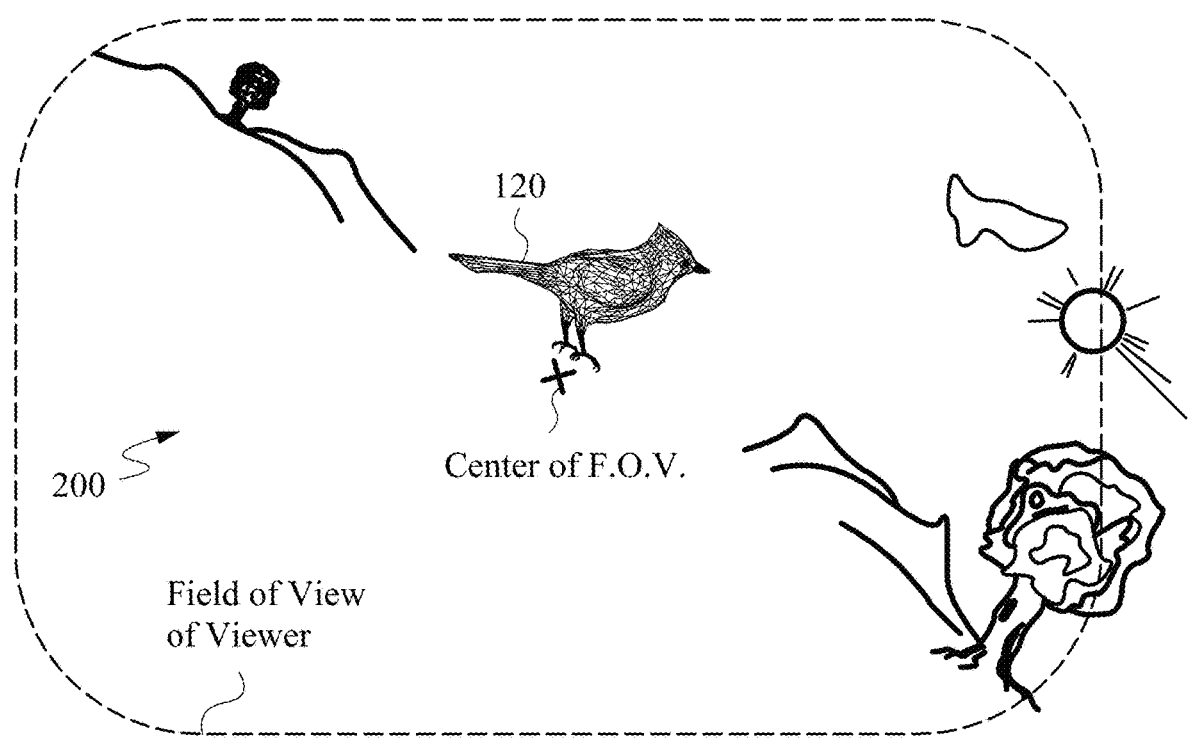

FIG. 8A-B show the Roll rotation of the user from his/her canonical position in FIG. 5A-B, and the respective change to the virtual object normally expected by the user in the seen environment.

Figure 9A:
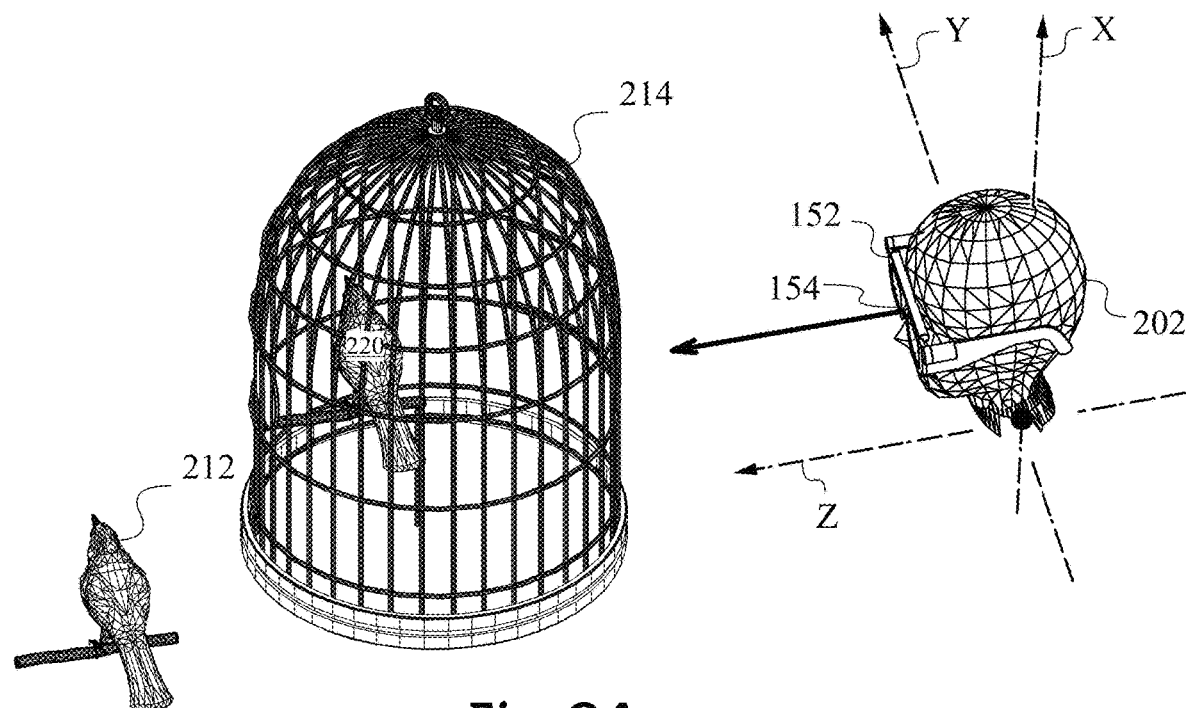
Figure 9B:
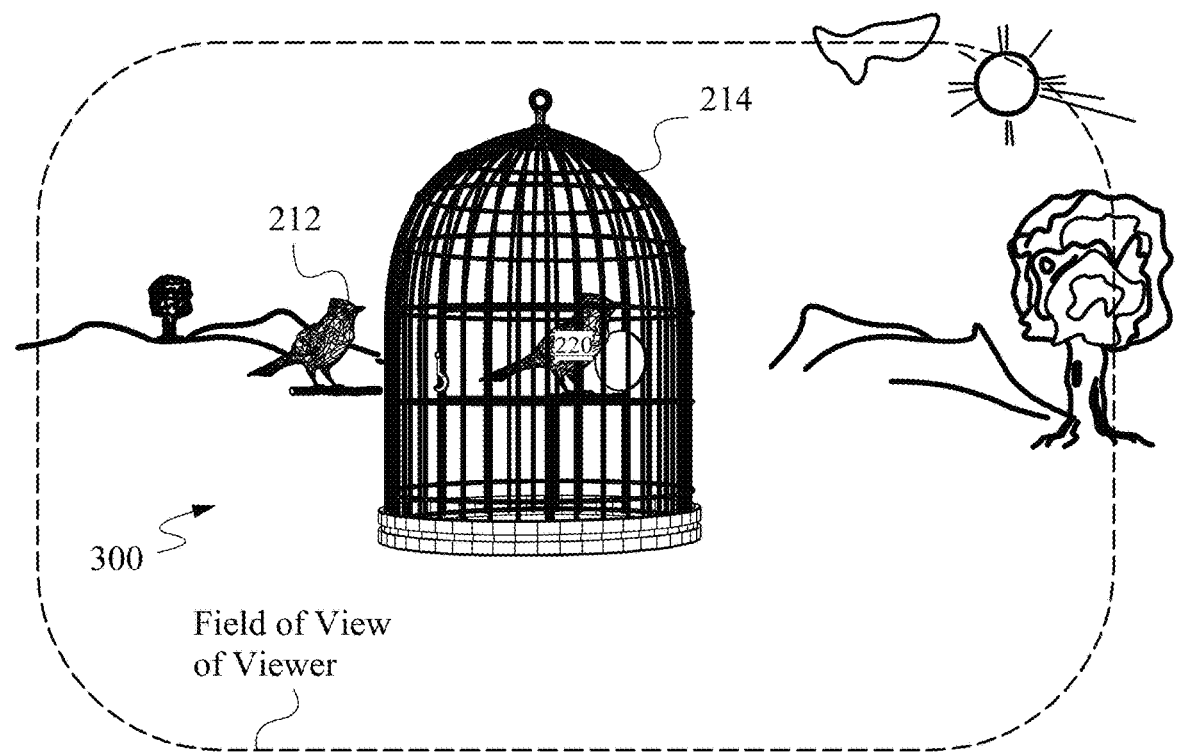

FIG. 9A-B illustrate the canonical position of the user of FIG. 4 viewing a virtual object in another environment comprising both real and virtual objects.

Figure 10A:
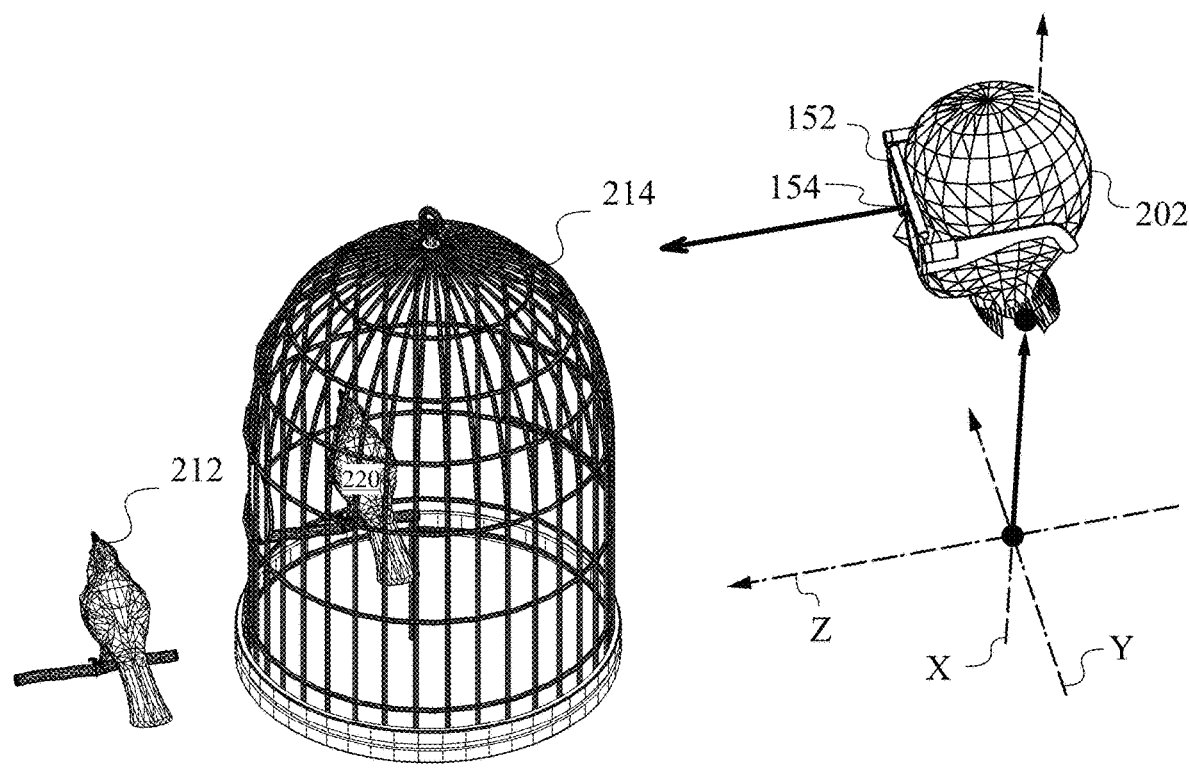
Figure 10B:
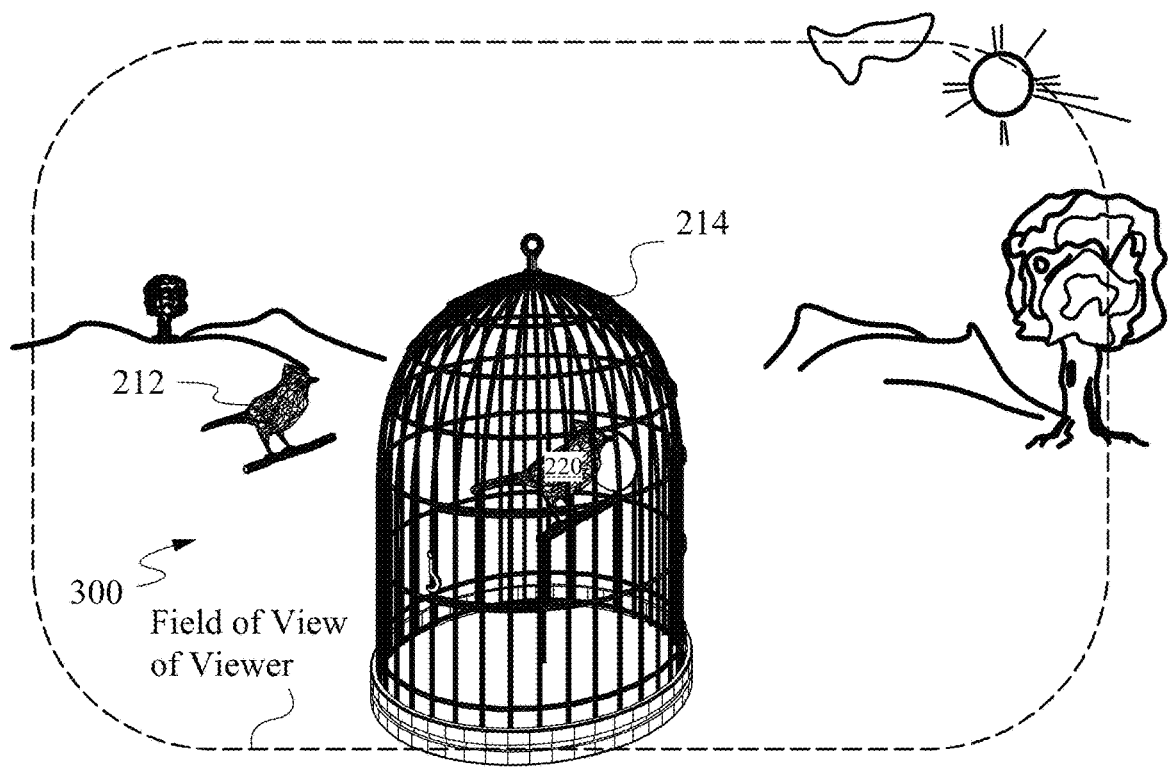

FIG. 10A-B show the translational movement of the user along X-axis from his/her canonical position in FIG. 9A-B, and the respective change to the virtual object normally expected by the user in the seen environment.

Figure 11A:
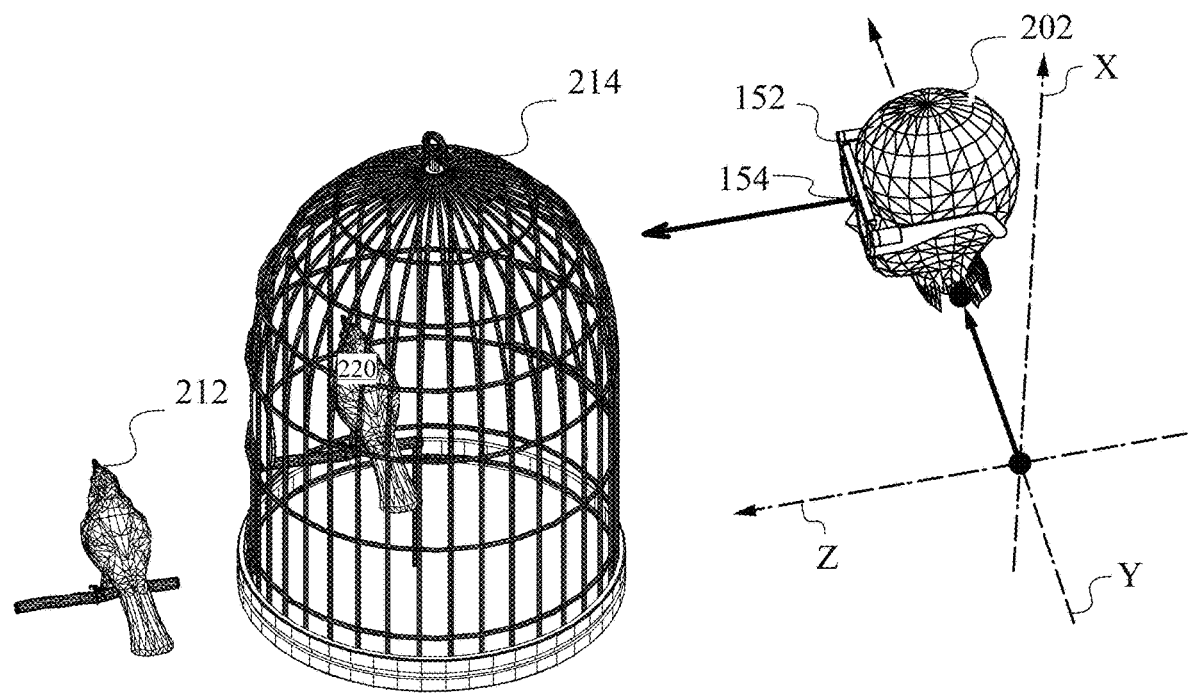
Figure 11B:
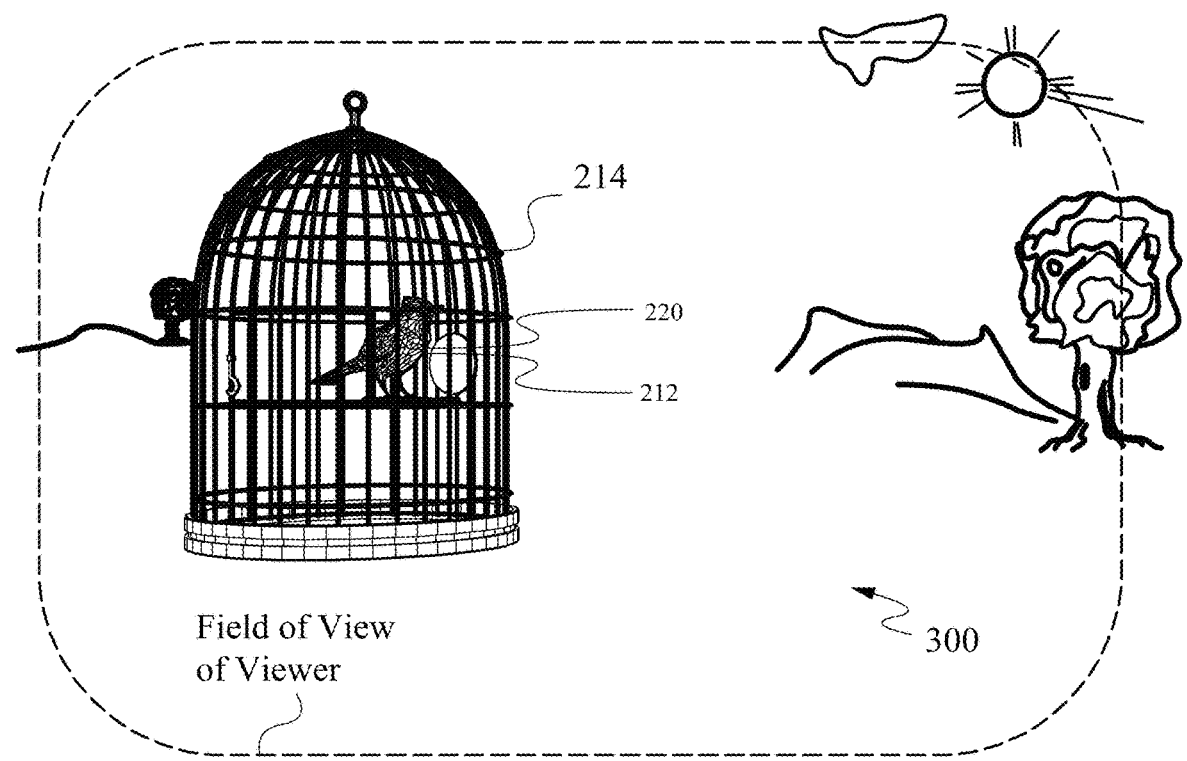

FIG. 11A-B show the translational movement of the user along Y-axis from his/her canonical position in FIG. 9A-B, and the respective change to the virtual object normally expected by the user in the seen environment.

Figure 12A:
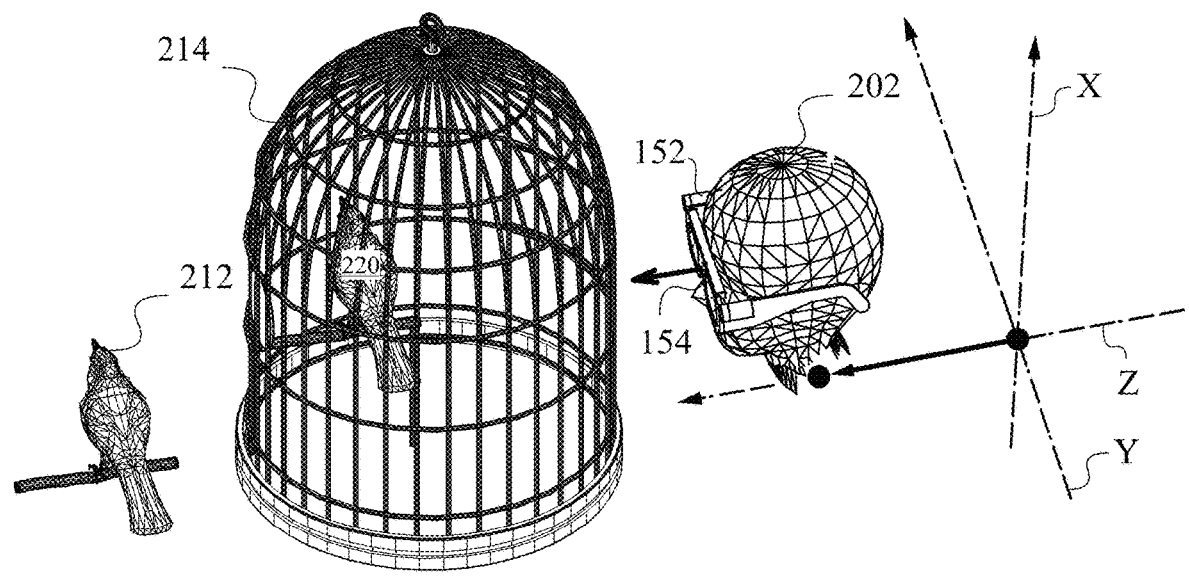
Figure 12B:
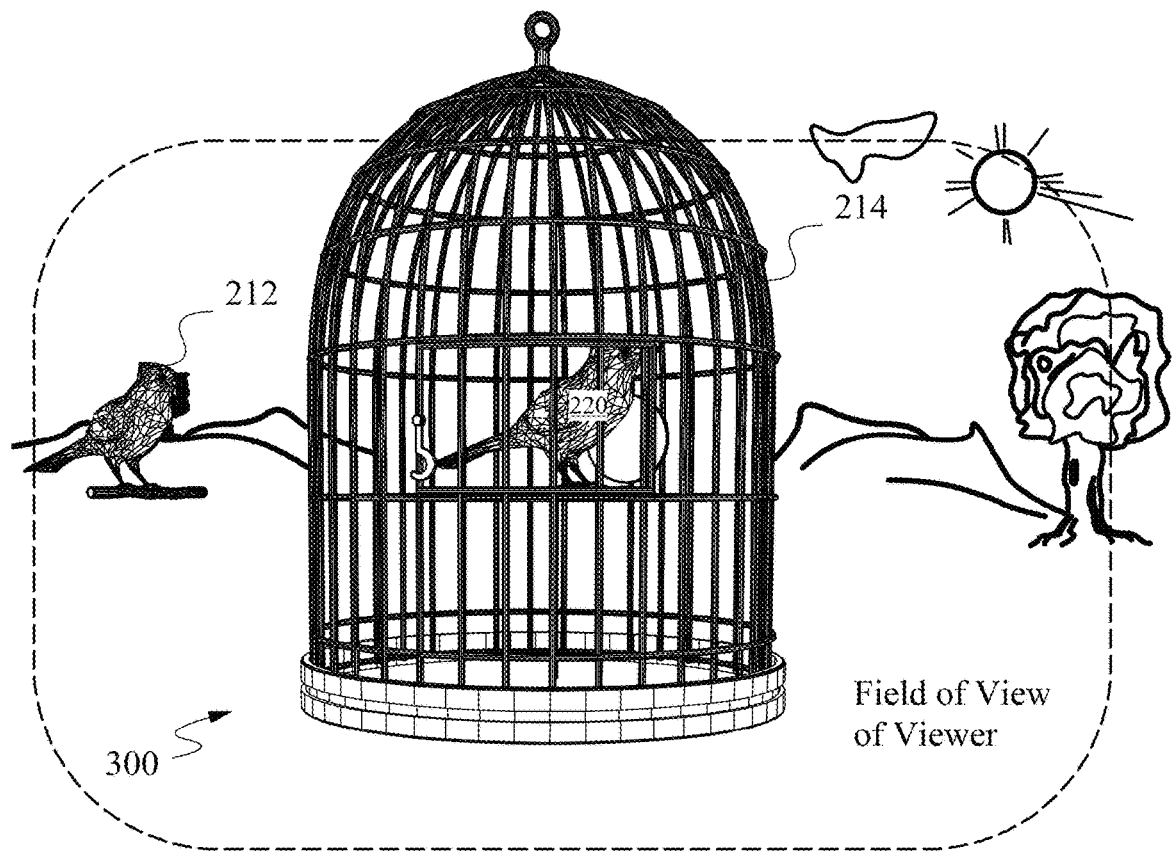

FIG. 12A-B show the translational movement of the user along Z-axis from his/her canonical position in FIG. 9A-B, and the respective change to the virtual object normally expected by the user in the seen environment.

Figure 13:
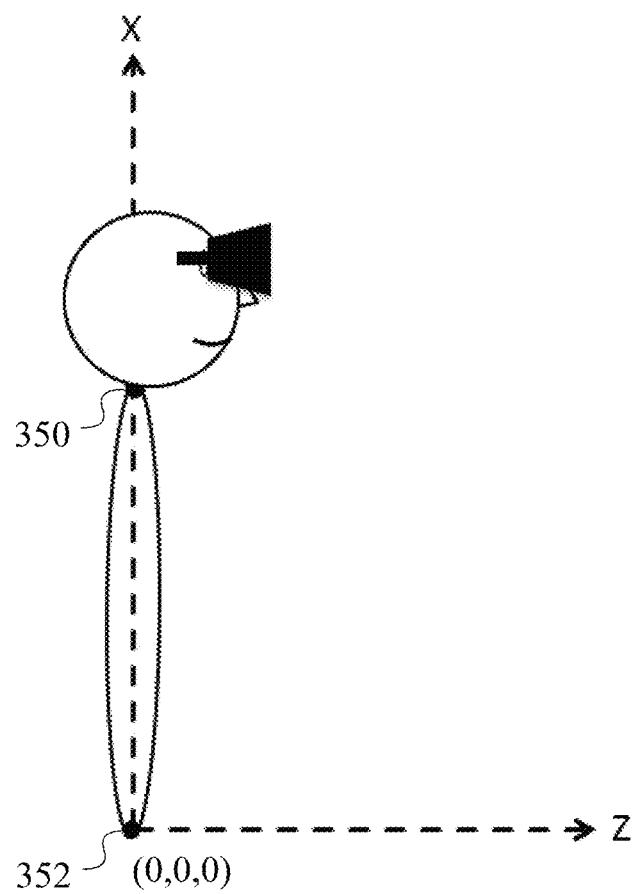

FIG. 13 is a sketch of a human user in the canonical position, wearing a head-worn VR/AR/MR gear. The human sketch consists of a head and a torso and the respective pivot points.

Figure 14:
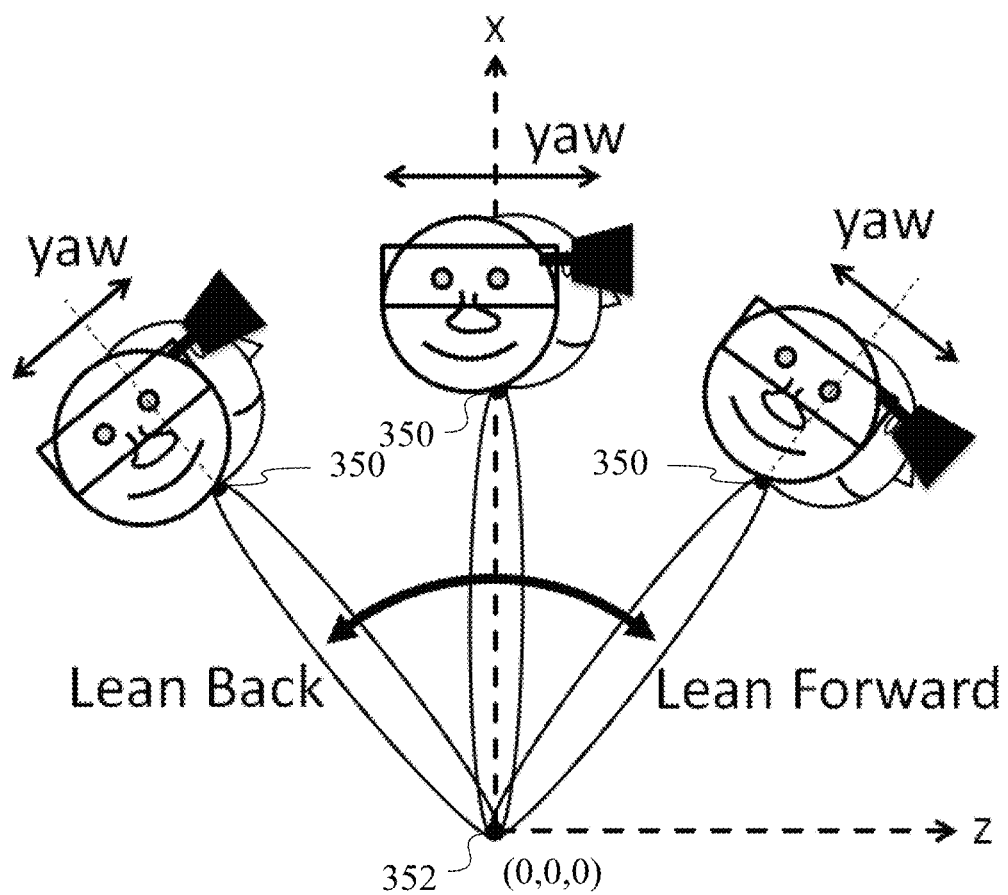

FIG. 14 shows the Yaw rotation of the head of the user with respect to the canonical position of FIG. 13, compounded by the forward/backward rotation of the torso around Y-axis.

Figure 15:
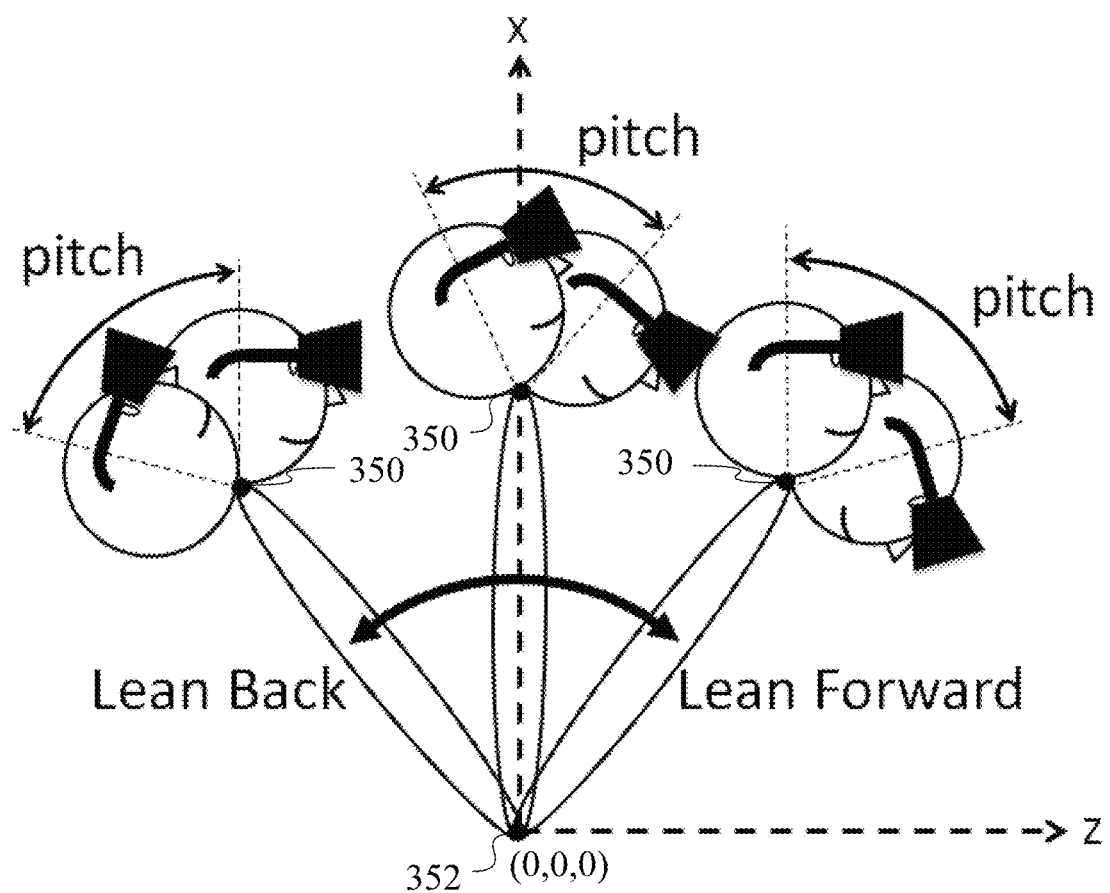

FIG. 15 shows the Pitch rotation of the head of the user with respect to the canonical position of FIG. 13, compounded by the forward/backward rotation of the torso around Y-axis.

Figure 16:
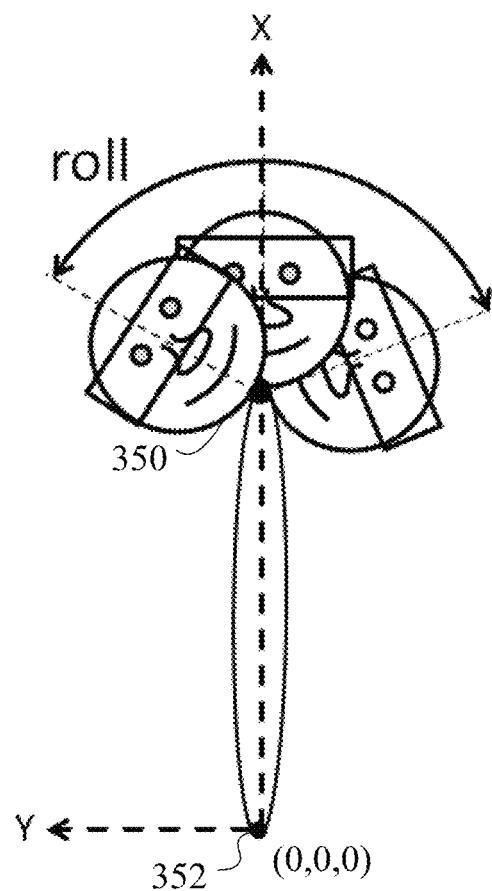

FIG. 16 shows the Roll rotation of the head of the user with respect to the canonical position of FIG. 13, compounded by the inward/outward rotation of the torso around Y-axis.

Figure 17:
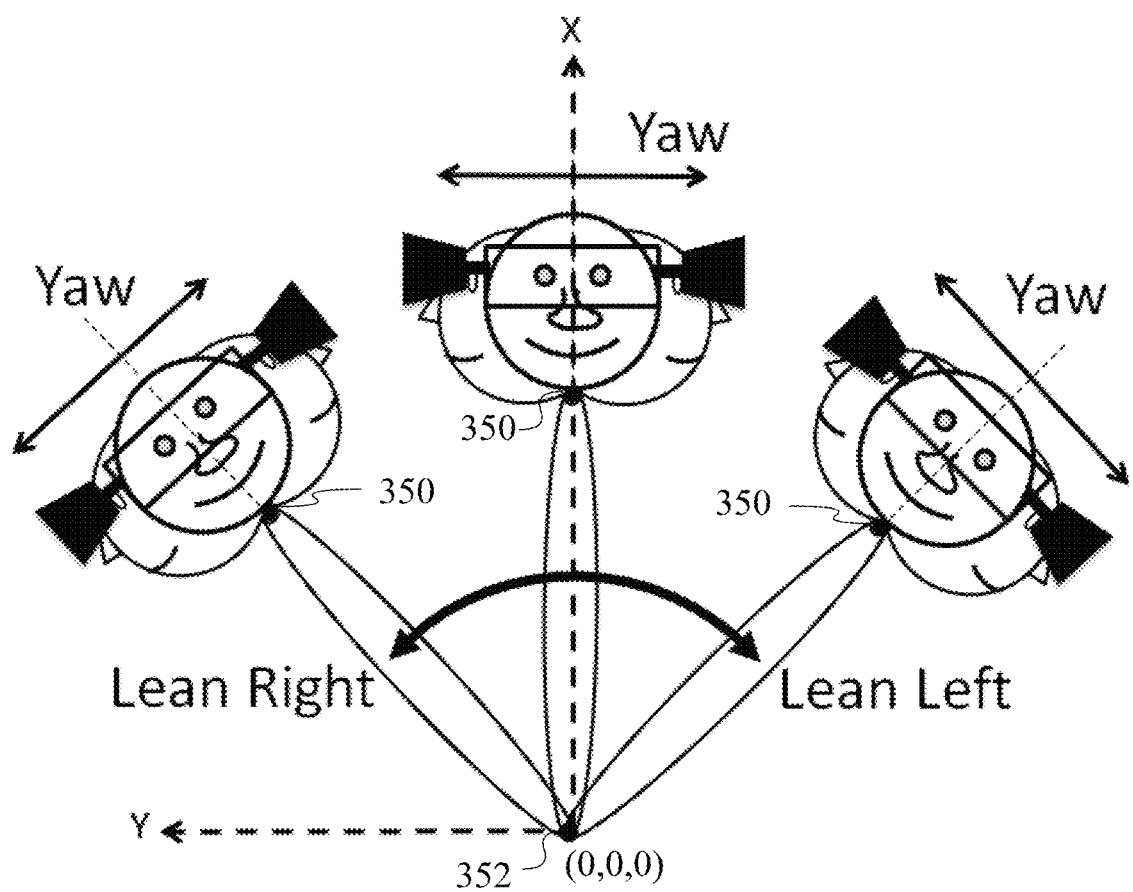

FIG. 17 shows the Yaw rotation of the head of the user with respect to the canonical position of FIG. 13, compounded by the leftward/rightward rotation of the torso around Z-axis.

Figure 18:
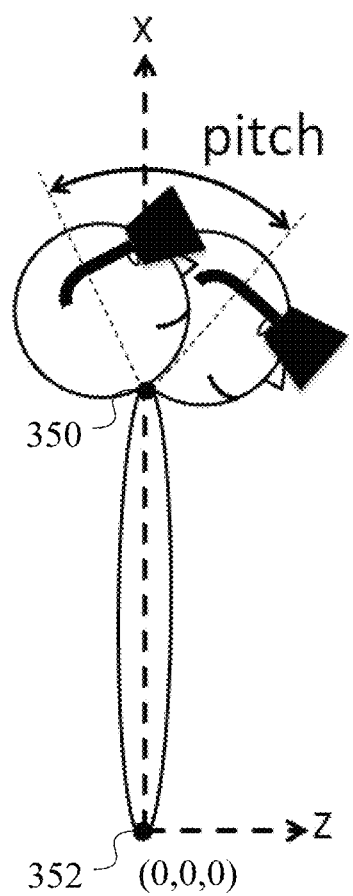

FIG. 18 shows the Pitch rotation of the head of the user with respect to the canonical position of FIG. 13, compounded by the inward/outward rotation of the torso around Z-axis.

Figure 19:
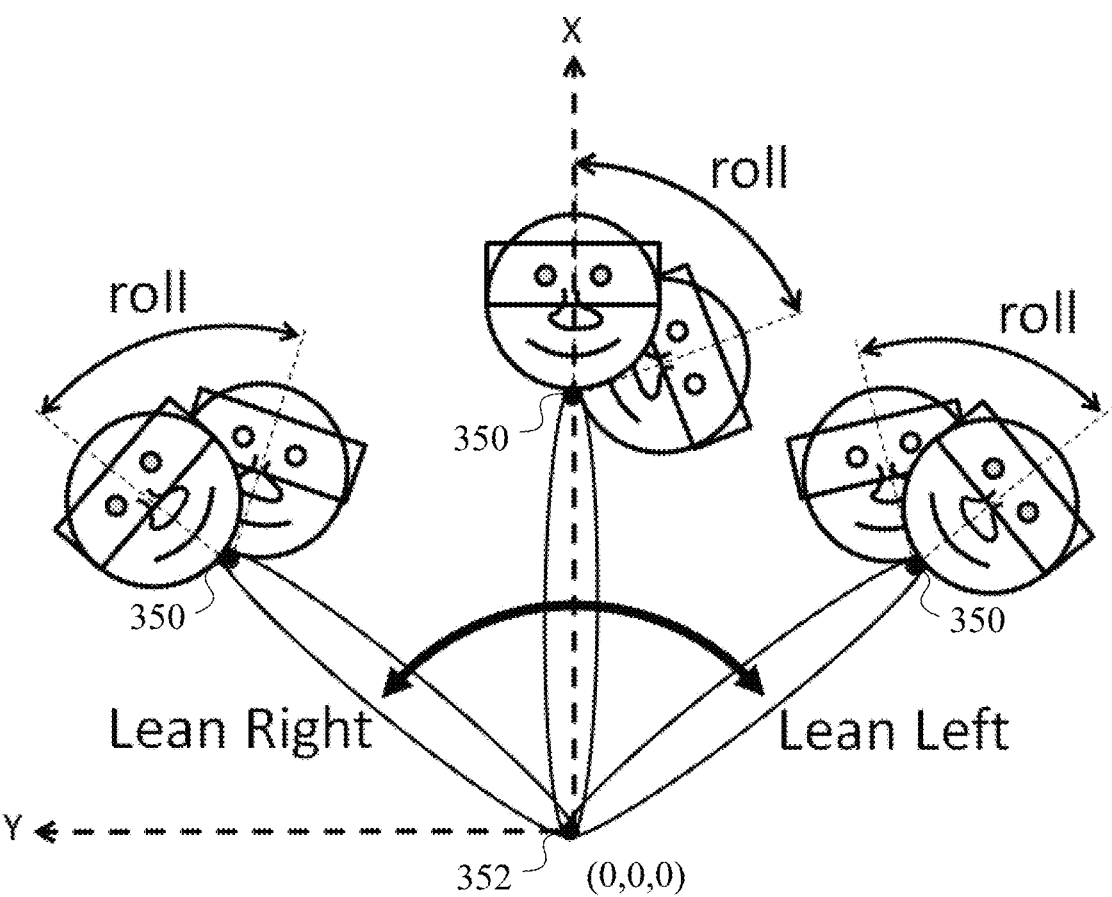

FIG. 19 shows the Roll rotation of the head of the user with respect to the canonical position of FIG. 13, compounded by the leftward/rightward rotation of the torso around Z-axis.

Figure 20A:
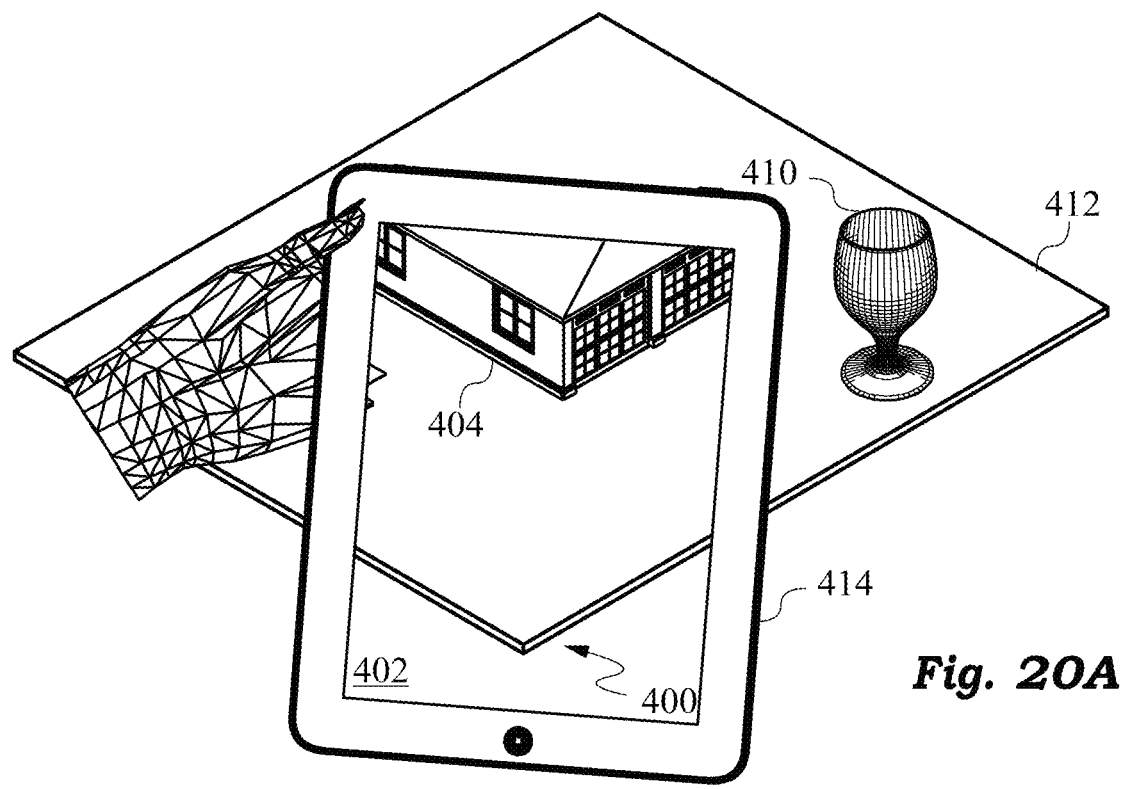
Figure 20B:
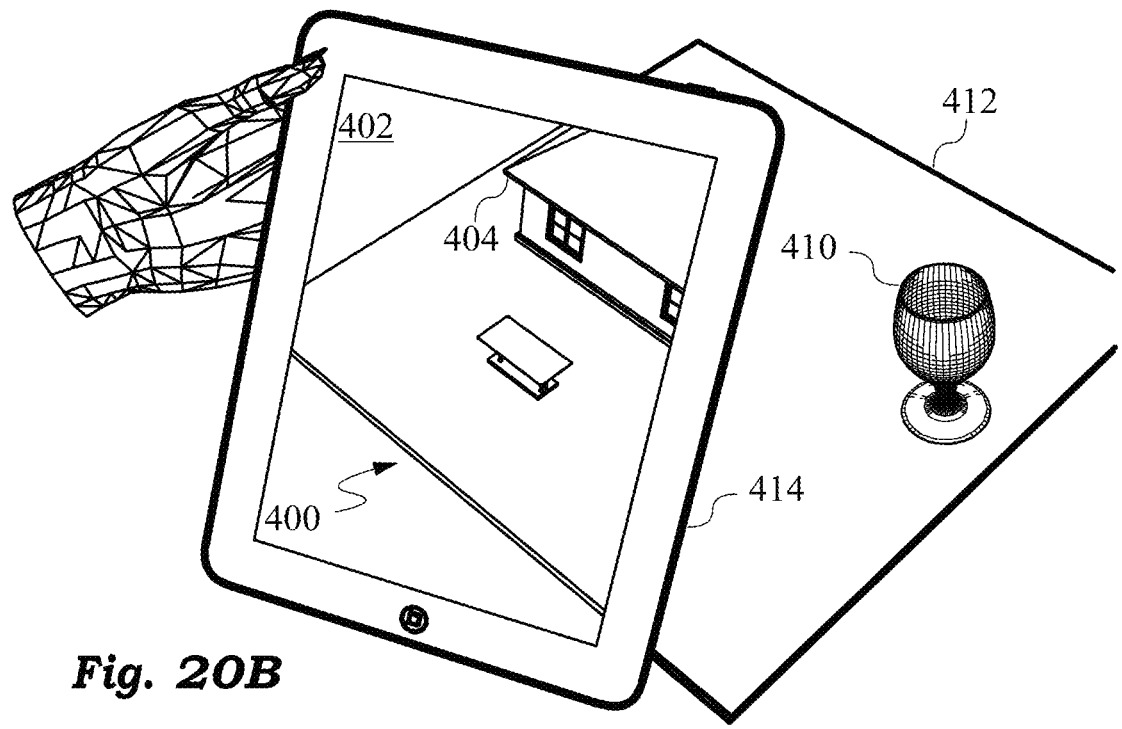

FIG. 20A-B illustrate the window method of viewing an environment comprising of real and virtual objects. The example illustrated uses the screen of a tablet device for the window method.

Figure 21A:
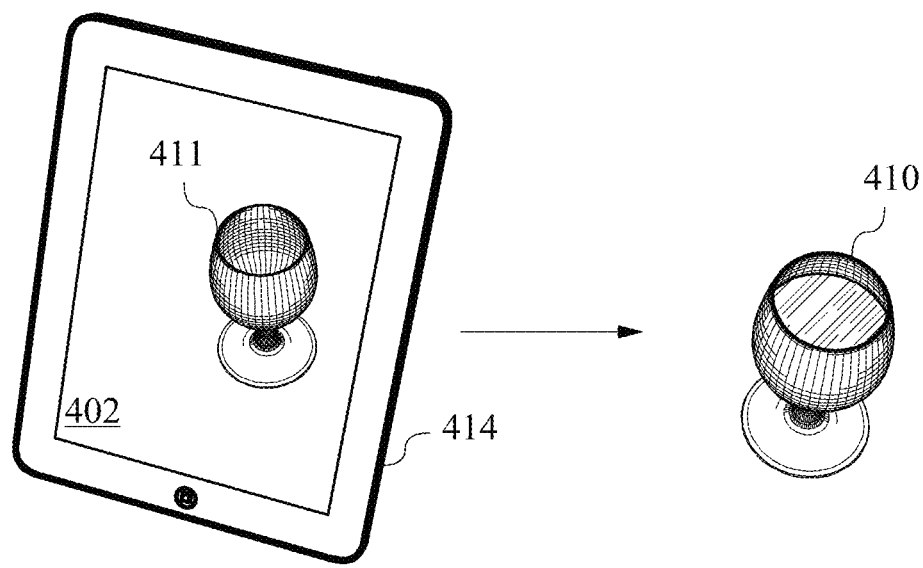
Figure 21B:
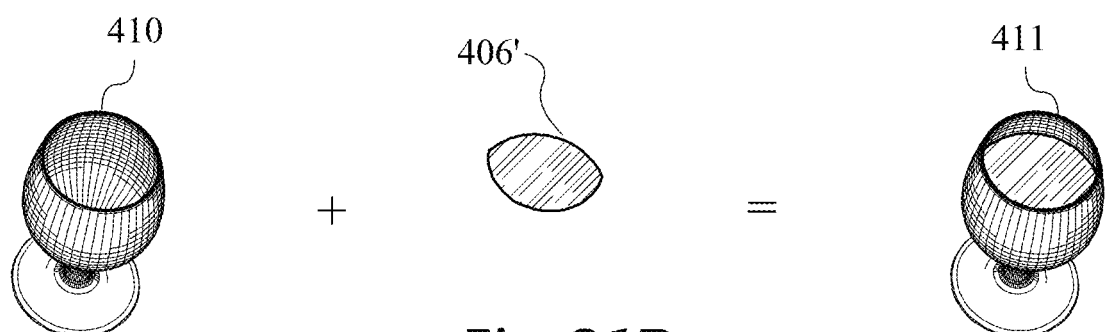
Figure 21C:
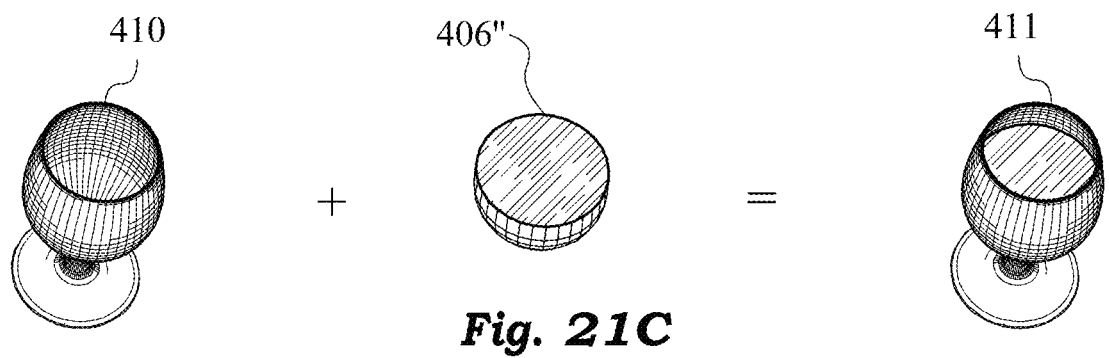

FIG. 21A-C illustrate how a real wine glass from the environment illustrated in FIG. 20A-B may be filled with virtual wine to render a virtually filled wine glass.

Figure 3B:
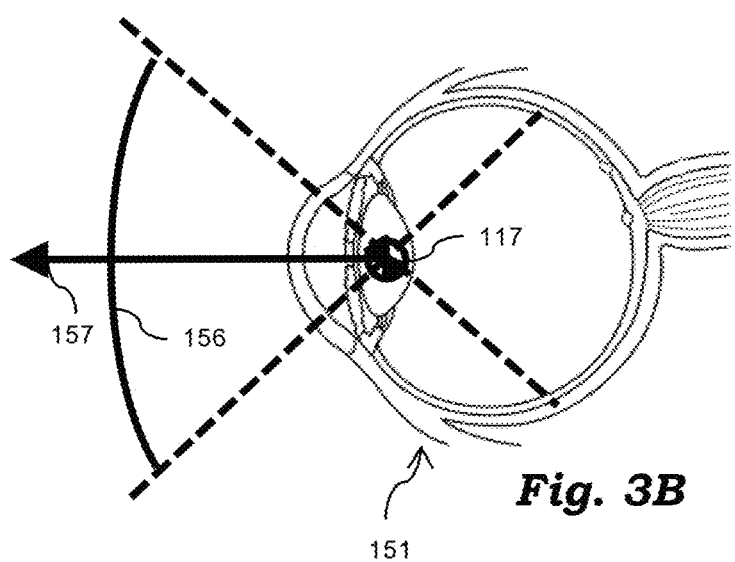
FIG. 3B shows a representation of an eye behind the eyeglasses of the embodiment of FIG. 3A.
Figure 3A:
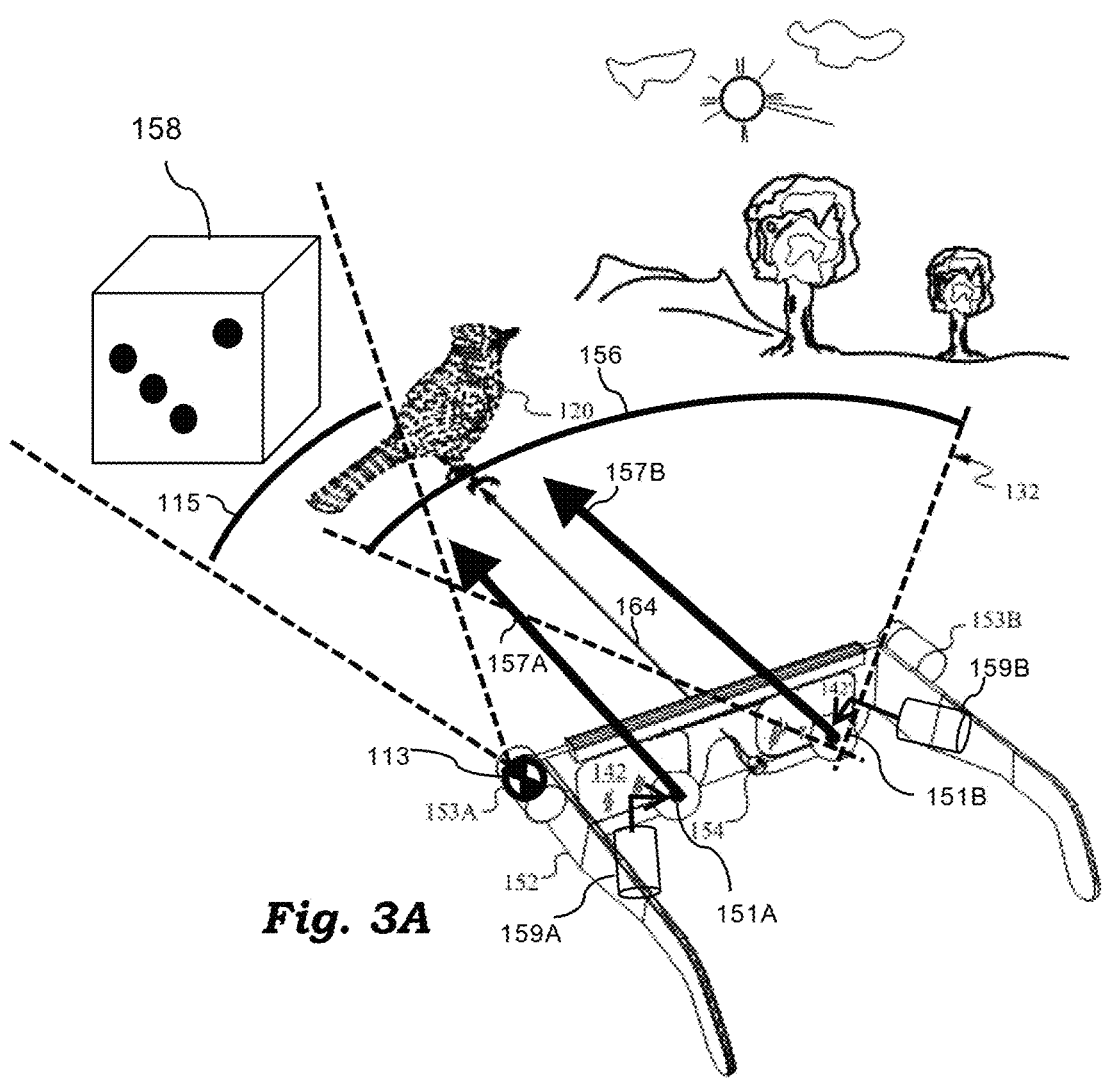
FIG. 3A shows another environment projected onto augmented or mixed reality eyeglasses having inside-out cameras. The projected environment comprises both real and virtual objects.
Figure 22:
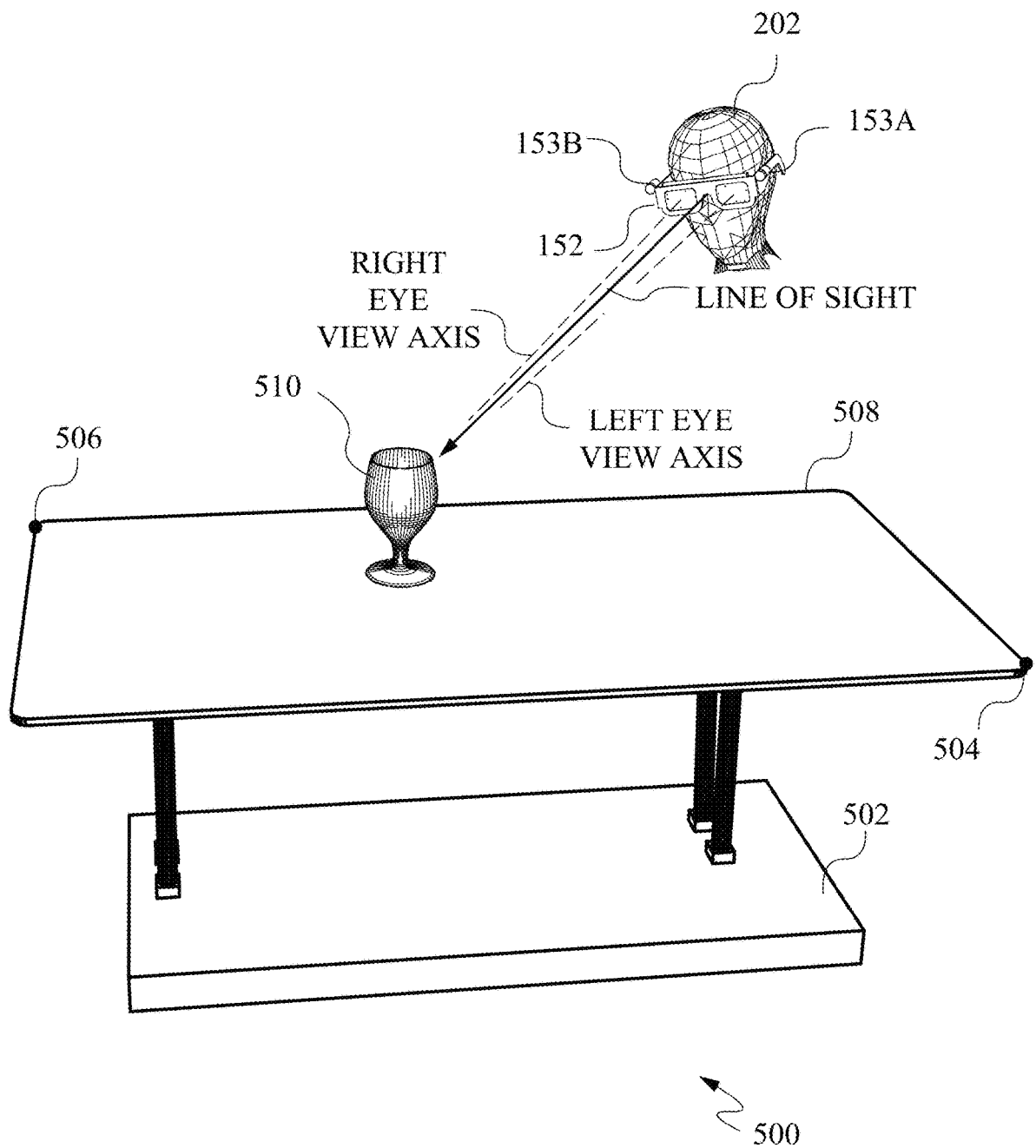

FIG. 22 illustrates the line of sight and left and right eye view axes of a user wearing the eyeglasses of FIG. 3A to view a wine glass in yet another environment.

Figure 23A:
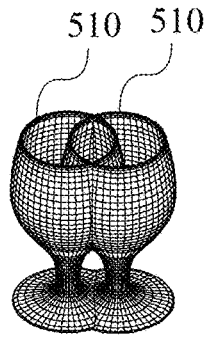
Figure 23B:
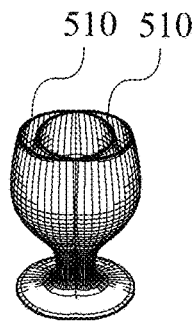
Figure 23C:
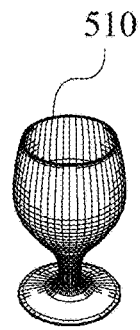

FIG. 23A-C illustrate how the wine glass of FIG. 22 may be seen by the user when the optometry/parallax problem is not addressed, poorly addressed and properly addressed respectively.

Figure 24:
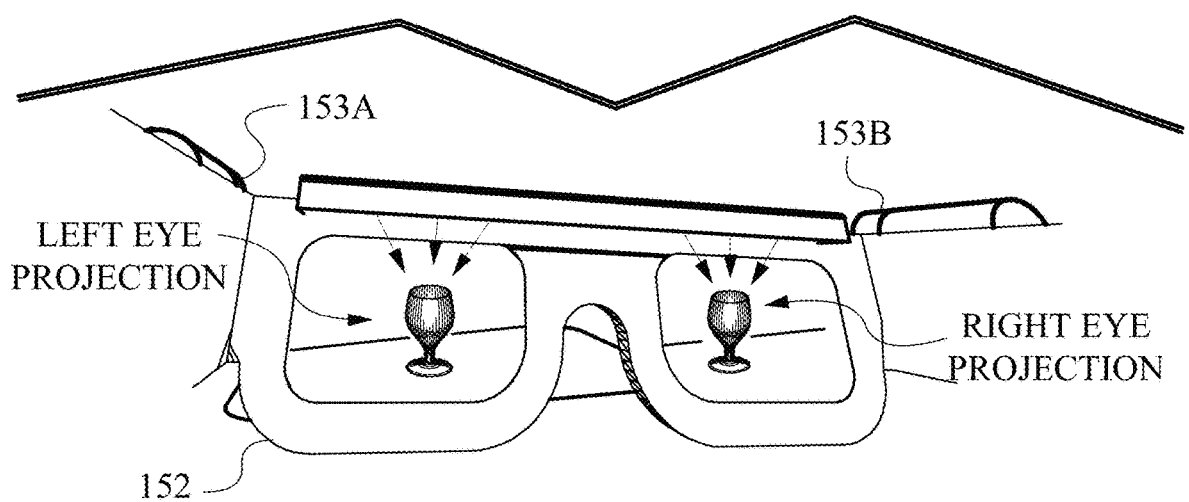

FIG. 24 shows what the user of FIG. 22 would see in his/her left and right eye views of the eyeglasses while viewing the wine glass.

Figure 25:
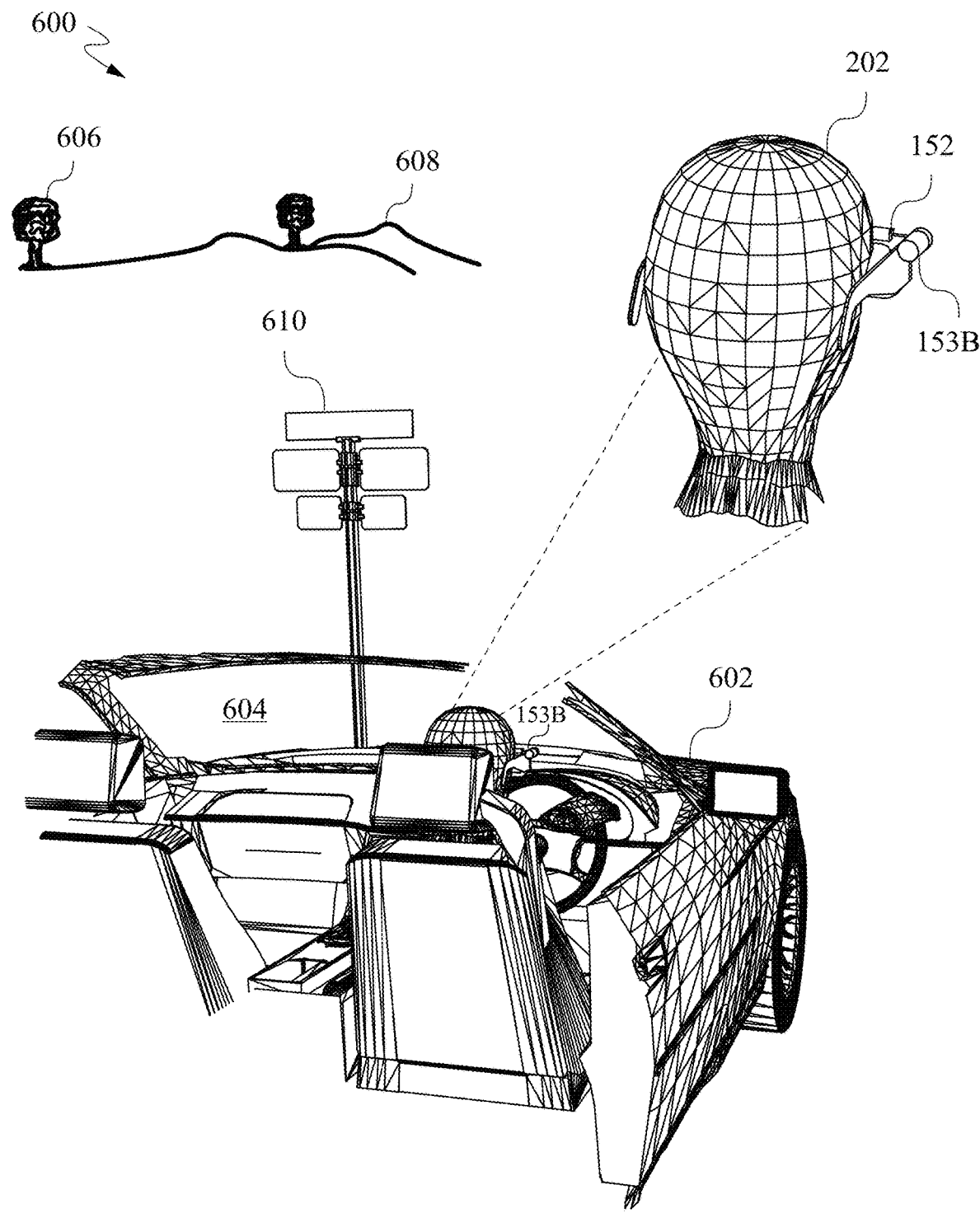

FIG. 25 illustrates yet another environment comprising real and virtual objects. The example illustrated shows the user wearing the eyeglass of FIG. 3A driving a car through which he/she observes the environment projected onto the windscreen and/or onto the optics of the eyeglasses.

Figure 26:
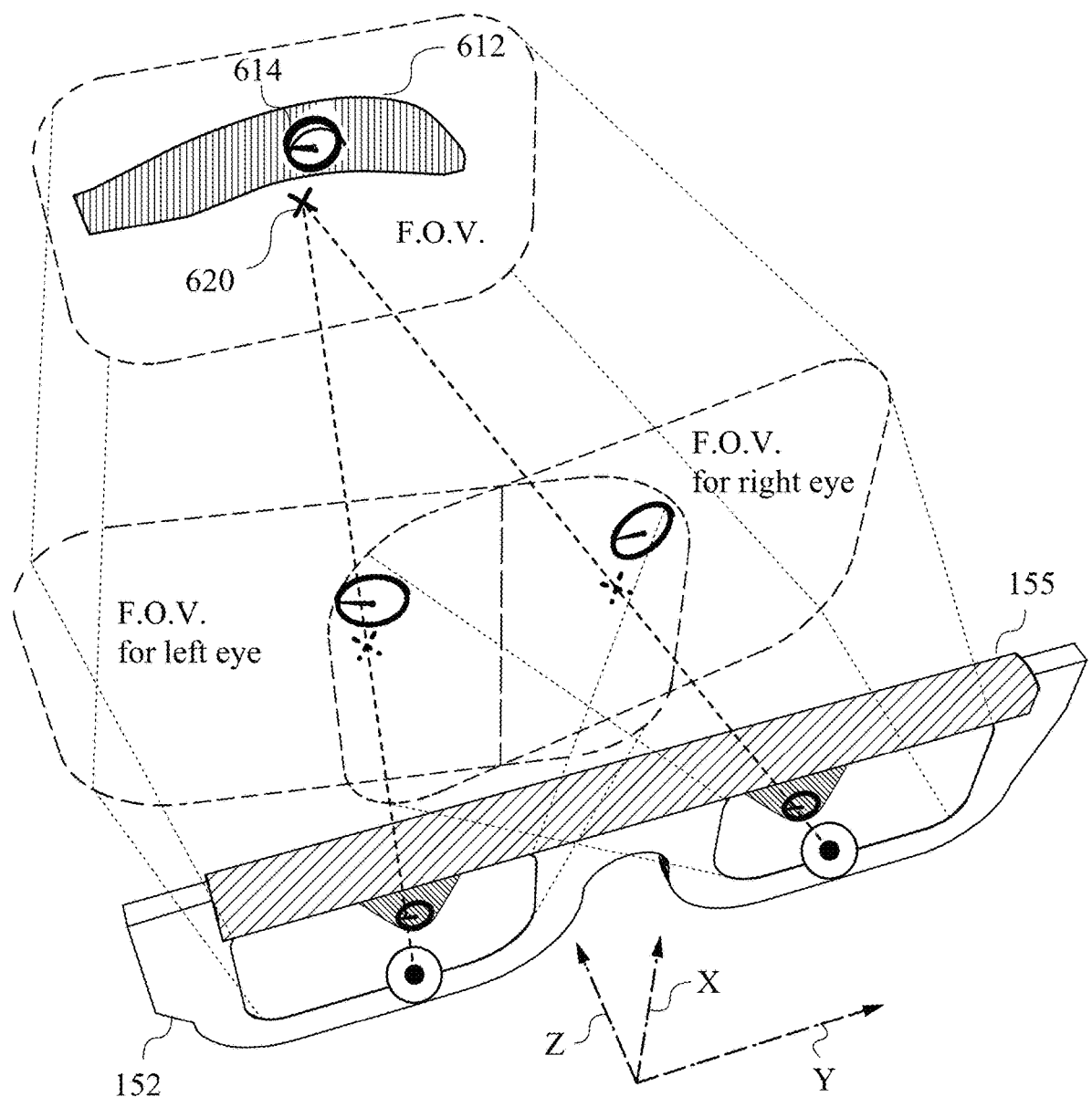

FIG. 26 shows the left and right fields of view of the user from an embodiment of FIG. 25 while seeing objects in the near field and while seeing objects far away (i.e. when he/she is "focused at infinity").

Figure 27A:
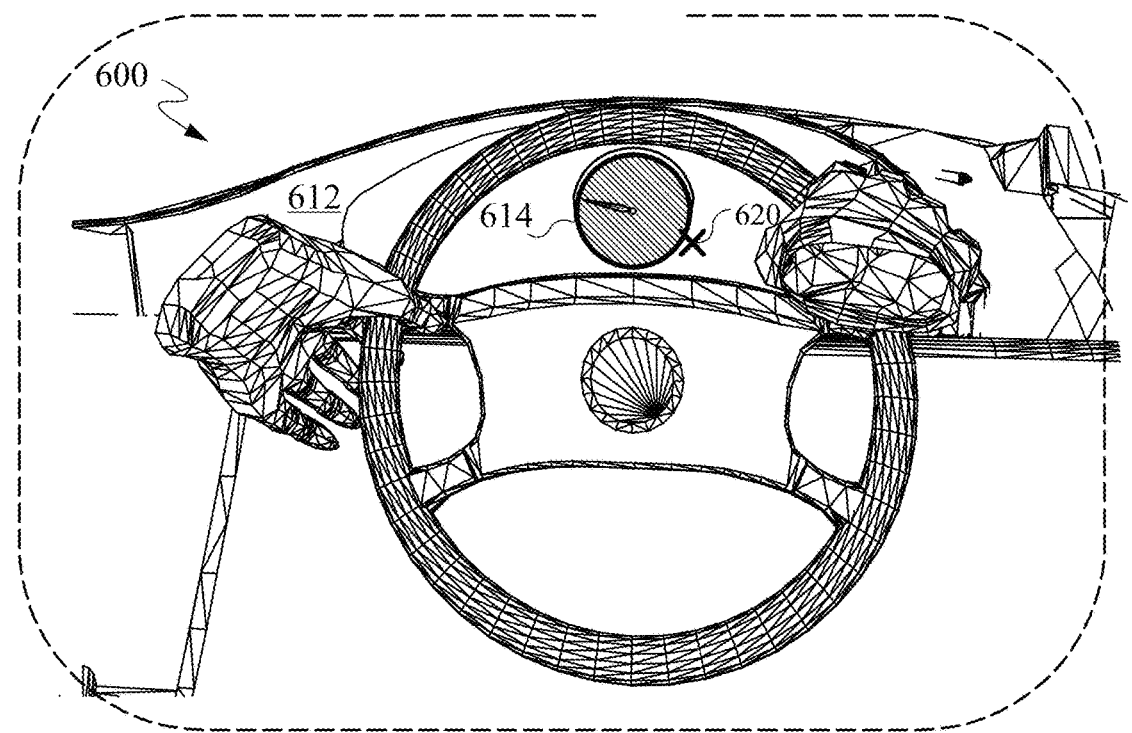
Figure 27B:
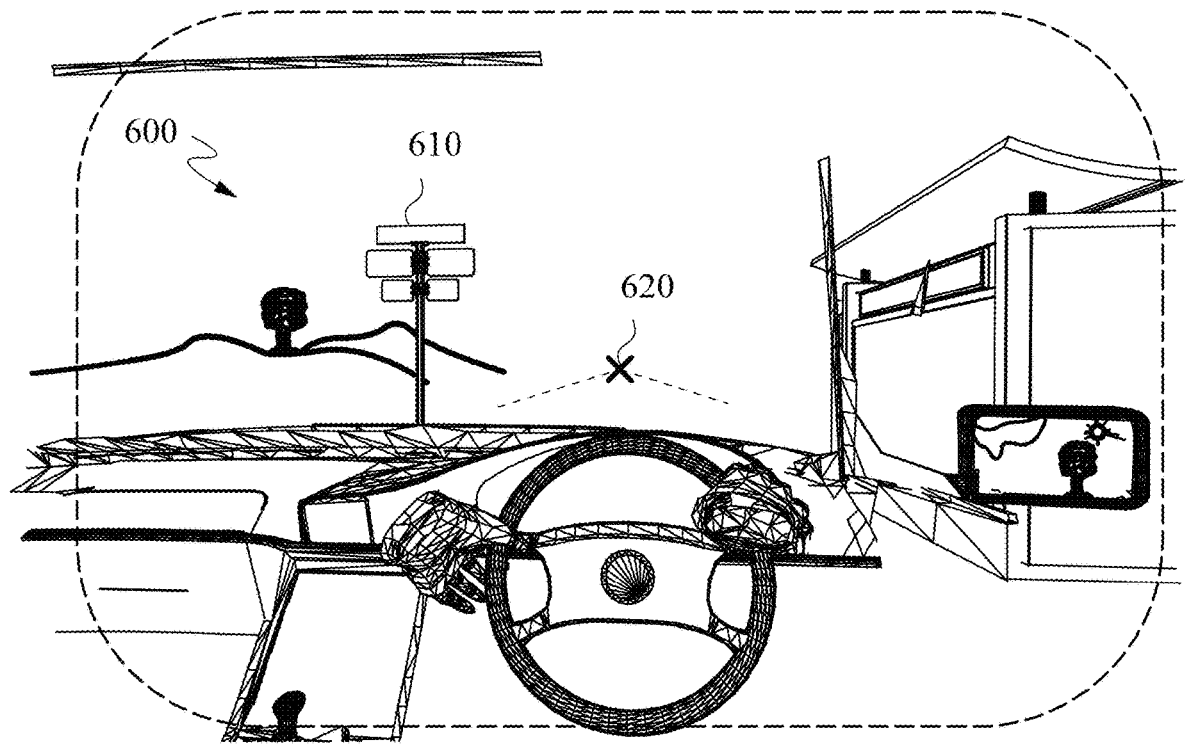

FIG. 27A-B illustrate another view of the objects in the near field and far away as observed by the user of FIG. 26.

Figure 28A:
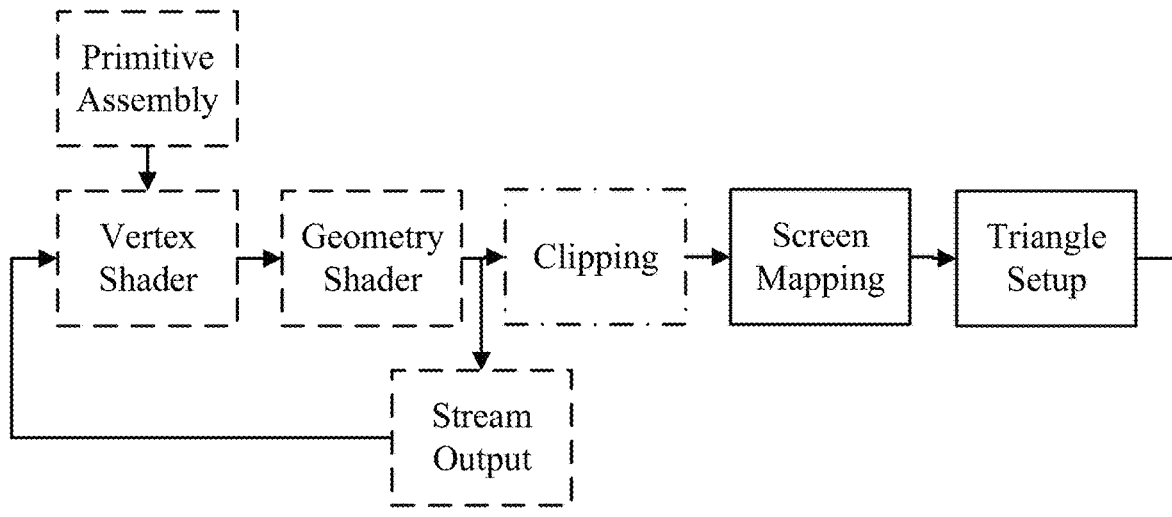

FIG. 28A shows the generic implementation of a graphics rendering pipeline, showing fixed functionality with solid line boxes, configurable functionality with dot-and-dashed line boxes, and programmable functionality with dashed line boxes.

Figure 28B:
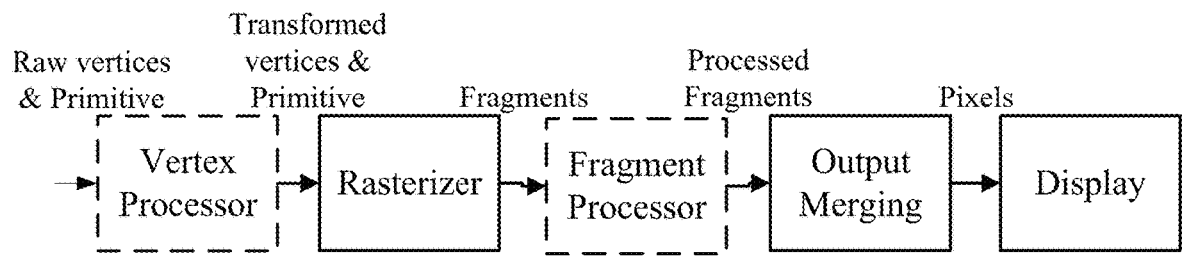

FIG. 28B shows a simplified implementation of the graphics rendering pipeline as provided by OpenGL.

Figure 28C:
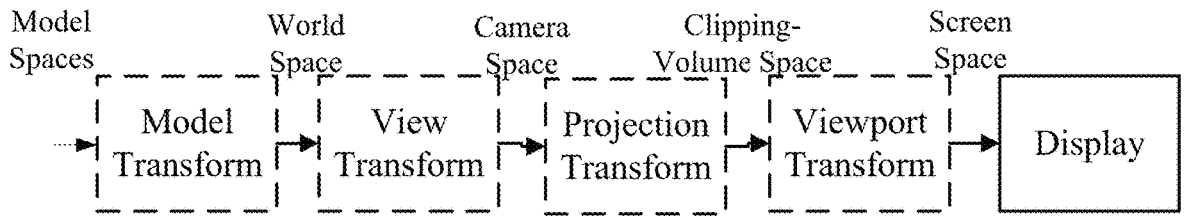

FIG. 28C shows the four transformations typically involved in a graphics rendering pipeline: model, view, camera and viewport.

Figure 2:
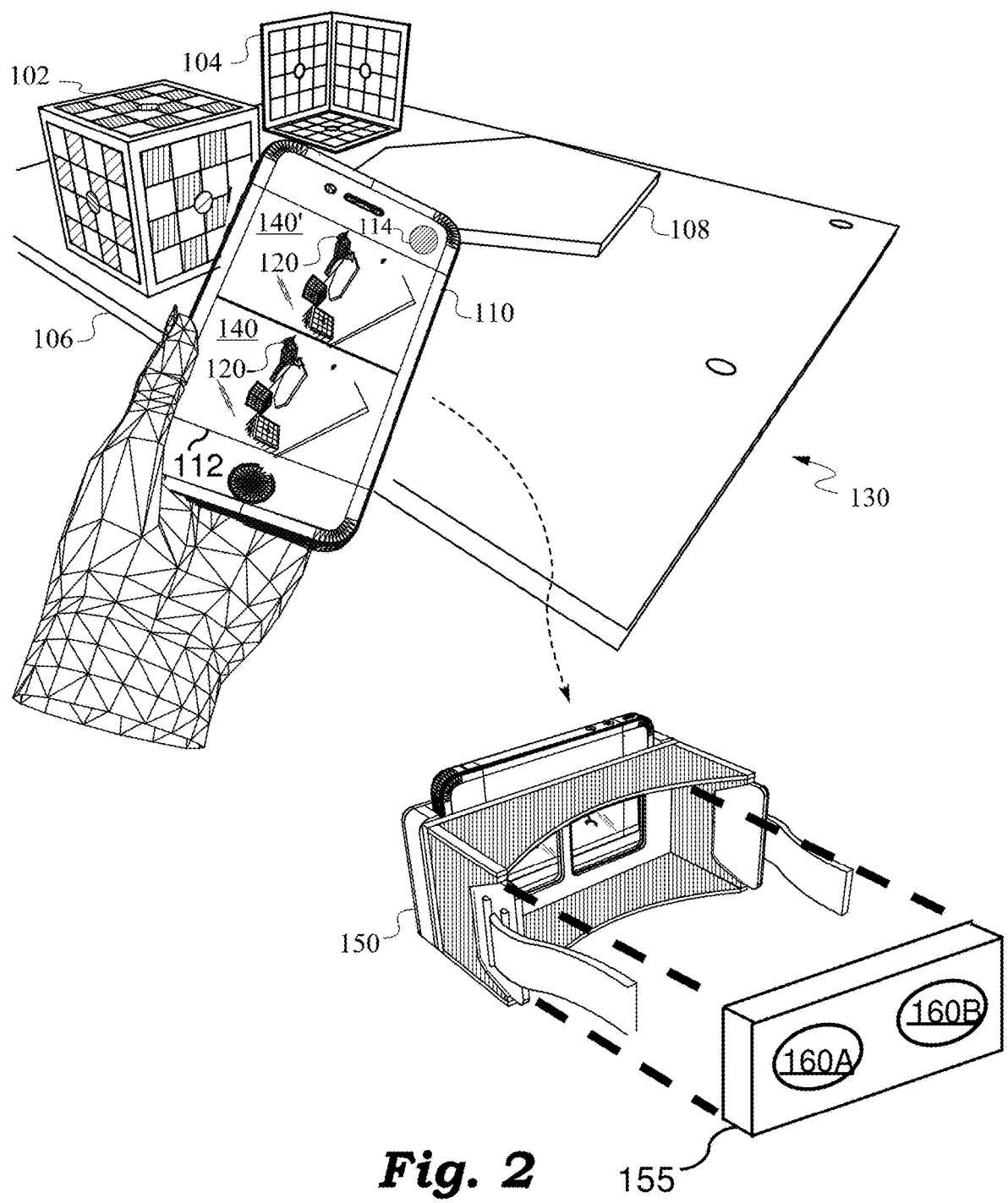
FIG. 2 shows a variation of FIG. 1A where the smartphone is accommodated into a head-mounted display and where the projected/displayed environment consists of left and right eye views for stereo vision of the user.
Figure 29:
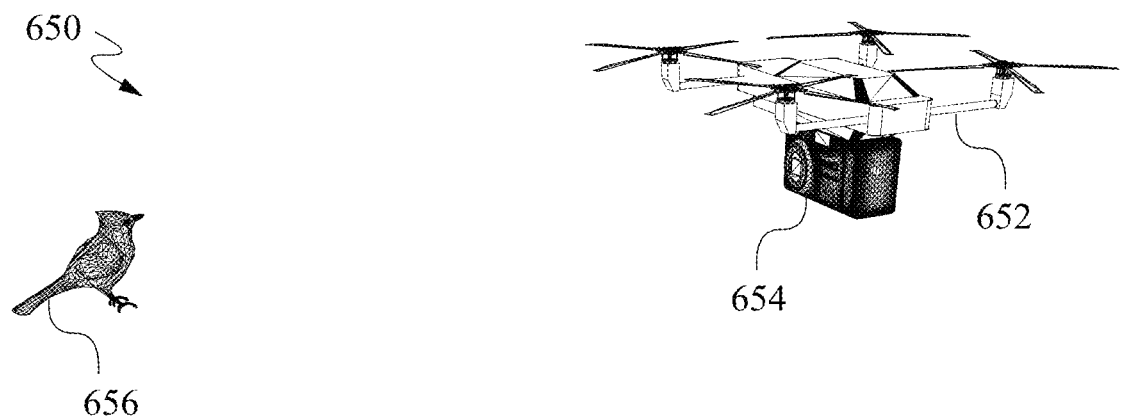
Figure 29:
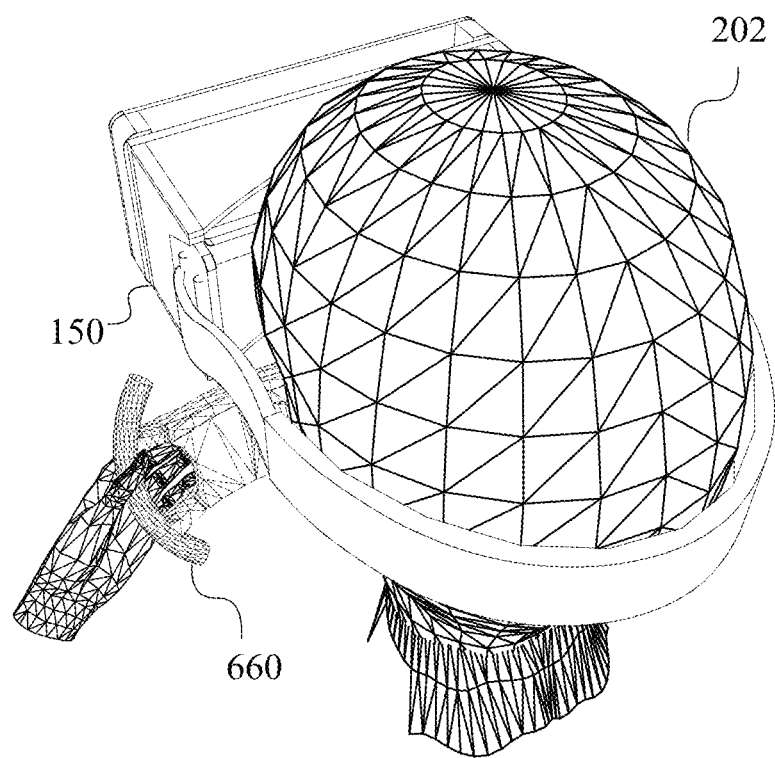

FIG. 29 illustrates the user wearing the headworn gear of FIG. 2 for observing yet another environment but this time from the viewpoint of a remotely controlled device which is a drone in the example shown.

Figure 30:
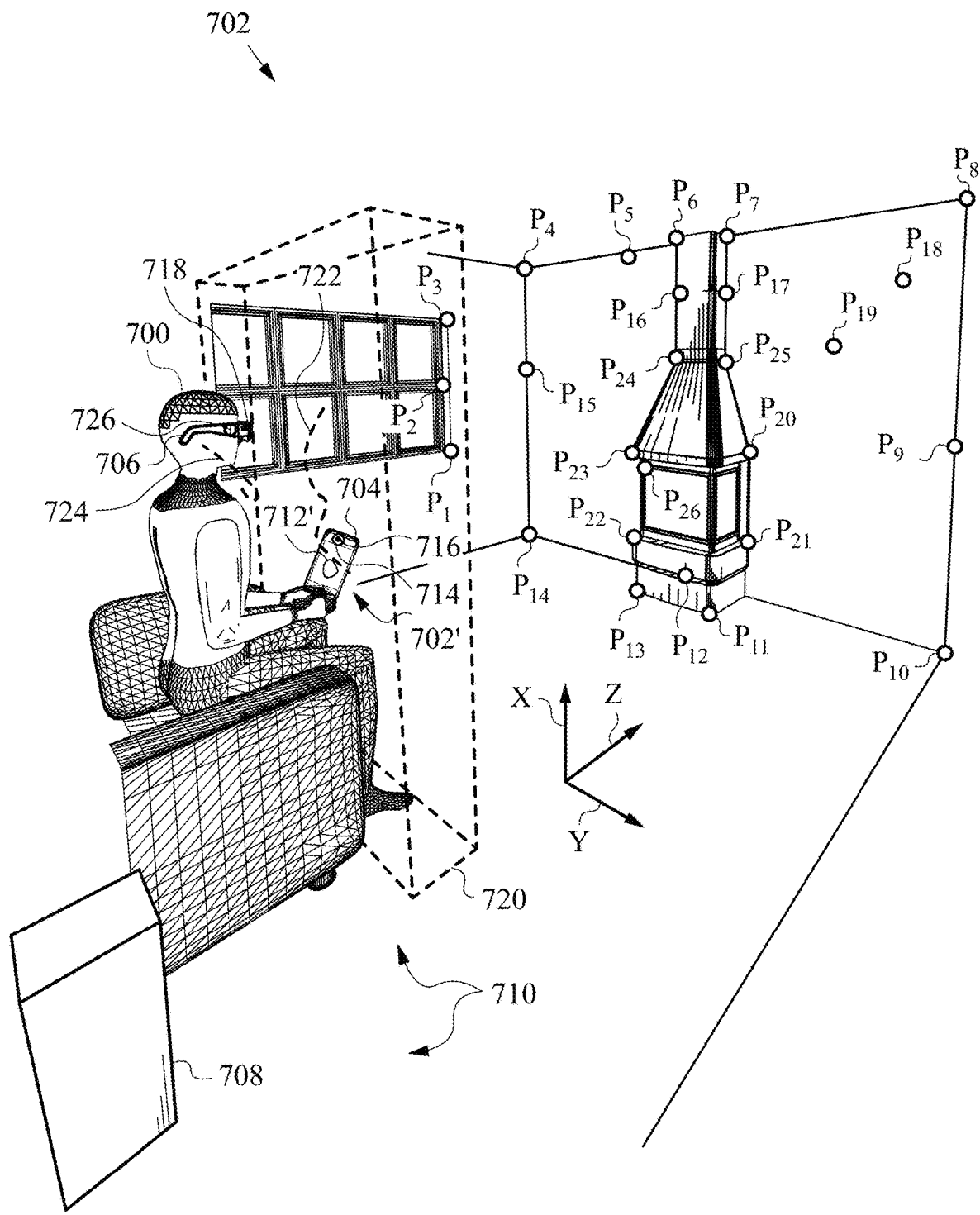

FIG. 30 illustrates a system for viewing and interacting with an augmented reality deploying a reduced representation of the pose.

Figure 31:
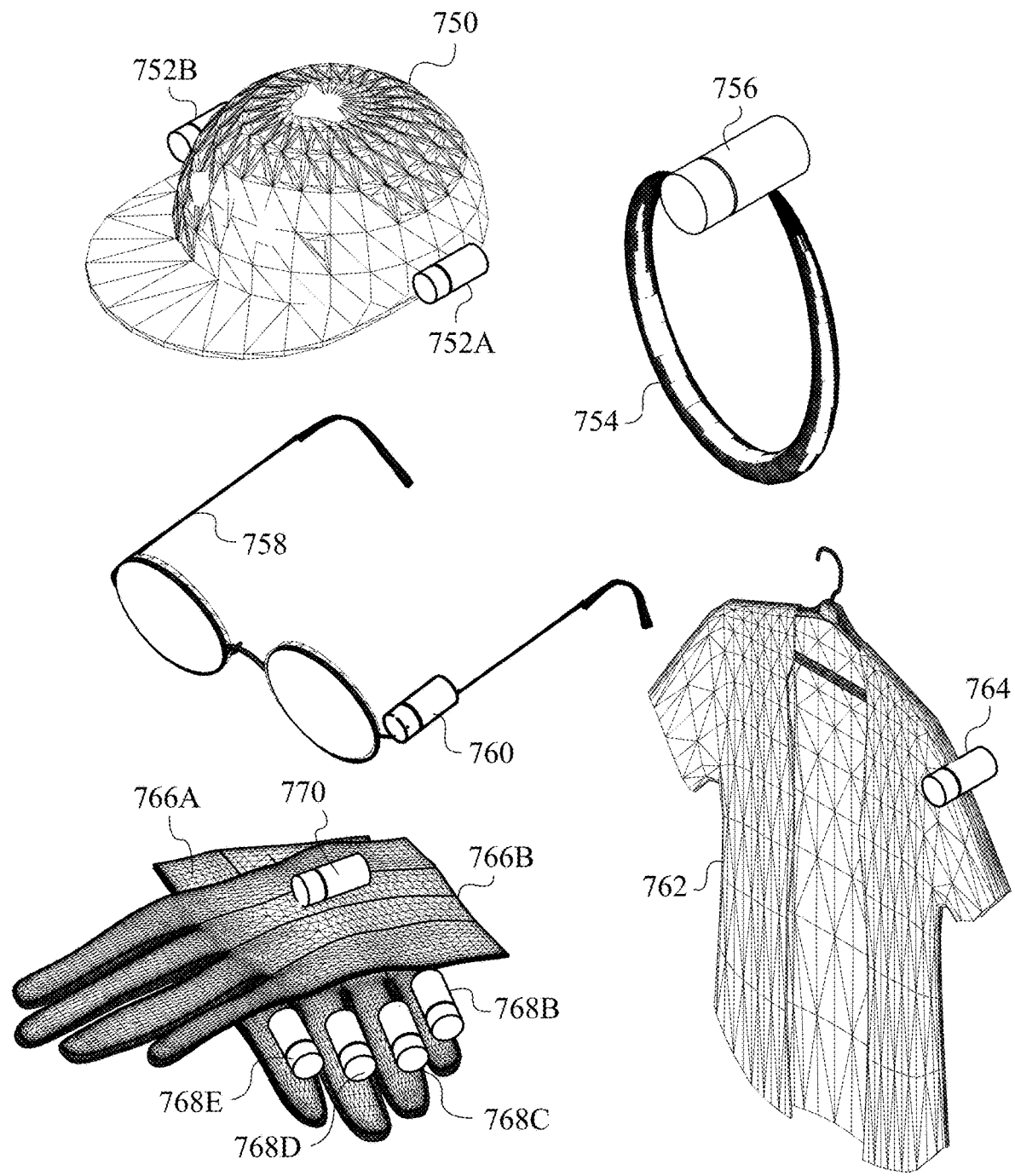

FIG. 31 shows a number of exemplary control devices equipped with inside-out device cameras.

Figure 32:
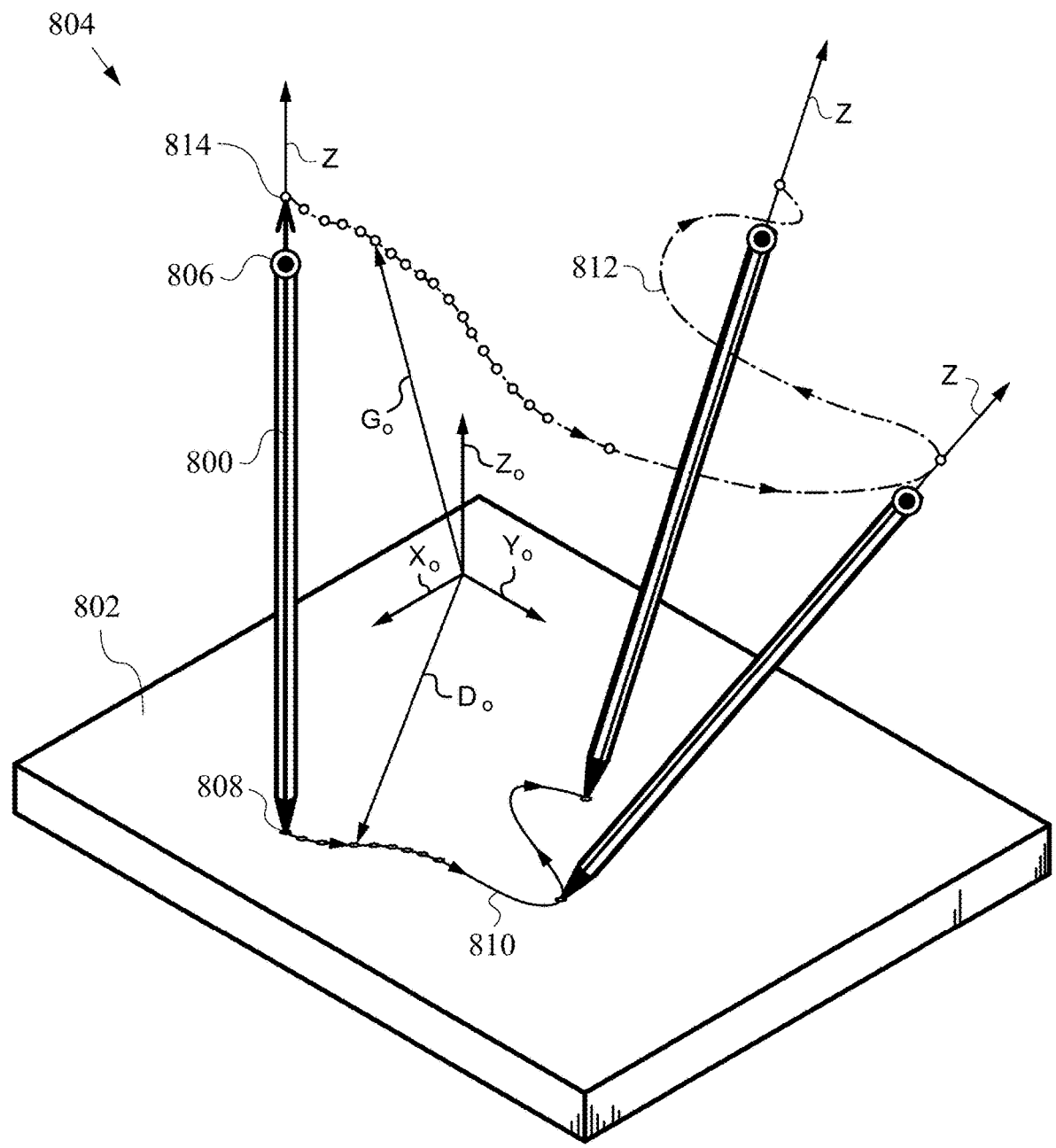

FIG. 32 shows the application of a stylus or digital pen as the control device for interaction in an augmented, virtual or mixed reality.

Figure 33:
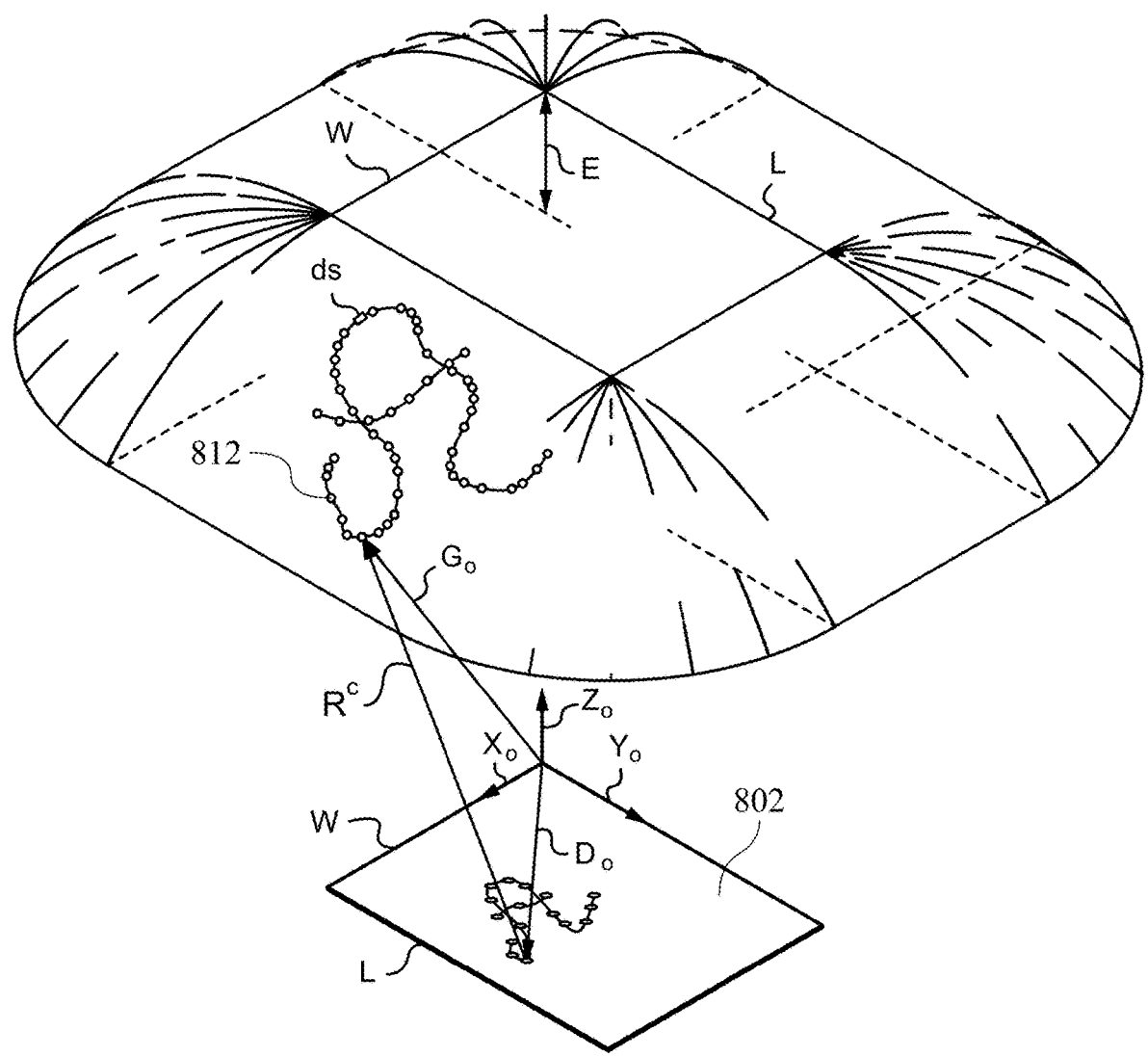

FIG. 33 illustrates the relationship between reduced representation and consonant motion for the stylus or digital pen of FIG. 32.

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1A:
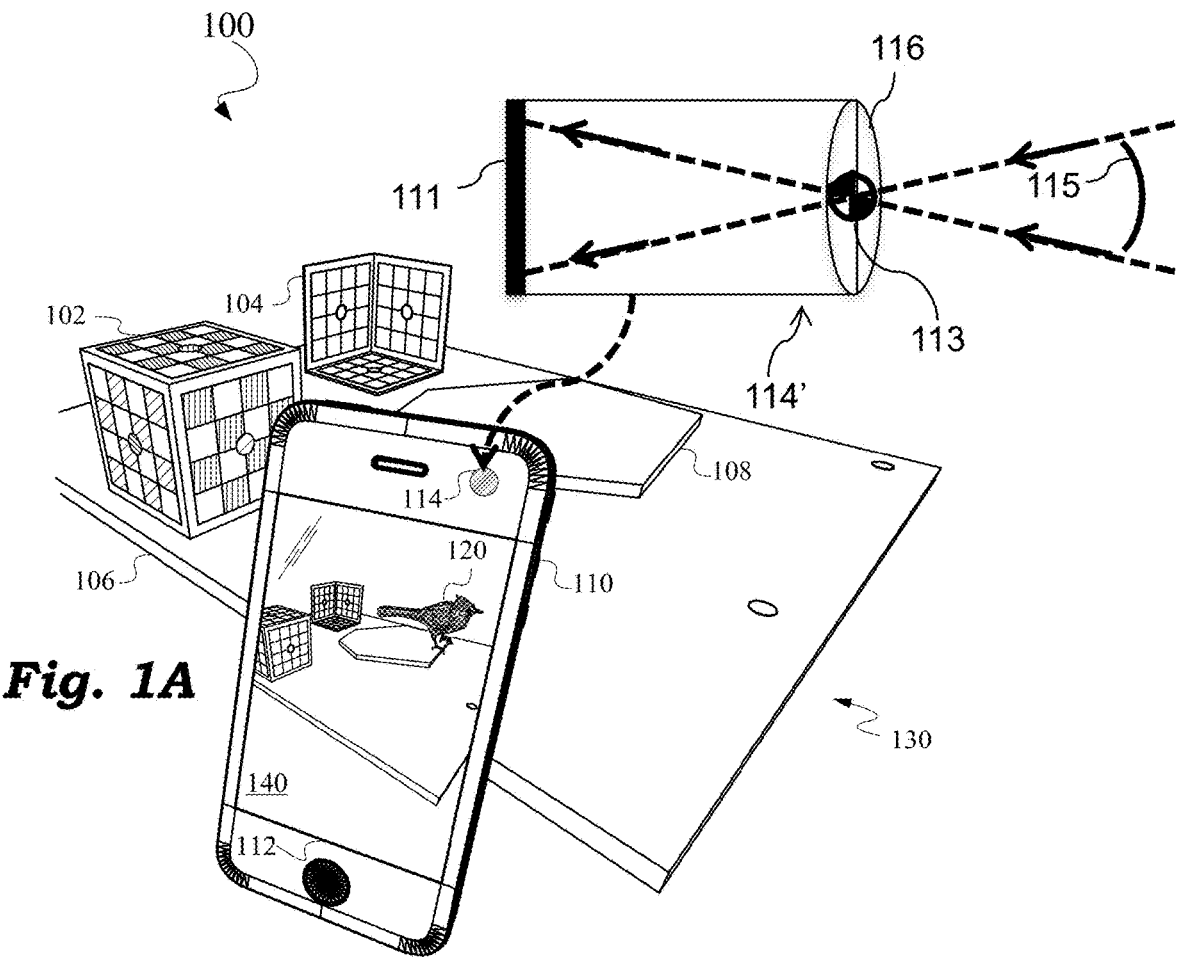
FIG. 1A illustrates an environment/scene projected on the display of a smartphone. The environment as projected comprises both real and virtual objects.

The various aspects of the invention will be best understood by initially referring to system 100 containing an environment 130 as shown in FIG. 1A. Environment 130, which could be indoor or outdoor, comprises real world objects which could be any objects. In the example shown in FIG. 1A two such objects 102 and 104 are shown and these objects are two cubical dices. Object 106 is a plate or a platform and object 108 is another plate or platform smaller in size than plate 106 and placed on top of it.

Environment 130 also shows a mobile phone 110 with a viewing mechanism or screen or display 112 and an inside-out camera 114. The schematic diagram of camera 114 is shown as 114'. Schematic 114' illustrates how camera lens 116 projects the images of real world objects 102, 104, 106 and 108, or any other objects that may lie within the camera's angular field-of-view 115 onto photo-sensor 111. These objects are projected through a single viewpoint 113 of camera 114. Objects 102 and 104 are configured to contain features convenient for calculating the pose of camera 114 with respect to the stable environment 130.

The pose thus recovered may then be used to alter the appearance of virtual object 120 to correspond with any changes occurring in the pose of camera 114 as mobile phone 110 is moved by the user to different poses within stable environment 130. It should be noted that while the present embodiment depicts a single viewpoint 113, the present invention is capable of working with similar embodiments in less than ideal conditions of a strictly single viewpoint. In other words, the present teachings, and the pose recovery techniques of the related references that the present invention utilizes, can work in the presence of some image aberration if viewpoint 113 was a little "smeared out".

Although inside-out-camera 114 in the example shown in FIG. 1A is embodied into mobile phone 110, the invention admits of any other type of camera, professional or amateur, stand-alone or otherwise, that is capable of performing the functions of an "inside-out" camera as will be explained further below. Similarly, viewing mechanism 112 of mobile phone 110 is its display unit/screen, however in alternative embodiments the invention admits of having any other type of viewing mechanisms, including eyewear and lenses as will be further taught below.

As shown in FIG. 1A, environment 130 is projected/displayed on viewing mechanism 112 of mobile phone 110 having inside-out camera 114. It should be noted that camera 114 is facing the far side of mobile phone 110 as indicated by its hatched pattern i.e. it faces real world objects 102, 104, 106, 108 and into the page of FIG. 1A. Environment 130 can also have any number of virtual objects. In the example of FIG. 1A one such virtual object 120 is shown. Virtual object 120 can be any object that is viewed on display 112 by the user (not shown) from the camera's viewpoint or vantage point. In the example shown in FIG. 1A, virtual object 120 as viewed on display 112 by the user (not shown) from viewpoint 113 of inside-out camera 114, is a bird.

As shown in FIG. 1A, virtual bird 120 is layered onto environment 130 on display unit/screen 112 of phone 110, and is displayed/projected as composite environment or rendering 140. We refer to composite environment 140 comprising of real world objects 102, 104, 106, 108 and at least one virtual object 120, as an augmented/mixed reality scene/image/environment/reality 140. Although one such virtual object 120 is used in the present example, the invention admits of any number and types of virtual objects present in the augmented/mixed reality scene/image/environment/reality 140.

As will be further explained below, the mixed reality scene may be viewed from two viewpoints of reality 140 illustrated in FIG. 2, one without the prime "'" for the left eye i.e. 140 and one with the prime i.e. 140' for the right eye. Since environment 140 and 140' are actually rendered onto display 112 and are thus properly considered as renderings. For clarity in this disclosure we will use the term environment or scene or reality to refer to these and other such renderings, or use the terms interchangeably where convenient.

The above two viewpoints for the left and right eyes may be created synthetically by knowing the positions of the user's eyes with respect to the inside-out camera's viewpoint 113. Then optical projection system 155 (shown disassembled from head-mounted display (HMD) 150) is used to project the image information from two viewpoints emanating from different regions of display 112 onto the user's respective retinas. In some cases, optical system 155 may simply comprise two lenses 160A and 160B as shown in FIG. 2. Lenses 160A and 160B are positioned between the display and the user's eyes, thereby producing focused images of the respective regions of the display associated with each eye onto the user's left and right retinas.

It should be noted that in the above example, even though smartphone 110 has only one camera 114, we are still rendering both left and right images in the display via the two synthetically created viewpoints. Virtual objects, such as virtual object 120, can be rendered correctly in both the left and right display, but the real scene is captured only through viewpoint of camera 114. This may not be sufficient for creating a 'true' stereo image. In order to render the real world objects for a true stereo vision, one must have two cameras corresponding to left and right eyes, or camera 114 must capture depth information, image disparity or a similar property allowing stereoscopic rendering.

Thus camera 114 can be a stereo camera or depth camera. Alternatively, camera 114 can be a conventional camera capturing a sequence of images of the same scene from slightly different viewpoints. Indeed, in an interesting variation of the embodiment shown in FIG. 2, instead of one camera 114, smartphone 110 has two cameras placed apart the same distance as average human eyes i.e. at an average inter-pupillary distance. Such a variation will be able to produce a true stereo vision for the user.

A second inside-out camera may also be employed to increase the collective field-of-view for gathering the images of real world objects. Additionally, the second inside-out camera may be used for providing auxiliary pose information that may be required in cases when the particular real world objects that contain features convenient for calculating the pose (i.e., objects 102 and 104) lie outside the field-of-view of the first inside-out camera.

Figure 1B:
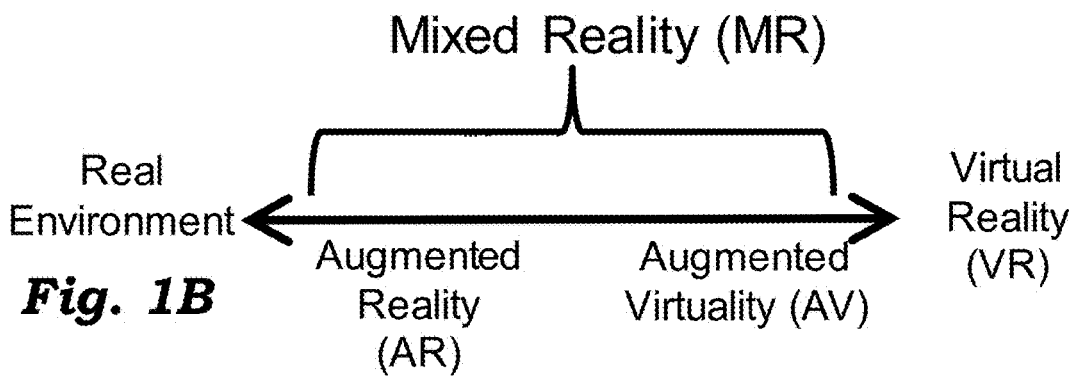
FIG. 1B shows the Mixed Reality continuum extending from real environments to purely virtual environments.

As understood in the art, a mixed reality (MR) refers to a system that combines real and virtual objects and information that may be fused or layered together to give the viewer an enhanced viewing experience, compared to just the virtual reality or purely real or real reality environments. As shown in FIG. 1B the "mixed reality continuum" extends from a purely real environment to a purely virtual environment. A given scene/image/environment/reality may be purely real when no augmentation/virtuality is present, to augmented reality (AR) when some augmentation/virtuality is present to augmented virtuality (AV) when even more augmentation/virtuality is present (i.e. when real objects are superimposed onto an otherwise virtual scene) to purely virtual reality (VR) when the scene/image/environment/ reality becomes purely virtual.

As used in this disclosure the terms scene, environment, image, rendering and reality may be used interchangeably to represent a scene or a sequence of scenes being observed by a user of the system, and any distinction will be drawn as and if needed. Also, the distinction between VR, AR, MR may be drawn only as needed knowing that the principles of the invention apply to any scene or environment observable through a viewing mechanism in concert with inside-out camera(s) and associated elements of the system as taught in this disclosure.

Recovering three dimensional (3D) pose (position and orientation) of manipulated, worn or remotely controlled objects is a hard problem. There are two approaches that choose fundamentally different camera placements to achieve this purpose. The outside-in camera method places camera(s) in the environment to track the user's/viewer's VR/AR/MR gear. The inside-out camera method places one or more cameras on the user's/viewer's VR/AR/MR gear to track the pose of the user/viewer based on the same rules of perspective geometry as humans apply naturally.

The pose of the inside-out camera can be recovered from certain features of objects in the environment that lie within the field-of-view of the inside-out camera. The pose of the inside-out camera can then be transformed into a new pose corresponding to a different camera orientation and/or a different camera position. That is often useful for projecting virtual images onto a user's retina corresponding to the different viewpoints of each the user's eyes while viewing a scene.

For systems having stereoscopic displays (i.e. using a different region of the display for each eye), it is useful to know the position and orientation of the user's eyes (i.e. the pose of each eye) with respect to the pose of the inside-out camera. That is in order to facilitate the calculations of the absolute pose of each eye (with respect to the environment), and for projecting virtual objects that are displayed properly to each eye for stereoscopic vision of the virtual objects.

The above can be accomplished by coordinate transformations that take advantage of the knowledge of the spatial relationships between the inside-out camera and the user's eyes. In some cases, multiple inside-out cameras may be used to provide a larger combined field-of-view (i.e., one inside-out camera facing forward and a second inside-out camera facing backward) to insure that real world objects having certain features convenient for recovering pose are always within the field-of-view of at least one of the inside-out cameras. With the inside-out camera techniques as employed by the instant invention, instrumentation of the environment is not a requirement.

For a detailed treatment of pose recovery techniques using an inside-out camera, the reader is referred to U.S. Pat. Nos. 7,826,641, 7,961,909, 8,553,935, 8,897,494, 9,235,934, 9,939,911, 8,970,709, 9,189,856 and 9,852,512.

According to the main aspects, virtual item 120 in FIG. 1A as viewed from viewpoint 113 of inside-out camera 114 of system 100, may be altered based on one or more properties of inside-out camera 114. Among such properties is preferably the pose (position and orientation, also sometimes referred to as the extrinsic parameters) of camera 114 with respect to stable environment 130. The user of system 100 is presumed to be looking at viewing mechanism or display unit/screen 112 of phone 110 using normal vision (i.e., naked eye and optionally any corrective eye glasses or contact lenses) while phone 110 is being held in the user's hand. In subsequent description of the embodiments, any prescriptive/corrective eye glasses or contact lenses of the user will be presumed to exist and be appropriately worn by the user, and thus will not be explicitly illustrated or referenced for clarity.

Since in FIG. 1A, camera 114 is integrated with mobile/smart phone 110, the property is preferably the pose of mobile phone 110 itself. The altering of virtual object/image 120 based on the pose of camera 114 or mobile phone 110 is of great importance. That is because depending on that pose, a suitable modification of virtual object 120 (or other virtual objects if present) may be warranted, desired or required. Many examples of such alteration or modification are possible.

Note further that throughout this disclosure when referring to such alteration or modification or correction or adjustment or compensation, we may use the noun in the singular with the understanding that more than one such alterations or modifications or corrections or adjustments or compensations to the images/scenes may be made based on one or more properties of the inside-out camera(s). These properties may encompass extrinsic parameters of the inside-out camera(s) i.e. orientation and pose, its intrinsic parameters i.e. focal length $f_x$, $f_y$, optical center $(x_0, y_0)$ and axis skew, as well as many other properties that will be taught later in this specification.

Now recall the embodiment of FIG. 2 introduced earlier, employing a VR/AR/MR headset or heads-up display (HUD) or head-mounted display (HMD) 150 that can accommodate smart phone 110 of FIG. 1A. There are a variety of such headsets available in the market that can accommodate a smart phone. They typically include optical projection system 155 (shown disassembled from HMD 150) comprising projection lenses 160A and 160B. Lenses 160A-B focus image information emanating from the two respective regions of the smart phone display onto each of the user's respective retinas.

The result is either a VR experience, or in conjunction with the phone's camera an AR or MR experience for the user. A non-exhaustive list of such headsets includes Google Cardboard, Freefly, VR One, ColorCross, etc. As in the case of the embodiment of FIG. 1A, the appearance of virtual object 120 in FIG. 2 may be altered or adjusted based on one or more properties of inside-out camera 114 (e.g. some or all of its extrinsic or intrinsic parameters, or still other properties taught below). Such adjustment(s) may be made in projected environments 140 and 140' respective to the left and right eyes of the user.

In addition, a variety of other higher-end wearables are also available in the market that comprise the entire optical and electronic circuitry to provide a complete VR/AR/MR experience, without requiring a smart phone or handset. A non-exhaustive list of such eyewear products includes the Oculus Rift, Sony PlayStation VR, HTC Vive Pre, ODG R-7 Smart Glasses, Microsoft HoloLens, FOVE VR, Avegant Glyph, etc. An example of such an integrated HUD/HMD 152 is shown in FIG. 3A in which an environment 132 is being viewed.

Note, that since environment 132 is actually also seen through the optics of eyeglasses 152 onto which virtual object(s) are projected, as such the eyeglasses 152 would typically be characterized as AR/MR glasses, rather than VR glasses. The latter typically do not require and have a "see through" capability. Such a capability is also sometimes referred to as "Optical see-through" capability in the art. A related capability called "Camera see-through" in the art is sometimes used to refer to a VR setup where two cameras are used to provide binocular vision for the user of the environment, and onto which virtual objects may be layered.

However, to avoid undue detraction from the teachings of this disclosure, we will consider eyeglasses 152 to be VR, AR and/or MR (or more simply VR/AR/MR), while knowing the above subtle difference and distinguishing as and if necessary. Moreover, one could conceive of eyeglasses 152 to be VR type as well, if the see-through capability is blocked and the entire scene projected onto the user's retinas is virtual.

Device 152 in FIG. 3A has two inside-out cameras 153A and 153B. Inside-out camera 153A has an angular field-of-view 115 that is capable of gathering images of real world objects, such as real object 158. Object 158 is configured with features that are convenient for recovering the pose of inside-out camera 153A with respect to real world object 158. Inside-out camera 153B would also have its corresponding angular field-of-view, however it is not shown in FIG. 3A for clarity.

Images 142 and 142' are projected onto the retinas of eyes 151A and 151B respectively by image projectors (i.e., pico-projectors) 159A and 159B. The complete projection system of device 152 also includes the eyeglass lenses that provide see-through capability. As indicated by the two respective angled arrows, they also act as reflectors for deflecting the image information emanating from projectors 159A and 159B into eyes 151A and 151B respectively.

By employing the techniques taught in the above mentioned references, once the pose of inside-out camera 153A with respect to stable environment 132 is established, then the pose of the user's left and right eyes 151A and 151B respectively can also be calculated. This can be accomplished by familiar coordinate transformations derived using known spatial relationships of inside-out cameras 153A-B and user's eyes 151A-B. These relationships may be established by the specific design specifications of the head-mounted display (HMD). The accuracy and fidelity of the projected environment may be further improved by using eye-tracking hardware that utilize techniques well known in the art of HMD design.

A representation of the user's eye 151 is shown in FIG. 3B. The pose of user's eye 151 in FIG. 3B is represented by arrow 157 that is terminated at viewpoint 117, which is shown to be located near the center of the eye's lens. Arrow 157 and viewpoint 117 thus represent the orientation of the eye's optical axis and the position of the eye's viewpoint respectively, and together this orientation and location serve as a representation of the eye's pose. Similar to FIG. 3B, the corresponding poses of left and right eyes 151A and 151B in FIG. 3A are shown as arrows 157A and 157B respectively.

Each user eye 151A, 151B also has a natural angular field-of-view 156, which allows viewing of real world objects in environment 132 that lie within this angular field-of-view range. Note for clarity in FIG. 3A that the angular filed-of-view 156 of only right eye 151B is shown. Also shown in FIG. 3A are real world objects in environment 132 that are located within angular field-of-view 156. These real world objects can be seen in their natural locations by eye 151B when looking directly through the "see-through" eyeglass lenses. Specifically, real world objects include block 158 and the trees, mountains, clouds and the sun. Meanwhile bird 120 is a virtual object.

Projector 159B projects a virtual image of virtual bird/object 120 onto the retina of eye 151B, thereby producing a composite viewing of both real and virtual images on the user's right retina. This is an example of augmented reality (AR), whereby virtual objects are projected on the retina having the appearance of a real world object. The same process is replicated for left eye 151A through the use of projector 159A. The result is an Optical see-through capability introduced earlier.

In an alternate variation of this AR/MR system, the eyeglass lenses may be opaque, thus not allowing eye 151B to directly view the real world objects in environment 132. Instead, the images of the real world objects are gathered by camera 153B and projected by projector 151B onto the retina of eye 151B in the same location, and with same or altered appearance as compared to when the eye is directly viewing through a transparent eyeglass. The same process is repeated for left eye 151A by employing camera 153A and projector 159A.

The result is a Camera see-through capability introduced earlier. Moreover, virtual object 120 can be simultaneously projected onto the retina to produce a mixed reality experience for the user. This is an example that represents a case of augmented virtuality (AV), whereby real world objects are projected on the retina having the appearance of virtual objects. Both of these cases described above represent different versions of mixed reality (MR) systems.

The rendered scenes 142 and 142', projected by projectors 159A and 159B onto the left and right panes of eyeglasses 152 respectively, are slightly different, each corresponding to the vision of one eye of the user. Rendered scenes 142 and 142' may include unaltered portions of the captured images, or they may be further corrected/processed using knowledge of the actual pose of each eye 151A, 151B using known dimensional properties of headwear 152.

Having multiple cameras further facilitates in the quick and accurate recovery of user/camera pose using the techniques taught in the above references. However, the invention admits of having just a single inside-out camera for pose recovery (typically situated at the center of the eyeglasses at or slightly above the center of eyes of the user). Therefore, in subsequent drawings we may not explicitly label cameras 153A and 153B with the admission that one or multiple such cameras may be present on the wearable used by or mounted on the user.

In these and other related embodiments, the invention employs a projection mechanism, which is actually responsible for displaying/projecting the VR/AR/MR scenes/environment onto the retinas of the user's eyes as the user views the VR/AR/MR scenes/environment. The projection mechanism may employ appropriate hardware and software technologies to generate the requisite scenes and images that are seen by the user via the viewing mechanism.

Often times, the viewing mechanism and the projection/display mechanisms are integrated and/or are one and the same. In other words, the display unit/screen of the projection mechanism is the same as the viewing mechanism used by the user to view the VR/AR/MR scenes. That is the case with HUD/HMD 150 of FIG. 2 where a smartphone's display is used as the viewing mechanism as well as the screen onto which the projection mechanism renders the VR/AR/MR scenes.

In the case of eyeglasses 152 of FIG. 3A, the projection mechanism also employs pico-projectors 159A-B in conjunction with partially-reflecting mirrors built into the eyeglasses. Viewing mechanism consists of the eyeglasses having see-through capability and are configured to project images and information through each eye onto the respective retinas, thereby providing the user with an AR/MR experience.

Having such a setup of integrated viewing and projection mechanisms, is typical of smartphones, tablets, eyewear and many other devices employed in these teachings where the screen/window onto which the environment is displayed is also the same screen/window viewed by the user. A viewing mechanism is any facility or capability of viewing the VR/AR/MR environment, while the projection mechanism is responsible for performing graphics rendering and the associated computations, and adjustments/alterations/corrections to the virtual objects/scene of the VR/AR/MR environment being viewed. These adjustments are based on one or more properties of the inside-out camera(s) as explained throughout this disclosure.

As such, the projection mechanism may not be explicitly illustrated in the drawing figures nor explicitly referenced in associated teachings, but is presumed to exist and be integrated with, affixed to, attached to or operably connected with the viewing mechanism/display. As stated, it is responsible for generating the images and any adjustments to the images according to the invention that are seen by the user via the viewing mechanism, and as also stated the two mechanisms are often integrated in practice.

It should be noted that having an imaging and rendering system that employs a lens or optics is not an absolute requirement for pose recovery. In alternative setups photosensor(s) may be used "bare" to register photons without an intervening lens or optics. With appropriate light modulation utilizing techniques known in the art, including the use of modulated light beacons that are disposed in spatio-temporal patterns. The spatio-temporal patterns can range in complexity from all light beacons being on at all locations and at all times (simplest pattern) to light beacons at different locations being group-wise or even individually modulated in spatio-temporal patterns. In other words, in the more complicated spatio-temporal light-source modulation patterns the beacons can be turned on-off or scanned in groups or individually. Knowledge of the pattern in which the light sources are disposed (i.e., their spatial arrangement, their temporal modulations such as sequencing and scanning) allows the on-board photosensor or photosensors to perform pose recovery based on the derivative pattern of lights as actually received by the photosensor(s). At every particular position and orientation of the viewing mechanism the flashed or scanned beacons will be different. In other words, at every different pose the known pattern of light sources undergoes a transformation from the point of view of the photosensor(s) to a derivative pattern which is the form in which the known pattern is registered on-board the viewing mechanism. By identifying derivative patterns of the light sources generated by the known spatio-temporal pattern of light sources pose recovery can be accomplished using the techniques taught in the above mentioned references. In other words, although having an imaging system is useful and often required to project the scene/reality to a viewer, that is not a requirement for pose recovery. As such, the principles of this invention apply well to any VR/AR/MR apparatus, whether or not it employs any lensing or optics.

Returning to FIG. 3A, the illustration also shows an alternative vantage/viewpoint 154 that represents the viewpoint of an alternatively placed inside-out camera (not shown) that would be centrally located in the glasses 152 from which the user performs the above viewing. This alternative configuration could be provided by simply repositioning inside-out camera 153A to this new centrally located position. In this case, the pose of a centrally located inside-out camera is represented by the combination of viewpoint 154 and the solid arrow 164 shown extending from viewpoint 154, and indicating a position and orientation that is associated with the centrally located inside-out camera's pose.

For clarity, in subsequent descriptions of the invention, we will mostly use this simplified configuration to illustrate different uses of VR/AR/MR glasses. This configuration will have a centrally located inside-out camera used for pose recovery, and for gathering images of real world objects to be displayed or projected onto the user's retinas for viewing an VR/AR/MR environment. In FIG. 3A such an alternatively located inside-out camera is not shown, but is instead represented by viewpoint 154 and orientation 164, which together represent the camera's pose. Also, the specifics of this centrally located inside-out camera such as lens design, photo-sensor type, field-of-view, etc. may not be explicitly described in subsequent illustrations/figures of the invention, since many different designs of inside-out cameras may be used and are known in the art.

The principles of the invention apply well to any device whether it be just a wearable headset that can accommodate a handset device such as an iPhone or an Android phone, or whether it be a fully functional wearable device without requiring the insertion of a handset. In FIG. 2, environment 130 is projected along with a virtual object 120 onto environment 140/140' on the mobile phone's display unit 114. Note that several of the reference numerals from FIG. 1A have been omitted in FIG. 2 for clarity. Note further that AR/MR environments 140/140' and 142/142' of FIG. 2 and FIG. 3A respectively, provide for a stereo vision for the user. Specifically, realities 140 and 142 correspond to the left eye of the user in FIG. 2. and FIG. 3A respectively, and their slightly different counterparts 140' and 142' correspond to the right eye of the user in FIG. 2 and FIG. 3A respectively.

In related systems of the prior art, without appropriate adjustments or compensation to the image/scene viewed by the user, a discomfort motion sickness is normally induced in the user due to his/her or camera's motion. In the embodiment shown in FIG. 2 where camera 114 integrated with phone 110 is mounted on or worn by the user, and in the embodiment shown in FIG. 3A where eyeglasses 152 are worn by the user, the motion sickness may be due to the motion of the user himself/herself.

Motion sickness or discomfort is a common problem in such VR/AR/MR systems of the prior art because they fail to compensate for the movement of the camera and consequently its changing pose to make appropriate corrections to the projected images/scenes. Specifically, they fail to make appropriate alterations/corrections/adjustments to virtual object 120 (or other virtual objects if present) in FIG. 2, in response to the changing pose (position and orientation) of camera 114 on phone 110. Similarly, they fail to make appropriate alterations/corrections/adjustments to virtual object 120 (or other virtual objects if present) in FIG. 3A, in response to the changing pose (position and orientation) of the inside-out cameras 153A and 153B of eyeglasses 152.

In the examples of FIG. 2 and FIG. 3A, this motion would be due to the movement of user's head on which headset 150 or 152 is worn or the movement of the lower body or torso of the user as will be explained further below. This motion may be executed intentionally by the user. Alternatively, the user may make unintentional movements naturally associated with the face, neck, shoulder and lower body joints and muscles of the user. In the preferred embodiment of the invention, virtual object 120 (or other virtual objects if present) is/are altered to minimize the motion sickness for the user in response to his/her and/or camera's changing pose.

Those skilled in the art will understand that in the context of the present applications, a feeling of unease or discomfort, customarily called motion sickness, is attributed to the conflicts that occur between the human vestibular system and the human visual or ocular system. This motion sickness is especially a problem in AR/MR environment because of the need for a realistic integration of real and virtual objects, particularly in the near-field i.e. less than 10 feet away. As the distance increases and human eyes are more and more focused at infinity, the objects appear to move less with increasing distance, and the problem is minimized. Also, sometimes in a pure VR environment such as games, blurring and fog effects on near-field objects are used to trick the eyes into focusing on just the 'active' objects in the field. But this is an unnatural effect, because in actual reality, real fog blurs far away objects more so than close ones.

However, for AR/MR applications, especially in the near-field, the vestibular-visual delay can cause a serious conflict between the vestibular and visual/ocular inputs of the brain if the image is not corrected for head/camera motion. There is a partial conflict when the image correction is inaccurate, but it is also the time delay (latency) between the motion of camera 114 on phone 110 (see FIG. 2) and corresponding corrected image 120 of scenes 140 and 140' viewed by the human visual/ocular system.

In order to remove the above motion sickness from VR/AR/MR scenes for objects in the near-field, the system must meet the following minimum requirements:

1) It should provide a response to changes in both the orientation and position (pose) of the camera as needed. The changes/corrections to the image/scene need to be consonant with the motion of the camera.
   Of course in cases, where the camera is worn/mounted by the user e.g. eyewear, heads-up display (HUD) or head-mounted display (HMD), then the above consonance needs to be with the motion of the user's head.
2) The image correction for the rotational motion of the camera or user's head should have high accuracy (error less than −0.1 degrees) and low latency (motion-to-photons latency less than 10 milliseconds).
3) The image correction for objects for the translational motion of the camera or user's head should have high accuracy (error less than −3 centimeters) and low latency (motion-to-photons latency less than 10 milliseconds).
4) The refresh rate of the display where the image is projected should be at least 120 frames per second.

The present invention is able to achieve the above objectives because it is able to accurately and rapidly determine the pose of camera 114 and phone 110 (and that of the user's head/face for the embodiments of FIG. 2) and make appropriate adjustments to scenes 140 and 140'. Similarly, the present invention is able to accurately and rapidly determine the pose of the camera(s) on eyeglasses 152 (and that of the user's head/face for the embodiments of FIG. 3A) and make appropriate adjustments to scene scenes 142 and 142'.

These adjustments can be accurately made only if the pose of the viewer/user can be determined accurately and quickly using the available computing resources. Once the pose is determined on a near real-time basis by employing the techniques taught in above provided references, the projection mechanism can provide corrections to virtual object 120 or virtual objects if present, quickly enough so as to make the brain perceive a smooth and immersive VR/AR/MR experience.

Sometimes, a real object in an environment may be "cloaked" or made to disappear in an AR/MR scene by superimposing or cloaking it with a virtual object. The examples of this disclosure easily extend to such scenarios also, as will be obvious to a reader of average skill. Again, such cloaking can only be effectively possible if the pose of the user/camera can be determined quickly and accurately while providing the VR/AR/MR experience to the user.

Techniques for recovering the pose of the camera, devices and viewers having six degrees of freedom (6 DOF) in a variety of settings have been extensively taught in related patent references. For a detailed treatment of pose recovery of a variety of viewers and/or optical apparatuses/objects, the reader is referred to U.S. Pat. Nos. 7,826,641, 7,961,909, 8,553,935, 8,897,494, 9,235,934, 9,939,911, 8,970,709, 9,189,856 and 9,852,512.

FIG. 4 shows the 6 DOF available to a viewer in a typical VR/AR/MR environment. In FIG. 4, user 202 wearing eyeglasses 152 of FIG. 3A having viewing optics and inside-out cameras attached to it can move his or her head along with eyeglass 152 in one or more of the 6 DOF shown. Specifically, this movement can be along one or more of 3 translational degrees of freedom represented by X, Y, Z-axes, and rotated about one or more of the 3 rotational degrees of freedom represented by a Yaw ($\phi$) around X-axes, a Pitch ($\theta$) around Y-axis and a Roll ($\psi$) around Z-axis.

Let us now analyze what happens to the virtual object(s) projected by the projection mechanism of VR/AR/MR eyeglasses 152 in FIG. 4 on its display units/lenses. Note that in this and subsequent illustrations, the projection and/or viewing mechanism/lenses may not be explicitly shown and labelled for clarity and are of course presumed to exist in/on or be connected to device 152. As user 202 moves his or her head along the 6 DOF in FIG. 5A, he/she observes through glasses 152 a virtual object 120. The system of device 152 further performs pose recovery of the head of user 202 and that of glasses 152, using a centrally located inside-out camera (not shown) having a viewpoint 154 and orientation 164.

The viewpoint location 154 and orientation 164 of a centrally located inside-out camera (not shown) represents the pose of the inside-out camera and thus also represents the pose of eyeglasses 152. FIG. 5B represents an environment 200 viewed by user 202 of FIG. 5A wearing eyeglasses 152 mounted on his or her head. Without any movement of user's head i.e. at the canonical position, his/her Field Of View (FOV) is perfectly aligned with virtual object 120 as shown in FIG. 5A and FIG. 5B.

Specifically, as shown in FIG. 5A, user's viewpoint 154 is perfectly aligned with virtual object 120 as shown by optical or alignment axis represented by arrow 164 emanating from viewpoint 154. The result is a perfect centering of his/her FOV with virtual object 120 as shown in FIG. 5B. This represents the canonical position of the system of FIG. 5A-B and of the subsequent related examples. Explained yet another way, in the canonical position represented by FIG. 5A and FIG. 5B, user 202 is directly looking at virtual object/bird 120 resulting in the center of his or her FOV being perfectly aligned with virtual object/bird 120.

As shown in FIG. 5B, environment 200 observed by user 202 comprises several real objects, all denoted by reference numerals 210, and our virtual object or bird 120. As such this situation is representative of an augmented reality (AR) or a mixed reality (MR) system. Once again, though only one such virtual object 120 is shown in these examples, the invention admits of any number of such virtual objects located anywhere within environment 200.

Let us first take the three rotational DOF of user 202 of FIG. 4, along with the camera(s) mounted on eyeglasses 152, and inspect what happens to environment 200 of FIG. 5B as viewed by the user. FIG. 6A shows the situation where user 202 has rotated/Yaw-ed his/her head around X-axis by an angle φ. Prior art applications are unable to determine the new pose of user 202 shown in FIG. 6A on an accurate and timely basis. As a result, the FOV of user 202 remains as shown in FIG. 5B or takes too long to correct, despite the movement of the user's head to the new position of FIG. 6A. The resulting conflict between the human vestibular system and visual systems causes motion sickness or discomfort to user 202 and a degraded VR/AR/MR experience.

That is because of the 'expectation' of human brain to see a corresponding correction or change to user's FOV. Such a corrected or expected version of the image of FIG. 5A-B is shown in FIG. 6B. Specifically, FIG. 6B shows that virtual item 120 has moved to the right in the FOV of user 202 in response to his or her rotation composed of just the Yaw shown in FIG. 6A. Such a correction/alteration/adjustment can be made by the projection mechanism in timely manner i.e. while meeting the above taught latency requirements, only if a timely and accurate recovery of the new pose of user 202 in FIG. 6A can be made.

As stated, the above provided references extensively teach the techniques of the recovery of the new pose of user 202. Using those techniques, the present invention is able to immediately correct for the new pose user 202 leading to the corrected/altered projected image of virtual object 120 as shown in FIG. 6B. This results in a smoother, more comfortable, pleasant and immersive VR/AR/MR experience for the user than otherwise possible. Note that reference labels 210 representing real objects in FIG. 5B have been removed from FIG. 6B for clarity.

FIG. 7A shows user 202 Pitch-ing his or her head around the Y-axis by an angle of θ from the canonical position shown in FIG. 5A-B. As a result, virtual object 120 should be altered so as to be perceived by user 202 to move towards the bottom of the FOV/screen of the user as shown in FIG. 7B. Without this correction, being applied in a timely manner and enabled by fast and accurate recovery of the new pose of user 202, virtual bird 120 would still be in the center of FOV/screen of user 202 as in FIG. 5B or would take too long to move, thus causing the user motion discomfort/sickness and bringing about the deteriorated VR/AR/MR experience that prevents many users from adopting and benefitting from the full potential of this technology. Note again that reference labels 210 representing real objects in FIG. 5B have been omitted from FIG. 7B for clarity.

Similarly, FIG. 8A shows user 202 rolling his or her head around Z-axis by an angle of ψ with respect to the canonical position of FIG. 5A-B. This motion should be timely compensated to rotate virtual bird 120 in the Field Of View (FOV) of user 202 as shown in FIG. 8B. In the absence of a timely compensation as is the case in prior art applications, virtual bird 120 would stay put as in FIG. 5B, or take too long to move, causing motion sickness for user 202. As mentioned, the aforementioned alteration of virtual object 120 is achievable by instant invention because it can quickly and accurately recover the new pose of user 202 as his/her head makes any voluntary or involuntary movements during his/her VR/AR/MR experience. Note once again that reference labels 210 representing real objects in FIG. 5B have been removed from FIG. 8B for clarity.

The accurate and timely recovery of pose afforded by the teachings provided in the above mentioned references, allows for requisite image/scene compensation to take place as represented by the above examples. Even if the image/scene compensation is done but not on a timely basis, motion sickness can still occur for the user. Recall the speed/latency requirements between the vestibular and ocular systems as taught above. Appropriate image/scene compensation needs to occur within a certain maximum allowable latency, to avoid conflict between the visual/ocular and vestibular systems of human body that causes motion sickness. Thus if an application is able to produce corrected images of FIGS. 6B, 7B and 8B above but it does so after a delay of more than 10 milliseconds, motion sickness for user 202 is still likely to occur especially when object 120 is located in the near-field/range.

The techniques for providing the above corrections by the projection mechanism to images/scenes in the above examples, once the new pose of user 202 is known, are well understood in the art. For techniques regarding fast and accurate pose recovery of the user and related optical apparatuses in a variety of settings, the reader is again referred to U.S. Pat. Nos. 7,826,641, 7,961,909, 8,553,935, 8,897,494, 9,235,934, 9,939,911, 8,970,709, 9,189,856 and 9,852,512.

After having reviewed the effects of the three rotational DOF of the camera/user, let us now consider the three translational DOF of the camera/user and the resulting effects on the environments/scenes viewed. For this, consider FIG. 9A that shows a real object 212 which is a bird in the distance, a virtual object 214 which is a cage, and a virtual object 220 which is a bird in cage 214 as viewed by user 202 wearing eye goggles/glasses/visors 152 from a view/vantage point 154. FIG. 9A shows the canonical position of user 202 and glasses 152. The FOV of user 202 at his or her canonical position of FIG. 9A consists of environment 300 as illustrated in FIG. 9B.

Environment 300 is similar to environment 200 of earlier examples including real objects 210 consisting of hills, trees and the sun. However, reference numerals 210 from environment 200 have been omitted in environment 300 for clarity. This allows us to better concentrate on real bird 212 of interest and virtual bird 220 in virtual cage 214, all of which are marked as such in environment 300 of FIG. 9B. To repeat, FIG. 9B represents the scene/reality or environment 300, as viewed by user 202 in the canonical position of FIG. 9A i.e. when the neck of user 202 is at the origin of the shown coordinate system consisting of X-, Y- and Z-axes.

In the canonical position shown, real bird 212 and virtual bird 220 appear to user 202 side by side of each other at about the same height, as shown in FIG. 9B. Now let us examine what happens when user 202 translates his or her head along the X-axis. This is depicted in FIG. 10A. As a result of the translation of user 202 with eyeglasses 152 having onboard inside-out camera(s), environment 300 should be altered as shown in FIG. 10B. Specifically, the FOV of user 202 from view/vantage point 154 is now slightly looking downwards on real bird 212 in the distance and virtual bird 220, with the former slightly higher than the latter.

Without the above correction, real bird 212 and virtual bird 220 (in virtual cage 214) would still be side by side at the same height as in their original positions shown in FIG.

9B or would take too long to correct their positions, causing user 202 motion sickness and a deteriorated VR/AR/MR experience. Timely compensating correction(s) as shown in FIG. 10B are only possible if the new pose of user 202 and glasses 152 can be accurately recovered on a near real-time basis using practical computing resources, as afforded by the teachings provided in the above mentioned references.

Similarly, FIG. 11A shows a translational movement of user 202 along the Y-axis, requiring correction to environment 300 as shown in FIG. 11B, where the two birds are overlapping each other. In the absence of such correction afforded by a timely recovery of the new pose of user 202 in FIG. 11A, a degraded user experience due to motion sickness is bound to occur. Finally, FIG. 12A shows a translational movement of user 202 along Z-axis requiring a correction to environment 300 where virtual bird 220 and cage 214 appear slightly bigger. In the absence of a timely correction like this, possible due to accurate and timely pose recovery as taught in above mentioned references related to the instant invention, motion sickness and visual discomfort in user 202 is bound to occur.

To summarize, FIG. 10A-B, FIG. 11A-B and FIG. 12A-B illustrate the effect of translational movement of the head of user 202 along X, Y and Z axes and the corresponding corrections to the user's FOV or screen that needs to occur in order to avoid visual/ocular discomfort and/or motion sickness. Specifically, FIG. 10A, 11A, 12A show the translational movements of user 202 along X, Y and Z axes respectively, while FIG. 10B, 11B, 12B represent the corrected/altered position of virtual objects 220 and 214.

In the absence of the above corrections, virtual objects 220 and 214 would stay static as in FIG. 9B which shows the FOV of user 202 in the canonical position. Taking too long to correct, despite the user's translation movements is also not acceptable. As stated, this would cause discomfort for user 202 and a degraded/deteriorated VR/AR/MR experience. Solving this problem is enabled by the instant invention due to the fast and accurate recovery of the new pose of user 202 after the translational movements, allowing corresponding corrections to virtual objects 212, 214 (and any other virtual objects if present) in environment 300 to occur.

Once again, the techniques for providing the above corrections to images/scenes in the above examples, once the new pose of user 202 is known, are well understood in the fields of VR, AR and MR and graphics rendering. As for the techniques relating to fast and accurate pose recovery of user and optical apparatuses in a variety of settings, the reader is again referred to U.S. Pat. Nos. 7,826,641, 7,961,909, 8,553,935, 8,897,494, 9,235,934, 9,939,911, 8,970,709, 9,189,856 and 9,852,512.

As amply taught in the above mentioned references, the movement of a user having an inside-out camera mounted on a wearable such as glasses, along the available 6 DOF can be represented by a collineation or homography. This collineation or homography (often denoted by A or H) is expressed as $$A^T = \frac{1}{\kappa} R^T (I - \overline{p} \cdot \overline{h}^T)^T,$$

where $\overline{p}$ is perpendicular to the world surface inducing the homography (with magnitude equal to the inverse of the distance to the surface). R is the complete rotation matrix expressing the rotation of the camera with respect to its canonical position in coordinate system (X,Y,Z), and $\overline{h}$ is the translation vector of vantage/viewpoint of the camera from its canonical position and the new location at which the new pose is to be recovered.

Note from FIG. 5A that view/vantage point 154 of user 202 moves/rotates with the rotation of the head of user 202 wearing glasses 152. This is because viewpoint 154 is not on any axis of rotation X-, Y-, Z-axes (corresponding to Yaw, Pitch and Roll rotations). The reason for that is that viewpoint 154 is typically located at the center of eyes of user 202, whereas the rotation of the user's head occurs around a pivot point located at the top of the neck or conversely at the bottom of the head. So as the head rotates around X-, Y-, Z-axes, view/vantage point 154 also rotates around those axes, instead of staying stationary.

In other words, there is a linear distance between vantage/viewpoint 154 of user 202 as in FIG. 5A and the actual pivot of the rotation of the neck of user 202 i.e. the distance between the center of his/her eyes and the joints and muscles of his neck where the rotation occurs. Still differently put, the axis of rotation of the head of user 202 is not coaxial with and is below the center of his or her Field Of View (FOV) by the distance between the center of eyes and top of the neck. This offset needs to be accounted for in pose recovery and subsequently for producing appropriate corrections to environment 200 viewed in FIGS. 6B, 7B and 8B, rather than presuming viewpoint 154 to be coaxial with the user's center of eyes and at the center of his/her FOV. The techniques of pose recovery taught by the above mentioned related references easily accomplish that.

Specifically, the above offset is accounted for in the translation vector $\overline{h}$ in the collineation/homography A (or H) presented above and derived in the above mentioned references. Explained further, no matter what the final position of viewpoint 154 of the above examples with respect to its canonical position may be, the resulting collineation or homography incorporates any initial or intervening offsets by determining the final translation vector $\overline{h}$ where the new pose is recovered. For a detailed treatment of translation and rotation matrices as applied in pose recovery, the reader is again referred to U.S. Pat. Nos. 7,826,641, 7,961,909, 8,553,935, 8,897,494, 9,235,934, 9,939,911, 8,970,709, 9,189,856 and U.S. Pat. No. 9,852,512.

For best stereo vision that can be generated for the user, the inside-out cameras responsible for capturing the scene/environment onto which virtual object(s) are augmented, should be as close to each eye of the user as possible. Referring to FIG. 3A, we see that camera 153A would be close to the retina of left eye and camera 153B would be close to the retina of the right eye of the user, however there is still a "shift" between the retinas and the objective lenses of respective cameras 153A and 153B. This shift, which in many cases is unavoidable, results in environment 142/142' being produced for left and right eyes, that is slightly different than what the eye actually sees. Therefore, it is advantageous to incorporate the cameras into an optical system, that enables each camera's optical axis to be collinear with the respective ocular axis of each eye of the user. That way this shift can be eliminated, thereby producing a true stereoscopic vision as seen by each eye of the user. This has been accomplished in some systems by using a beamsplitter in the optical path.

Technologies such as virtual retinal display (VRD) or retinal scan display (RSD) or retinal projector (RP) may be useful for the above purpose. However, these technologies still do not address the fact that the cameras are not mounted on the same location as the eye. As will be apparent that for VR, this is not a problem to mount the camera over the eyes because the user does not watch the real scene. But AR is more challenging because one would require mounting the cameras on the same optical axes as the two eyes, and still allow the user to see through unobstructed. Of course, for augmented virtuality (AV) one can design a standard VR headset with the cameras in front of the eyes. Then one would render a combination of the captured video/image/scene and the virtual objects. The user therefore would not directly see the world but a high-fidelity facsimile of it, i.e. the real world translated into the digital space.

At this juncture, let us study the typical body movements associated with a human user wearing eyeglasses of the previous examples and enjoying a VR/AR/MR experience. The canonical position of such a user is shown in FIG. 13. Note that reference labels for eyeglasses, as well as the user himself/herself have been omitted to avoid detraction in the following explanation. For a human user with head-worn gear such as an HUD or HMD, there are movements of at least two sections of the body that ultimately move the eyes and the HUD/HMD. One section of the body is the head that pivots around the upper neck as indicated by pivot point 350 in FIG. 13. The other section of the body is the torso that pivots around the lower abdomen as shown by the pivot point 352 in FIG. 13.

Now, as shown in FIG. 14, a human torso can lean forward or backward around pivot point 352 or around Y-axis. This movement of the user is performed by the abdomen or the lower body. The movement is with respect to the canonical position of FIG. 13, while the user is observing VR/AR/MR scene(s)/environment through the eyeglasses/eyewear or HUD/HMD. The forward or backward movements of torso change the translational position of the user along Z-axis as shown. Furthermore, as the torso moves forward and backward, the height of the user's head with respect to the ground or origin (0,0,0) of (X,Y,Z) coordinate system shown also changes, thereby also translating the user along the X-axis. In addition, the user is also free to rotate his or her neck around the X-axis, i.e. execute a Yaw, as also shown in FIG. 14. This rotation of neck is around pivot point 350 on the upper portion of his/her neck where the head typically rotates.

Similarly, as shown in FIG. 15, with the forward and backward movement of the torso of the user around pivot point 352, the user is also free to Pitch his or her neck around pivot point 352 around the Y-axis, which is perpendicular to the page in FIG. 15. Finally, as shown in FIG. 16, with the forward and backward movement of the torso around pivot point 352 with respect to the canonical position of FIG. 13, the user is also free to roll his or her neck around the Z-axis at pivot point 350 as shown. Note that FIG. 16 is a frontal view of the user taken from directly across him or her from the front i.e. along the Z-axis, as opposed to the sideview taken from the side as in FIG. 14 and FIG. 15. As a result, and as obvious, the forward/backward movements of the torso are inside and outside of the page of FIG. 16 (around the Y-axis).

FIG. 17 shows a frontal view of the user from along the Z-axis. FIG. 17 shows the freedom of movement of the user's torso leftward and rightward around pivot 352 or around the Z-axis. This movement is further compounded by the user's Yaw-ing of the neck around the X-axis and pivot point 350. FIG. 18 is a sideview of the user taken along the Y-axis and representing his/her freedom of movement of the neck to Pitch the neck around pivot point 350 or around the Y-axis, in addition to the movement of his/her torso. Of course, because of the sideview of the user in FIG. 18, the movement of the torso around pivot point 352 is in and out of the page of FIG. 18 around the Y-axis. Finally, FIG. 19 shows from a frontal view the left and right movement of the torso around pivot 352 or around the Z-axis, compounded by the roll of the neck around pivot 350 (also around Z-the axis).

Regardless of the various movements of the portions of the body of the user as shown in the above examples of FIG. 13-19, the ultimate position of user's eyes or the camera/eyeglasses can be represented as a collineation with a rotation matrix R and a translation vector $\bar{h}$ with respect to the canonical position of FIG. 13. Again, as amply taught in the aforementioned related patent references, an efficient and accurate recovery of the pose of the user at his/her ultimate position can be easily accomplished using practical computing resources. Based on the recovery of the pose in the new position, the VR/AR/MR scene or environment as viewed by the user via his/her viewing mechanism or optics, can be appropriately generated, altered and/or compensated as desired.

The above alteration/adjustment/modification of the VR/AR/MR scene/image(s) preferably compensates for motion sickness of the user by ensuring that the image seen through the viewing mechanism or viewing optics of his/her wearable such as glasses, conforms the vestibular responses of human brain to the visual system of the body, thereby avoiding motion sickness. As taught above, this typically involves adjusting the image dynamically on a near real-time basis to account for a consistent visual perception by the eyes as observed naturally in the real world. However, there may be other reasons for the above alteration/adjustment of the VR/AR/MR scene/images and changing the viewing experience of the user. These reasons may include specific medical, psychological, mechanical or other needs of the application at hand.

As already stated, pose recovery techniques taught in the above mentioned references allow for a fast and accurate recovery of the pose of the user/camera. A very fast and efficient pose recovery algorithm allows plenty of time for other computing tasks. Many of these (e.g., rendering) are contingent on knowing the pose first. Thus, latency and drift in the image projection system can be reduced as the location and orientation of the virtual object(s) is calculated with time to spare. Note that the image for each eye will be different due to the separation between them. Optometrists call this offset between images perceived by the eyes, the parallax effect due to binocular vision.

It is also important to know where the user is focusing their sight in an AR/MR environment (i.e. close or far away). In general, this is not actively measured but rather inferred or assumed to be in the points/spots of interest. When the user focuses on real and/or virtual objects very far away the parallax effect or problem is simplified. The AR/MR system can then project an orthographic view of the virtual object(s). Such projection works well when the user's eyesight can be thought of "focused at infinity". Parallax plays no role in such situations and other ocular accommodation issues are minimized. For virtual objects at intermediate distances, human optometry is an issue. It becomes an acute problem when projecting virtual objects in the near field.

Therefore, certain applications use a "window" for looking at AR/MR to side-step the parallax problem. These applications typically use a screen on which AR/MR is projected/displayed. Ideally, the screen is rather large. Still, a smart phone screen may be sufficient under many situations. A big advantage of the window method is that it does not require two separate images of the virtual object normally generated for the left and the right eye separately.

Instead, the user looks at the screen and makes the necessary optometric adjustments with their own eyes.

The perception of depth in an AR/MR scene when using the window method does not result from stereoscopic images displayed to the left and right eyes. Instead, depth is inferred/perceived through other means such as textures, shades, shape familiarity, and is built up as the display window is moved around the virtual object(s). This allows the user to see each scene containing the real and virtual objects as they would appear from the various view angles and distances at which the window is placed. In other words, the AR/MR experience is achieved by combining monocular views from the different positions and orientations of the window.

One such application using the above described window method is shown in FIG. 20A-B. FIG. 20A shows an AR/MR environment 400 being viewed on a window/screen 402 of a device or tablet (e.g. an iPad) 414. Environment 400 projected/displayed by a projection mechanism on window/screen or viewing mechanism 402 includes a real object 412 and a virtual object 404. There are other real objects such as wine glass 410 also present that are currently not in the view being projected on viewing mechanism or window 402. The above example embodiment is representative of a "virtual tour" application in real-estate business, where a virtual building 404 is being explored using a device such as tablet 414. FIG. 20B shows that the view displayed/projected on window 402 changes as the user moves device 414 around virtual building 404 to explore it in 3D.

Because the above application uses the window method explained above, only one image/scene 400 needs to be displayed on window 402 without having to be concerned with the stereoscopic vision for left and right eyes typical of HUD/HMD devices as in FIG. 2, FIG. 3A and the associated embodiments. Typically, in such virtual tour applications, the user can also zoom into building 404 by moving tablet 414 inwards or closer to building 404. Such an application is only possible if the changing viewing orientation/angle and position (collectively pose) of tablet 414 along with its inside-out camera(s) (not shown), can be accurately and rapidly determined as the user moves device 414 in and around building 404 to naturally view it as if it were in the real world.

FIG. 21A-C illustrate another example of the window method employed by the instant invention. As shown, FIG. 21A includes a real object 410 which is a wine glass. The objective is to fill our real wine glass 410 with a virtual wine and display the resulting AR/MR full wine glass 411 on screen/window 402 of device 414. There are two ways to accomplish this. One way, depicted in FIG. 21B, does not employ full geometrical modeling of the virtual wine and/or wine glass 410 and simply overlays a virtual wine surface 406' onto glass 410 to show the resulting AR/MR full wine glass 411 in FIG. 21B. In practice, this can be done with shading or specular effect at the appropriate location in the rendered view. The other method employs a full geometrical model 406" of the virtual wine, and/or of wine glass 410, and then based on the geometrical model(s) renders a full AR/MR wine glass 411 as shown in FIG. 21C.

Again the above applications are possible if a quick and accurate estimation of the changing pose of device 414 and its inside-out camera(s) (not shown) can be made while the user moves the device around object 410. Such quick and accurate estimations of pose in a variety of settings are thoroughly taught in U.S. Pat. Nos. 7,826,641, 7,961,909, 8,553,935, 8,897,494, 9,235,934, 9,939,911, 8,970,709, 9,189,856 and 9,852,512.

As mentioned earlier, the window method adopted by above and other related embodiments simplifies the projection requirements of the AR/MR scene. It is now enough to project a single scene rather than two different stereo projections, one suited for each eye. This stereoscopic projection required for human binocular vision is especially important for head-worn devices such as HUD/HMD. FIG. 22 shows user 202 wearing eyeglasses/HUD/HMD 152 from the previous embodiments in an environment 500. User 202 is viewing a virtual wine glass 510 on a real table 502.

Table 502 has two reference points 504, 506 and a reference edge 508 that help recovery of pose of user 202 wearing glasses 152 as taught in the above mentioned references. As in previous embodiments, glasses 152 have two inside-out cameras 153A and 153B, although having two (or more) cameras is not a requirement in order to accrue the benefits of the instant invention. In other words, eyeglasses can have only one inside-out camera as well. As shown in FIG. 22, user 202 is viewing virtual wine glass 510 along a line of sight imagined to project from the center between his or her eyes. Further shown in the figure are the two respective imaginary axes of view from user's left and right eyes, specifically from the left and right lenses of glasses 152 of user 202. The left and right axes of user's view converge at wine glass 510 at the point where his line of sight meets virtual object 510.

Now let us see what happens in order to resolve the parallax or optometry problem of human binocular vision explained above. For this, let us first see FIG. 24 illustrating the projection of wine glass 510 from FIG. 22 onto the left and right eyes through the respective left and right lenses of eyeglasses/HUD/HMD 152. If the stereoscopic projection or the optometry/parallax problem is addressed extremely poorly or not at all, then user 202 through glasses 152 in FIG. 24 will see two different wine glasses due to parallax. This is depicted in FIG. 23A. If the optometry/parallax problem is solved badly (but better than in FIG. 23A), then the user may see a blurred image consisting of two unresolved wine glasses as shown in FIG. 23B.

Those skilled in the art will understand that vergence is the simultaneous movement in opposite directions of both eyes to obtain or maintain single binocular vision. When the two views corresponding to the two eyes are slightly mismatched as in FIG. 23B, the eyes compensate by adjusting vergence until a single object is perceived. This is the principle behind the stereogram posters that were popular in the 90's. So, for a single object i.e. the glass shown in FIG. 23B, the mismatch simply results in the glass being perceived at a slightly farther (or nearer) location than it should. However, when there are more than one virtual objects present, then the mismatch cannot be solved with a global vergence adjustment, or when the adjustment contradicts real objects present. The user then strains to perceive the scene. In such a case, perceived objects alternate between sharply or ghostly appearances.

Finally, if the optometry/parallax problem is addressed correctly, then the user would see a realistic and natural image for a distinct virtual wine glass 510 as shown in FIG. 23C at the right place. It is no surprise, that since solving the stereoscopic vision or optometry/parallax problem in practical applications generally requires complete mathematical modeling of objects and may be non-trivial to achieve on a near real-time basis, some applications "cheat" and side-step this problem. They typically do this by restricting the dynamic depth range of the scene, and/or mostly projecting the virtual objects in the foreground (ahead of the real objects in the scene), or projecting them in the background at infinity. In any case, a correct and speedy recovery of user/camera pose is necessary to provide a realistic projection of the environment being viewed. For techniques on efficient recovery of pose in a variety of situations, the reader is again referred to above mentioned references.

FIG. 25 shows another AR/MR environment 600 comprising user 202 wearing head-gear 152 and driving a car 602. As before, head-gear/HUD/HMD 152 has two inside-out cameras, of which only right side camera 153B is visible in FIG. 25. Of course, the invention admits of requiring only one (or more) cameras to accrue its benefits. User 202 is viewing environment 600 through and on windscreen 604. Environment 600 comprises real objects 606, 608 and others not referenced by specific reference numerals for clarity.

Furthermore, environment 600 viewed by user 202 through and on windscreen 604 also has one or more virtual objects. One such virtual object 610 is shown, which is a road-sign. In addition to virtual object 610 there may be a virtual tachometer or other gauge or readings projected on windshield 604 of car 602 by the projection mechanism involved (not shown) of the application. Such projection mechanism may include appropriate hardware and software technologies available in the art for rendering images on windscreen 604. Alternatively, or in addition, the whole or part of the dashboard of car 602 may be virtual. In the above embodiment, it is very useful if virtual road sign 610 or other virtual objects as desired e.g. various dashboard gauges, moved on windscreen 604 according to the movement of user's head. That way, the important safety and driving information is always available to the driver in his/her view, wherever on windscreen 604 he/she may be focusing. This is even more important for pilots who would like their flight data to be displayed onto the windscreen/windshield in concert with the movement of their head.

Of course, the above is easily accomplished by a timely and accurate recovery of the pose of user's eyes/head, utilizing the inside-out cameras of eyewear 152. Based on the changing pose, the position of the virtual object(s) can be changed on the viewing mechanism such as windscreen 604 of FIG. 25, to stay in the field of view of the user/driver/pilot. In some cases, it may be convenient to park the virtual object(s) that are very important for the user to see at the periphery of the field of view no matter what the user does. The above application is another example of the window method introduced earlier, where the window is windscreen 604 and/or virtual dashboard.

In a close variation of the above embodiment, the projection mechanism does not physically display/project the AR/MR scenes onto windscreen 604 but rather the AR/MR images are projected only onto the lenses/optics of eyeglasses 152 worn by user 202. In other words, the user views windscreen 604 through the viewing optics of his/her eyeglasses onto which the projection mechanism projects virtual road sign 610. Obviously, the user further sees real objects 606, 608 (and others if present) through the same viewing optics onto which virtual object 610 (and any other virtual objects if present) are projected. It is also conceivable to have a combination of the above two variations.

In any case, as in prior embodiments, in order to provide a pleasant/comfortable and useful projection of environment 600 whether onto eyeglasses 152 or onto windscreen 604, the pose of user's head or glasses 152 with cameras 153A-B must be known. Based on that pose, as elaborated in the above examples, the appropriate alterations/corrections to virtual object 610 and other virtual objects if present, can be made.

One such image/scene adjustment or correction can be the resolution of the optometry or the parallax problem. For the automotive embodiments of FIG. 25 let us further turn to FIG. 26 to understand the parallax problem. FIG. 26 shows our AR/MR glasses 152 with left and right viewing optics/lenses as shown. Note in FIG. 26, projection mechanism 155 responsible for displaying or projecting images/scenes onto left and right lenses/optics of glasses 152 is explicitly shown and labeled. As already noted before, in various embodiments taught herein, the projection mechanism may be attached to or operably connected to or affixed to or integrated with the viewing mechanism of the system. Exemplary viewing mechanisms are the viewing optics/lenses of eyeglasses 152, and windscreen 604 in the present embodiments.

FIG. 26 further shows a virtual dashboard 612 with a virtual tachometer 614 projected onto the viewing optics of glasses 152. As shown in FIG. 26, the field of view (FOV) of the left eye in near-field is disjoint from FOV of the right eye. At this distance in the near-field, the parallax problem needs to be properly addressed. However, as the distance from glasses 152 to the point of focus 620 of the eyes increases, the two FOV's converge, and the parallax problem is minimized. To further explain, these two situations are explicitly depicted in FIG. 27A and FIG. 27B respectively.

Specifically, in FIG. 27A the point of focus 620 of user's eyes is on the dashboard which is in the near-field. At this distance, the parallax/optometry problem is significant and must be properly addressed in order to provide a realistic and pleasant/comfortable AR/MR experience to user/driver 202. However, as shown in FIG. 27B, when point of focus 620 of driver's eyes is at infinity (recall vanishing points from projective geometry), the parallax problem may not need to be fully resolved in order to read the distant virtual road-sign 610 without discomfort. Once again, the parallax problem for the above automotive embodiment can be properly addressed on a near real-time basis by an accurate and efficient recovery of the pose of user/driver 202 as taught in the above mentioned references.

According to the present invention, the appearance of one or more virtual objects displayed/projected on a viewing optics or mechanism is altered or modified according to a property (or properties) of an inside-out camera utilized by the system. Preferably, the property is the pose (position and orientation, also sometimes referred to as the extrinsic parameters) of the camera. The inside-out camera is utilized to capture the reference objects (points, edges, etc.) in the environment, based on which the pose of the camera is estimated, as per the above references. Preferably still, the property is a homography induced by some surface in the real scene. The homography implicitly conveys the pose of the camera.

Recall that in an AR/MR system, the scene/images captured by the inside-out camera are overlayed by one or more virtual objects. In a pure VR environment, the entire scene created for the user and displayed on the viewing optics/mechanism is virtual. In this case, the user is transposed to a reality that is artificial and synthesized. This is achieved by blocking the user's view of the surroundings with closed goggles/glasses/visors that also serve as displays for images rendered by a computer. The user feels immersed or 'present' in the synthesized reality if the rendered virtual scene reacts to the user's actions in the same manner the eye view of a natural scene would do.

Therefore, in a highly advantageous embodiment, the above alteration/modification of one or more virtual objects is done so as to reinforce this sense of "presence" of the user in the VR environment. This reinforcement of the presence of the user manipulates the scene(s)/object(s) viewed by the user and their reactions to user actions and movements, so as to make them appear and feel as desired to enhance the sense of presence. One requirement for such manipulation could be to make the VR scene/object(s) appear and react to user's motion as naturally as possible compared to how they would appear and react if they were real.

In an AR/MR environment, user's view of the natural environment is not blocked but rather captured by a camera and then 'augmented' by the layering one or more virtual objects on/in it. This is typically achieved by a see-through display of some type, be it goggles, contact-lenses, car windshields, or display windows/screens. A computer renders the image of one or more virtual objects in such a way that the user believes that the object(s) (rather than the user himself/herself as in the case of VR) are part of the actual surroundings. The virtual item(s) feel "present" if the rendered images for the user react to the user's actions in the same manner as natural item(s) would.

Therefore, in another advantageous set of embodiments, the above alteration/modification of one or more virtual objects is done so as to reinforce this sense of presence of the object(s) in the AR/MR environment. This reinforcement of the presence of the item(s) or virtual object(s) involves manipulating them to react to user actions and movements, such that they appear and feel as natural objects to the user. The manipulation of item(s)/object(s) may also be to satisfy any other requirement specific to the application at hand for reinforcing the sense of presence of the item(s).

Of course a critical aspect of the reinforcement of the sense of presence, whether it be that of the user in a VR, or of one or more objects in AR/MR, is the knowledge of the pose of the user and/or the camera. Based on the changing pose of the user/camera, the objects in the VR/AR/MR can be manipulated to appear as they would naturally to the eyes.

In still other related embodiments, the above alteration/ modification of the one or more virtual objects is done so as to apply a certain texture or color to the virtual object(s). This could be used in AR/MR applications where a red color or prickly texture can be overlaid on top of an object in response to the user getting too close to the object(s) (or the object(s) suddenly becoming dangerous). Similarly, a virtual obstruction can be used to cue the user to avoid an area or path in an AR/MR application.

Now let us understand the technical mechanisms typically involved in the manipulation of the virtual objects rendered for the user in the above embodiments. As already stated, the rendering is done by a projection mechanism that typically renders the scene/object(s) on some viewing mechanism/ optics. Such viewing mechanism/optics may involve viewing lenses of eyewear, or display windows/screen of an electronic device (e.g. a tablet). Those skilled in the art will understand that in 3D computer graphics, the rendering pipeline or graphics pipeline refers to the sequence of steps/stages that are required to create a 2D raster representation of a 3D scene/image.

Once a 3D model of an object has been created, the graphics pipeline is the process of rendering that 3D model onto a display. The following few paragraphs in relation to FIG. 28A-C describe the basic operations involved in executing the graphics rendering pipeline. These will be well understood by a reader of average skill and are provided for completeness. For a thorough treatment of this subject, the reader may refer to J. Gregory, Game Engine Architecture, A.K. Peters Ltd., 2009, and the myriad of other reference literature available in 3D graphics books and on the web.

FIG. 28A shows the generic implementation of a graphics pipeline, extensively described in Chapter 10 of J. Gregory, Game Engine Architecture, A.K. Peters Ltd., 2009. Boxes with solid lines are fixed-function, those with dot-and-dashed lines are configurable and those with dashed lines are programmable. The Open Graphics Library (OpenGL) specification provides a simplified implementation of the above rendering pipeline, as represented in FIG. 28B, where the same convention of FIG. 28A for showing programmable, configurable and fixed-function boxes is used.

Output of one stage/step is fed as input to the next stage. A vertex has attributes such as position in (x, y, z) coordinates, color (RGB or RGBA), vertex-normal ($n_x$, $n_y$, $n_z$) and texture. A primitive is made up of one or more vertices. The rasterizer raster-scans each primitive to produce a set of grid-aligned fragments, by interpolating the vertices. Vertex processing shown in FIG. 28B, takes geometry data (e.g., a list of points) describing a graphics primitive and applies a series of transformations. Typically, the rendering pipeline involves four types of transformations: model, view, camera and viewport transformations as shown in FIG. 28C.

Model, view and camera transformations are done at the vertex processing stage. Model transformation refers to the arrangement of objects within the synthesized scene or world. The view transformation refers to the position and orientation of the view that is to be presented to the user. Camera transformation refers to the (virtual) lens parameters through which the scene is to be visualized. All these transformations are programmable as shown in FIG. 28C, which uses the same convention for showing fixed-function, programmable and configurable boxes/processes as in FIG. 28A-B.

Continuing further in FIG. 28B, fragment processing first performs rasterization: each graphic primitive is converted to a set of grid-aligned fragments enclosed within the primitive. At this point viewport transformation (see also FIG. 28C) is done. In other words, viewport transformation is done during rasterization, and refers to the size, shape and location of the display area to map the projected scene. This transformation is also programmable as shown in FIG. 28C.

After rasterization, fragment processing also performs texturing of each fragment, lighting and fog effects, fragment culling tests (such as scissor test, alpha test, stencil test and depth buffer test), and finally pixel-based operations (such as blending, dithering, logical operations and bit-masking). All these operations are either programmable or configurable.

After the above primer on 3D graphics rendering pipeline, let us now turn our attention to the relevant embodiments of the invention. A person skilled in the art can readily see that the appearance of one or more virtual objects in the above embodiments, can be changed in numerous ways given the versatility of the graphics rendering pipeline. Therefore, in another set of highly advantageous embodiments, the alteration/modification of the one or more virtual items in the above embodiments, entails changing one or more configurable or programmable parameters of a graphics rendering pipeline.

The configurable and programmable parameters of a graphics rendering pipeline have already been introduced above and are associated with configurable and programmable functions/boxes shown in FIG. 28A-C. For a detailed overview of these parameters, the reader is again referred to any of the many available texts on 3D graphics. At the minimum, they include vertex operations, fragment operations and pixel-based operations. Thus not only can the coordinates of the virtual item (i.e. the model transform) may be altered based on one or more properties of the inside-out camera, but any configurable or programmable parameter in the rendering pipeline may also be altered. Furthermore, these parameters may also include shading, diffusion and light-scattering effects applied to the image fragments of the virtual object(s) being altered.

As already taught above, the alteration of one or more virtual objects is done based on one or more properties of the inside-out camera of the system. One such property can be a pose of the camera. This use-case makes it highly applicable to VR/AR/MR environments. However, many other properties utilizing the inside-out camera can be used. These properties can be recovered, reconstructed or measured from the output of the inside-out camera. A non-exhaustive list includes: parallax, image sharpness, lens distortion, image blur or defocus, vignetting, lens flare, brightness, image texture, image disparity, z-depth, optical flow, image noise or grain, lighting and shading, edge and corners, SiFT features, foreground silhouettes, occlusions, vanishing points, foci of expansion, motion blur and spatiotemporal intensity fluctuations.

We have already explained parallax above and provided several examples of how the projected image/scene may be altered to resolve the parallax or optometry problem (see. FIG. 22, FIG. 23A-C, FIG. 25, FIG. 26, FIG. 27A-B and the associated explanation).

Preferably, the property based on which the one or more virtual objects are altered, is image sharpness. In other words, based on the desired or required level of image sharpness of the output of the camera, the one or more virtual objects are altered accordingly. Preferably, the property is lens distortion. This embodiment may involve a defect in the lens of the inside-out camera that results in an image distortion of the AR/MR scene being viewed. This distortion is then compensated for virtually using graphics rendering techniques provided above so a corrected image/scene can be presented to the user.

In the present embodiment, lens distortion can also be a desirable effect to enhance the sense of space or vastness. In such case, the appearance of a virtual object can be appropriately distorted as a result of changing the camera viewpoint. In a variation of this embodiment, a drop in image sharpness may be the result of fog or haze in the real scene. The sharpness of the virtual object can then be similarly reduced to match the perceived physical reality.

Preferably, the above mentioned property of the inside-out camera is an image blur or defocus that needs to be corrected/compensated for. Alternatively, this property may be used to have the appearance of the virtual object appropriately match the blur or defocus conditions. Several examples of this were provided above in relation to resolving the optometry or parallax problem. In addition, the image blur or defocusing may happen due to any number of other reasons, including the optical properties of the lens(es). In any case, these may be corrected for the user by employing the techniques provided herein.

Preferably, the above mentioned property of the inside-out camera based on which one or more virtual objects are altered, is vignetting. In photography and optics, vignetting is a technique for drawing attention to the center by reducing the image's brightness or saturation at the periphery compared to the image center. Therefore, based on the vignetting required for our VR/AR/MR scene, the virtual object(s) may be altered as desired. For example, if a virtual object is at the periphery of the scene it may be intentionally dimmed to draw more attention to the center.

Preferably, the above mentioned property of the inside-out camera is lens flare. Lens flare is the light scattered in the system through usually (unwanted) image formation mechanisms. These can be internal reflection and scattering from inhomogeneities in the lens material. However, a lens flare may be used deliberately to invoke a sense of drama. It may also be added to an artificial or augmented image to give it a sense of realism—implying that the image is an un-edited original image of a real-life scene. Therefore, in this embodiment, lens flare may be used as the basis for the alteration/modification of the one or more virtual object(s) in the VR/AR/MR scene. Reasons for doing this alteration may be to reduce the effects of unwanted lens flare, or to deliberately enhance the effect of lens flare for dramatic or real-life effects.

Preferably, the above mentioned property of the inside-out camera is brightness. Depending on the brightness level of the scene captured by the inside-out camera, a variety of appropriate alterations to the virtual object(s) may be warranted. For example, if the image is bright, brighten the virtual object(s) also, and vice versa.

Preferably, the above mentioned property of the inside-out camera is image texture. As understood in the art, an image texture is a set of metrics in image processing for quantifying the perceived texture of an image. Image texture provides information about the spatial arrangement of color or intensities in an image or selected region of the image. Thus based on the texture of the image/scene of the inside-out camera, appropriate alterations to the virtual object(s) may be warranted. One example would include retexturing the virtual object according to the texture of the rest of the image. One could texture the virtual object to match or contrast with the rest of the scene/image.

Preferably, the above mentioned property of the inside-out camera is binocular disparity, which refers to the difference in image location of an object seen by the left and right eyes, resulting from the eyes' horizontal separation (parallax). It is used by the brain to extract depth information from the two-dimensional retinal images in stereopsis. Therefore, objects or images may be virtually manipulated to produce the desired level of binocular disparity. As would be obvious from above, one reason for doing that may be to provide stereo vision for the user.

Preferably, the above mentioned property of the inside-out camera is z-depth. A common use of this property is for depth keying, which consists of grouping pixels based on their relative distance to the background. Thus, this property can be employed in a number of ways to alter the virtual images of our VR/AR/MR scene. The virtual object (or parts of the virtual object) can be rendered translucent over pixels with a low key (i.e., further into the background), or opaque over pixels with a high key (i.e., closer to the foreground).

Preferably, the above mentioned property of the inside-out camera is optical flow which is the pattern of apparent motion of objects, surfaces and edges in a visual scene, caused by the relative motion between an observer and the scene. The observer can be a person or a camera. As an example, a VR/AR/MR scene in the present embodiment may be manipulated to provide an illusion of movement.

Preferably, the above mentioned property of the inside-out camera is image noise. Image noise can take many forms, and is random variation of brightness or color in images. Usually it is an aspect of electronic noise or the 'graininess' of the film. Image noise is an undesirable by-product of image capture that adds spurious and extraneous information. Hence an example use-case would be to virtually manipulate the VR/AR/MR scene to counter image noise, or in an alternative scenario to enhance the noise for any reasons.

Preferably, the above mentioned property of the inside-out camera is shading (or conversely lighting). Shading means depicting depth perception in 3D models or illustrations by varying the levels of darkness/shading. Thus in the present embodiment, the VR/AR/MR scene may be altered based on the shading/lighting requirements of the scene. An example could use applying color/media to the image more densely or darkly for areas that should be perceived to be dark, and applying the colors/media lightly to areas that should be perceived to be lighter.

Preferably, the above mentioned property of the inside-out camera is one or more edges in the VR/AR/MR scene. Based on the edges any type and number of manipulations/alterations to the scene/objects may be desired. In a similar embodiment, the above mentioned property of the inside-out camera is one or more corners in the VR/AR/MR scene. Based on the corners any type and number of manipulations/alterations to the scene/objects may be desired. Examples of these include varying the details of the scene/objects in order to conform, align or to contrast with the edges and corners of existing objects in the scene.

Preferably, the above mentioned property of the inside-out camera is Scale-invariant Feature Transform (SiFT or SIFT) features. SIFT is an algorithm of computer vision to detect and describe local features in images. Thus in the present embodiment, a VR/AR/MR scene may be manipulate/altered according to the features extracted by SIFT. Examples of such manipulation/alteration include varying the contrast of the scene/objects according to high-contrast edges and corners detected by SIFT. Since SIFT is useful in image recognition, there are numerous possibilities of using computer vision to study the VR/AR/MR scene thusly manipulated in the present embodiment based on SIFT features.

Preferably, the above mentioned property of the inside-out camera is foreground silhouettes. Thus in this embodiment, VR/AR/MR scene may be manipulated to accentuate, highlight or annotate the silhouettes of one or more objects in the scene. Examples of this manipulation include increasing the lighting of objects surrounding the silhouetted object or darkening the silhouetted object compared to the surroundings.

Preferably, the above mentioned property of the inside-out camera is vanishing points. Recall from perspective geometry that a vanishing point is a point in the picture plane that is the intersection of the projections of a set of parallel lines in space on to the picture plane. The classic example is the point where railway tracks appear to intersect in the distance in a picture viewed from the front. Thus in the present embodiment, depending on the vanishing points present in the VR/AR/MR scene, certain manipulation/alterations of the scene/objects may be warranted. Examples of such manipulations include scaling the object according to how far/close those vanishing points need to be.

Preferably, the above mentioned property of the inside-out camera is foci of expansion. When the camera/observer is moving forward, the corresponding optical flow contains a focus of expansion. It is a point from where the objects in the image appear to be expanding. A classic example is when the camera is moving inwards towards a point in the scene, the objects around it expand or become bigger and appear closer and then eventually disappear out of bounds at the periphery. The center or the point around which this expansion occurs is the focus of expansion. It is the point towards which the camera is moving inwards in the above example.

Thus in this embodiment, depending on one or more of such foci of expansions in the scene based on the camera movement, virtual objects/images in the VR/AR/MR scene may be altered or manipulated. Examples of such manipulations/alterations include enlarging or expanding the objects around the focus of expansion so that the movement appears real-world and realistic.

Preferably, the above mentioned property of the inside-out camera is motion blur, which is the apparent streaking of rapidly moving objects in a still image or in a sequence of images. It occurs when the image being projected or recorded changes during a single exposure, either due to rapid movement of objects and/or extended length of the exposure. Thus in this embodiment the virtual/augment/mixed scenes or objects are manipulated according to the presence/absence of the motion blur. For example, the manipulation may involve blurring the virtual object(s) in the scene so they appear to match the amount of motion blur of other real objects in the scene. Still in another example, the virtual object(s) may be blurred so as to create a perception of the movement of the objects.

Preferably, the above mentioned property of the inside-out camera is spatiotemporal intensity fluctuations. In this embodiment, the manipulation or alteration of virtual object(s) may be warranted due to the intensity changes in space and time. An example scenario includes changing the light intensity of the virtual object(s) to account for changes in light intensity on other objects in space and time.

As will be evident, the above examples offer a vast number of possibilities for the property (or properties) of inside-out camera based on which image alteration of a VR/AR/MR scene is performed according to the invention. Furthermore, the alteration or manipulation of the scene could be simple or complex. Preferably, the alteration is merely a change in the position of one or more virtual objects. Among the many possible choices for the reasons for such alteration include improving stereoscopic vision, reinforcing the sense of presence for the user and/or the object(s), or providing a more comfortable/pleasant and natural experience to the user.

Preferably, the alteration is consonant to a movement of the user. Among the many possible choices for the reasons for such alteration include reducing motion sickness for the user by keeping the projected image/scene consonant with the voluntary or involuntary movements of the user. Under such circumstances it is advantageous for the movements of the user to be constrained. Such constraint on the motion of the user/camera results in a reduced homography associated with the changing pose of the user/camera.

A reduced homography is preferably possible because of the presence of structural uncertainties in the optics of the viewing mechanism, or because of structural redundancies caused by the conditioned motion of the viewer. The reduced homography employs a reduced representation that is much more efficient to compute for estimating the user/camera pose, than regular homography. For a detailed treatment on pose recovery using homography, the reader is referred to U.S. Pat. Nos. 8,970,709, 9,189,856 and U.S. patent application Ser. No. 14/926,435.

In an interesting embodiment of the invention there are two users of the system. First user views the projected/displayed VR/AR/MR scene as before, while the second user is associated with the inside-out camera. Preferably the second user carries or wears the inside-out camera. This way the scene that is being projected and altered for the first user is actually from the perspective of the second user. An example use-case for such an application is a video game where the user plays a game (or otherwise uses the system) from the perspective of the second user. Note here that although the above explanation uses a first user in the singular, there could be any number of such users present that view the projected/displayed VR/AR/MR scene from the perspective of the second user/avatar.

In alternative embodiments, there is only one real user (or set of real users), while the virtual object is an avatar of a second user thereby giving the illusion of the presence of a second user. The virtual user or avatar is then manipulated according to the one or more properties of the inside-out camera per above teachings. The inside-out camera is preferably mounted on the first user. In a variation, the virtual object could also be a tool or an implement which is altered or manipulated based on the pose of the inside-out camera.

The viewing optics or mechanism may preferably be integrated with the inside-out camera. This would be typical of a set of VR/AR/MR eyeglasses or goggles or visors where the left and right optics through which the user views or sees the environment are the same respective left and right optics which are used by the inside-out camera/cameras as its/their lenses. Alternatively, the viewing optics or mechanism may just be affixed to the inside-out camera. Examples of such a setup include eyeglasses 152 of FIG. 3A, and subsequent embodiments with their associated figures and explanation. In other related embodiments, the viewing mechanism or optics may be connected to the camera, or still alternatively, may just be attached to it. The skilled reader will realize the many design choices available for utilizing the inside-out camera and the viewing mechanism/optics within the scope of the invention.

As already described, the viewing optics or viewing mechanism may employ a display unit such as a screen/window. Devices such as a smartphone, a tablet as well as HUD/HMD/eyeglasses 150 of earlier embodiments would be examples of that. Preferably the projection mechanism used to project/display the VR/AR/MR scenes/objects is integrated with the display unit. This would be typical of a smartphone or tablet, although many other possibilities exist. For example, retinal projections onto the user's eyes would utilize the natural lenses inside user's eyes as the viewing optics through which he/she views the environment and onto which the alteration to the virtual object(s) occurs. Alternatively, viewing optics may be just attached, connected or affixed to the display unit.

As extensively taught in the above embodiments, the viewing optics may be replicated/duplicated for producing a stereo vision for the user. Recall the discussion around the stereoscopy, optometry or the parallax problem. In fact, the viewing optics may take many other forms, e.g. a telescope, binoculars, etc. In other words, the user may view a VR/AR/MR environment through the optics of a telescope that has a projection mechanism for projecting/displaying virtual object(s) on its optics. Same principle applies to binoculars.

In another set of highly advantageous embodiments, the system utilizes a control device or a controller for controlling the one or more virtual objects in the VR/AR/MR scene. Preferably, the controller is a wearable device. Preferably the controller is used to control the alterations/modifications to the virtual object(s) in the scene. Examples of such a control device or controller include a joystick, a game controller (e.g. Nintendo Wii), a touch sensor (e.g. Apple Magic Trackpad, Lenovo K5923 Multi-gesture Touchpad), a gesture sensor (e.g. the ones used in games and smartphones), a digital pen (e.g. a stylus), a proximity sensor (e.g. a capacitive, photoelectric or inductive sensor), a vicinity sensor (e.g. a sensor using radio frequency identification (RFID) technology), an electromagnetic sensor, an inertial sensor (e.g. an accelerometer or a vibration sensor) or one of the many types of motion sensors.

In similar embodiments, instead of a control device, the system simply uses an auxiliary sensor for controlling the appearance/modification of the one or more virtual objects. Preferably, the auxiliary sensor is an optical sensor, an inertial sensor (e.g. a gyroscopic sensor, or an accelerometer), a magnetometer, an optical flow sensor, a displacement sensor, an acoustic sensor, a Radio Frequency (RF) sensor. All the above sensors and sensor technologies are well understood in the art and they will not be delved further into this specification.

There are many interesting applications conceivable for using a control device or an auxiliary sensor in the above embodiments for the alteration/modification of the one or more virtual objects/items. Examples include game controllers, e.g. joystick or other types of input devices for effecting alterations to the appearance of the virtual object(s). Other examples include instrumenting the gamer with the auxiliary sensor so that his/her actions, such as movements or gestures or sounds, may be tracked/measured by the sensor and adjustments made to the one or more virtual objects accordingly.

In an interesting variation of the above embodiments, the user of a device views the VR/AR/MR scene from a device viewpoint (instead of a user viewpoint as in earlier embodiments). As before, a projection mechanism is employed to alter the appearance of one or more virtual images/objects in the VR/AR/MR scene as seen by the user from the device viewpoint. There are many interesting use cases for such a scenario.

One such use case is illustrated in FIG. 29 showing user 202 wearing HUD/HMD 150 from our earlier embodiments. Although HUD/HMD or headset 150 presumably incorporates a handset (e.g. a smartphone, see also FIG. 2), the embodiment is agnostic to the type of technology and is equally capable of working with fully integrated eyeglasses/goggles 152 taught earlier, or any other type of device having appropriate projection and viewing mechanisms.

In the embodiment shown in FIG. 29, user 202 views a VR/AR/MR environment 650 from the viewpoint of a device 652 which is a drone. Drone 652 has an inside-out camera 654 and it is from the viewpoint of this camera that user 202 sees environment 650.

Alternatively, inside-out camera(s) can be separately mounted on, affixed to or in some other way operably connected to device 652. Furthermore, as before, there can be one or more inside-out camera(s) on device 652 providing either monocular, binocular/stereoscopic or other types of vision of environment 650 to user 202. Environment 650 contains a virtual object 656 and potentially other virtual and real objects which are not explicitly shown in FIG. 29 to avoid detraction from the principles of this embodiment.

Obviously the important difference in the present embodiments is that instead of viewing the environment from the viewpoint of the user himself or herself, the environment as projected/displayed by the projection mechanism is viewed from the viewpoint of a device. This detachment of the viewpoint and associated viewing optics/mechanism from the user himself/herself provides a lot of interesting applications. One such application is shown in FIG. 29, where user 202 is controlling drone 652 with a controller 660.

However, many other applications of the present embodiments are possible. For example, the device can be a robot controlled by a control mechanism such as a computer software/hardware or by the user himself/herself either manually or through an electronic control mechanism. The device can be an instrument or an implement or a tool controlled by the user, typically from some distance. Still possibly, the device may be any remotely controlled automotive equipment, such as a car, train, truck, etc. Alternatively, device 652 may be autonomous, or semi-autonomous with little or no control over it exercised by user 202.

In alternative variations, a light-field camera (such as a Lytro camera or a Pelican camera) can be used to collect composite optical information and permit rendering from many vantage points within a certain volume. A light-field camera is advantageous for pose recovery using the techniques of the above provided references, because it captures intensity as well as the direction of the light emanating from the reference points in the environment. A light-field camera is typically more resource intensive than a conventional camera in terms of power and computation requirements. Hence, appropriate resources need to be made available to the camera, whether it is placed on a drone/device or otherwise made available to the viewer, such as in an HUD/HMD.

As used in the present variations, a device in general may fall into two broad categories. It is either an implement/tool operated by the user either directly (e.g., by hand) or autonomously, or the device is a wearable device, which is carried or worn by the user. In the former category of manipulated devices/items, the device may be attached to a mechanical linkage having up to six degrees of freedom that allow total freedom of motion or a constrained freedom of motion. The device may further be wireless or attached by a flexible tether (with or without stress relief of torque relief).

The category of implements/tools generally includes wands, flying drones, remotely controlled cameras, portable phones, portable electronic devices, medical implements, digitizers, hand-held tools, gaming controls, gaming items, digital inking devices, pointers, remote touch devices, TV remotes and magic wands. In terms of use-cases, the manipulated device/item is a portable phone that is used to control a user device which is a game console, a television, a stereo, an electronic picture frame, a computer, a tablet, an RF transmitter unit, a set-top box, a base station, a portable user device having a display, a non-portable user device having a display, an appliance or the like.

The category of wearable devices/items generally includes items affixed on headgear, on glasses, on gloves, on rings, on watches, on articles of clothing, on accessories, on jewelry, on accoutrements and the like. Any of such wearable devices can be used to control a user device that is a game console, a television, a stereo, an electronic picture frame, a computer, a tablet, an RF transmitter unit, a set-top box, a base station, a portable user device having a display, a non-portable user device having a display, an appliance or the like.

All other teachings of the earlier embodiments including where the VR/AR/MR environment was seen from a user viewpoint, also apply to the present embodiments where the VR/AR/MR environment is viewed from a device viewpoint. For example, one or more virtual objects/images layered on the environment by the projection mechanism, as seen by the user from the device viewpoint can be altered or manipulated based on one or more properties of the inside-out camera(s) as taught earlier. The myriad of choices of such properties have already been taught above. Similarly, the many choices for the type of viewing optics/mechanisms, wearables, etc. have also been taught above. Furthermore, as before, projection mechanism may include a display screen unit or screen/window and the associated teachings of earlier embodiments apply. Still further, the various types of alterations/modifications to the scene and the motivations behind them as taught above, also apply to the present embodiments.

Preferably, the alteration/modification of the one or more virtual objects/images/scene is consonant to a movement of the device—notice the contrast to the earlier embodiments where the alteration was consonant to a movement of the user. However, again among the many possible choices for the reasons for such alteration include reducing motion sickness for the user by keeping the projected image/scene consonant with the voluntary or involuntary movements of the device. Under such circumstances it is advantageous for the movements of the device to be constrained. Such constraint on the motion of the camera results in reduced homography associated with the changing pose of the device/camera.

The reduced homography employs a reduced representation that is much more efficient to compute for estimating the device/camera pose, than regular homography. For a detailed treatment on pose recovery using homography, the reader is referred to U.S. Pat. Nos. 8,970,709, 9,189,856 and 9,852,512.

In another set of embodiments of the instant invention an optical sensor is used for imaging space points of a reality that is viewed by a viewer. The space points would preferably be non-collinear. The optical sensor may be an inside-out camera as taught earlier. Again, there may be multiple optical sensors employed for producing stereoscopic vision for the viewer, or for other reasons pertinent to the application. Then a mechanism is used to generate one or more virtual objects/items that are layered on the reality viewed by the viewer. Such a mechanism can employ graphics rendering pipeline capabilities and embody the projection mechanism of earlier examples. Then, utilizing the optical sensor(s), the system tracks the movement of the viewer and the above mechanism modifies the one or more virtual objects/items on the reality according to that tracking.

As taught earlier, one reason for tracking the movement of the viewer may be to improve his/her viewing experience, such as, by reducing the motion sickness associated with his/her voluntary/involuntary movements. Still other reasons may include changing his viewing experience according to specific medical, psychological, mechanical or other needs of the application. The optical sensor(s) of this embodiment may be worn in a HUD/HMD or other gear of the earlier embodiments.

The modification of the one or more virtual items may also be according to one or more properties of the optical sensor. Accordingly, the types of properties of the inside-out camera taught earlier, and the teachings of the prior embodiments apply to the present variation(s) employing optical sensor(s) also. In another embodiment, the inside-out camera is attached to an autonomous, or semi-autonomous device, and the scene is displayed to a sentient being (e.g. human). In this embodiment, the scene is displayed and updated with virtual objects for the human but from the viewpoint of the autonomous or semi-autonomous device (e.g. robot, drone, etc.).

In another set of highly interesting embodiments, an immersive sports experience may be provided for the user. In such embodiments, the user with HUD/HMD wearables or some other appropriate viewing and projection mechanisms, that may be the same as or similar to earlier embodiments or entirely different designs, may be virtually transported into a sports event. The sports event or game may be a Soccer, NFL, MLB, NBA, NHL, etc. game, and the user may be able to interact with the virtual objects present in the VR/AR/MR scene/game.

The experience in above embodiments could be an AR/MR or VR experience as taught earlier. The virtual objects may be completely fictitious or a rendition of actual objects and/or players of an actual game/team. It is easy to extend these embodiments to fantasy team, and further to completely fictitious objects related to sports or otherwise, that one may be able to interact/play with in the VR/AR/MR embodiments afforded by the instant invention. Indeed, many other applications are conceivable according to the teachings and within the scope of the invention.

The methods of the invention further provide the steps required to layer one or more virtual objects/items onto a VR/AR/MR scene. The scene is viewed by a viewer from a viewer viewpoint using a viewing optics/mechanism. The viewer can be a machine such as a robot, a manipulated/controlled tool or implement, or an artificial agent. Alternatively, the viewer can be a sentient being such as a human, or an animal. The layering is performed by a projection mechanism that is capable of displaying the scene to the viewer using any number of mechanisms available in the art.

The methods further provide that the appearance of the one or more virtual objects/images in the scene viewed by the viewer may be altered based on one or more properties of an inside-out camera. Teachings of the earlier embodiments, including the types of properties of the inside-out camera, the choices of how the inside-out camera may be connected to capture the real environment, the types and choices of projection mechanism, viewing optics, types and choices of alterations/modifications to the scene, etc. still apply.

The methods provide that the alteration of the one or more virtual objects/images/scene is preferably consonant to the motion of the viewer. As taught earlier, a constraint on such a motion results in homography that only requires a reduced representation and is more efficient to compute than a full homography requiring a regular/full representation. Such a reduced and computationally efficient representation for the homography is driven by the presence of a structural uncertainty and presents a system design challenge. Fortunately, the motion constraint allows a way to handle the structural uncertainty. In particular, the present invention employs a reduced representation that is consonant to the motion to handle this challenge. In particular, a reduced representation of the homography takes advantage of redundancies due to motion constraints. The redundancies are consonant to the motion and are tacitly discarded or rejected by the reduced representation. As a consequence, any structural uncertainty that is also consonant to the motion is similarly discarded or rejected.

A person skilled in the art should note that both structural uncertainty and structural redundancy are equivalent formulations of the same optical conditions and the associated embodiments. The teachings presented herein apply to both, with the semantic distinction that the former is due to apparatus defects and restrictions imposed on the system design while the latter are elective constraints on camera motion imposed by the needs of individual application. Thus, the latter can be turned into a benefit and/or advantage under certain circumstances and in particular in the embodiments discussed below. For a full treatment of reduced homography and pose recovery in the presence of structural uncertainty and structural redundancy, and the associated topics, the reader is referred to U.S. Pat. Nos. 8,970,709, 9,189,856, 9,852,512.

In building on all of the above teachings, the invention further extends to systems that not only permit the viewing of an environment by the user but also provide for interactions with the environment and virtual objects or items in such environment. Specifically, it is important to provide the user with a control device that allows him or her to engage with any virtual items or to create virtual items in the environment or scene. The viewing mechanisms and types of environments in which the interaction is supported include any of the above described viewing mechanisms and environments and the specific embodiments described below.

FIG. 30 illustrates a user 700 in an environment 702 holding a control device 704 and wearing a viewing mechanism 706. Control device 704 and viewing mechanism 706 are in communication with a computer 708. Control device 704, viewing mechanism 706 and computer 708 are parts of a system 710 that supports the viewing and interactions with environment 702 in accordance with the invention.

In this embodiment, environment 702 is the real environment of the room in which user 700 is sitting and viewing mechanism 706 is embodied by augmented reality eyewear or AR glasses. An augmented environment or augmented reality 702' that the user is seeing through AR glasses 706 is the real environment 702 augmented by a virtual item or object 712'. Virtual item 712' is also displayed on the screen of control device 704 that is embodied here by a smartphone or tablet equipped with a display screen.

In this particular embodiment the view of environment 702 shown on the screen of smartphone 704 is from the viewpoint of user 700 which is the viewpoint set by AR glasses 706. In other words, the screen of control device or smartphone 704 actually shows augmented reality 702'. Of course, augmented reality 702' with virtual item 712' need not be displayed to user 700 twice, i.e., via AR glasses 706 and on the screen of smartphone 704. However, such duplicative display of augmented reality 702' with virtual item 712' is helpful to any other person in environment 702 that wants to know what augmented reality 702' user 700 is experiencing since that other person can see it on the display screen of smartphone 704.

System 710 allows user 700 to interact with augmented reality 702' by creating, erasing, modifying, operating on and/or in any other way interacting with virtual item 712'. The interaction is supported by manipulation of the control device here embodied by smartphone 704. Smartphone 704 has an inside-out device camera 714 installed on-board. Inside-out device camera 714 has a control device viewpoint 716 defined by its own optics as explained above. In other words, inside-out device camera 714 thus has its own viewpoint 716 or vantage point on environment 702. In this case, inside-out device camera 714 is a back camera of smartphone 704 facing away from user 700 and looking at the portion of environment 702 in front of user 700.

System 710 has at least one processor or circuit in communication with viewing mechanism or AR glasses 706 and with control device or smartphone 704. In the present embodiment, the processor is not explicitly shown as many embodiments thereof have already been described above. In the present embodiment the processor is instantiated by the processors or computing resources of computer 708 as well as the processor(s) on-board AR glasses 706 and processor(s) on-board smartphone 704. Indeed, the processor(s) may even reside in an off-board or remote portion of system 710 such as in the cloud or on any suitable local network. Furthermore, the processor can be distributed between smartphone 704, AR glasses 706 and computer 708 (if present) in any suitable way to ensure efficient processing. Specifically, the most appropriate choice in distributing the processor should ensure speedy and low-latency communication between the processor and AR glasses 706 as well as smartphone 704 for rapid performance of pose recovery steps described below and for generally smooth system operation.

The processor determines a pose of AR glasses 706 by using data from one or more photodetectors or on-board cameras 718 (only one shown) installed on AR glasses 706 and as described above. In the present case on-board cameras 718 view and use in the process of discovery of their pose (position and orientation) any of a number of specific high contrast features or points designated as $P_1$ through $P_{26}$ in FIG. 30. It should be noted that the high optical contrast features do not need to be points, but could also be planes, edges, corners or 3D structures. Furthermore, the high optical contrast features can produce their own light and thus represent beacons. The beacons can further be modulated in any suitable spatio-temporal pattern including sequenced timing or scanning or be disposed in any other suitable patterns. Also, data from additional and/or auxiliary sensors can be used by the processor in determining the pose of AR glasses 706. A number of suitable auxiliary sensors have been described above. Such auxiliary sensors may be embodied by inertial sensors, acoustic sensors, magnetic sensors, optical flow sensors or still other suitable sensors that can provide motion data.

In accordance with the invention, the processor also determines the pose of smartphone 704 whose inside-out device camera 714 also sees any of a number of specific high contrast features or points designated as $P_1$ through $P_{26}$ in FIG. 30. Thus, the same or even still other not expressly shown high optical contrast features including beacons that are permanently on or spatio-temporally modulated can be used in the process of discovery of the pose (position and orientation) of smartphone 704. Also, data from additional and/or auxiliary sensors can be used by the processor in determining the pose of AR glasses 706. A number of suitable auxiliary sensors have been described above. Such auxiliary sensors may be embodied by inertial sensors, acoustic sensors, magnetic sensors, optical flow sensors or still other suitable sensors that can provide motion data.

In accordance with the invention, the processor determines the pose of smartphone 704 in two different and distinct representations. The first representation used is a full representation or a full homography based on performing a complete pose estimation technique. This complete pose estimation technique can use just optical data from inside-out device camera 714 or it can use all available data including auxiliary data from any auxiliary sensors that are available. In determining the full representation, the processor can apply a sensor fusion algorithm when supplied with multiple data streams from different sensors.

The second representation used is a reduced representation. The reduced representation is obtained using data from inside-out device camera 714 under a constraint on the motion of smartphone 704. In the present example the constraint on the motion is represented by a plane 720 indicated in FIG. 30 in dashed lines. In fact, plane 720 has a certain thickness and is thus a thick slice within environment 702. The user is expected to execute movements within slice or plane 720 when moving smartphone 704 while interacting with virtual item 712'. It is precisely this constraint that permits the reduced representation. The constraint can be obtained or confirmed from optical data from inside-out device camera 714 and/or from one or more auxiliary sensors.

The processor takes advantage of the full and the reduced representations of the pose of smartphone 704 to compute an interactive pose portion 722 of the control device. Interactive pose portion 722 is contained within slice of plane 720. This portion contains less than a full motion executed by user 700 in manipulating smartphone 704. Specifically, user 700 will typically also perform a movement 724 outside slice or plane 720. Movement 724 is not included in interactive pose portion 722 and is hence not used by system 710 for allowing user 700 to interact with virtual item 712'. Indeed, in the present example movement 724 is executed by user 700 to answer a phone call and is thus unrelated to virtual item 712'.

It should be understood that interactive pose portion 722 includes successive values of pose, thus yielding a time series of poses assumed by smartphone 704. Since a time series of poses define the motion of smartphone 704 the full motion sequence can be used by system 700 as interactive pose portion 722. Also, any particular static pose assumed by smartphone 704 along its motion trajectory can represent interactive pose portion 722 for interacting with virtual item 712'.

System 700 is further equipped with a projection mechanism 726, in the present case located on-board AR glasses 706, for altering an appearance of virtual item 712' from the user's viewpoint or the user's vantage point based on interactive pose portion 722 found by the processor. In other words, user 700 will perceive that he or she interacts with virtual item by manipulating smartphone 704. Of course, since the user is seeing virtual item 712' from the point of view of AR glasses 706, the altering of the appearance of virtual item 712' is from the viewpoint of AR glasses 706.

In the present case interactive pose portion 722 is used by system 710 to move virtual item 712' in the same manner, including translating and rotating virtual item 712'. User 700 thus has the perception of being able to manipulate virtual item 712' in the same manner as he or she is manipulating or moving smartphone 704.

Meanwhile, system 710 separates additional movement or additional pose portion 724 from interactive pose portion 722. This can be easily done, e.g., by differentiating between the full and reduced representations. Additional pose portion 724 is outside of plane or slice 720 and in the case where it corresponds to user 700 answering a call on smartphone 704 it can be disregarded by system 710. However, even when such additional pose portion is not deployed for altering the appearance of virtual item 712', it can nevertheless be useful in some applications. For example, additional pose portion 724 can be interpreted as an out-of-application command such as stop the application, launch another application, save the application file or purchase the real version of virtual item 712' in a corresponding shopping application. Thus, additional pose portion 724 can be used as additional input that is not directly related to virtual item 712' and relates instead to actions such as system commands, external input or file commands.

More generally, a system with a viewing mechanism according to the invention permits a user to view many types of environments, scenes or realities including virtual realities (VR), augmented realities (AR) or a mixed realities (MR). The viewing mechanism is typically a virtual reality eyewear or head-mounted display when the environment is a virtual reality. The viewing mechanism is an augmented reality eyewear or head-mounted unit when the environment includes common reality or scene and additional virtual items, objects or other viewable elements that can be superposed on the common reality to be viewed by the user. A mixed reality eyewear or unit is the viewing mechanism when the user is interactive with still other types of environments that mix common reality with virtual and/or augmented reality. In any of these cases, the viewing mechanism will define a user viewpoint or vantage point from which the user will view the environment.

Since the interaction with the environment and in some cases a specific part of the environment such as a virtual item occurs when the user moves or manipulates the control device it is important to choose handy or easy to manipulate control devices. Thus, it is particularly advantageous to choose as control device a smartphone, a tablet, a joystick, a stylus, a game controller, a gesture sensor, a digital pen, a hand-held implement, a tool or still another manipulatable control object. In fact, manipulatable objects or control devices can also be objects that can be worn by the user or otherwise attached to him or her.

FIG. 31 illustrates a few useful options for control devices. It is to be understood that manipulation of control devices does not need to be performed literally by hand. A head movement, a finger movement or even a movement of the arm can represent manipulation for producing interaction in the sense of the present invention. Thus, a control device 750 is a head-worn piece of clothing with two inside-out device cameras 752A, 752B accompanied by corresponding circuitry which may include a part of the processor or even the entire processor used by the system. A control device 754 is a finger-worn element or ring with an inside-out device camera 756 and corresponding circuitry. Another control device 758 is a pair of glasses again with an inside-out device camera 760 and circuitry. Still another control device is an article of clothing 762, in this case a shirt, with a shoulder-mounted inside-out device camera 764 and corresponding circuitry. Yet another control device are gloves 766A, 766B. Glove 766A has inside-out device cameras 768A-E on each finger (inside-out device camera 768A on the thumb not visible from the vantage point afforded by FIG. 31). Meanwhile, glove 766B only has one inside-out device camera 770. In the case of glove 766A individual finger movements can be resolved into interactive pose portions. In the case of glove 766B less granular movements of the hand can be resolved into interactive pose portions.

Although a reduced representation can include any reduced representation of the pose that reduces one or more degrees of freedom of rigid body motion it is convenient herein to use a reduced homography as such reduced representation. In particular, it is useful to deploy a reduced homography that is consonant with a constrained motion of the control device. The motion would be constrained because of the expected ways in which the user may manipulate the control device. In some cases, physical limitations on user motion can determine the motion constraint. What is important is that the interactive pose portion includes the constrained motion. In other words, it is information about the constrained motion rather than the full motion that is used by the system's projection mechanism to alter the appearance of the virtual item.

In some embodiments the interactive pose portion used by the projection mechanism for altering the appearance or an aspect of the appearance of the virtual item is obtained from the user's motions that manipulate the control device in a plane. Simply put, the system does not use the full motion that is executed by the control device as it is manipulated by the user to determine how to adjust or change the virtual item's appearance. Rather, the system of invention uses a reduced aspect of the full motion to adjust or change the virtual item's appearance. In the case of motion confined to the plane, only motion confined to that plane is used for altering the appearance of the virtual object. A simple example of this constraint is clear when the control device is a stylus or a digital pen and the virtual item is digital ink produced by the motions of the tip or nib of such a control device within a plane. Clearly, the digital pen or stylus can be moved many different ways in three-dimensional space, but only its motion in a certain plane (e.g., an agreed upon virtual writing plane) is relevant to the generation of digital ink.

FIG. 32 illustrates an embodiment in which a constrained motion of a control device 800 embodied by a stylus or a digital pen is confined to a certain plane 802 or scribing surface within an environment 804. Stylus 800 is equipped with an inside-out device camera 806 at the opposite end from a writing or scribing nib 808. In one embodiment scribing surface 802 is a passive writing surface such as a piece of paper, a writing pad or the surface of an object to be inscribed. In another embodiment, scribing surface 802 is a screen capable of displaying graphical elements. Such graphical elements can be drawn, erased, modified and/or otherwise edited by a display controller (not shown).

Inside-out device camera 806 is used to see any of a number of specific high contrast features or points in environment 804 in order to determine the pose of stylus 800. Such high contrast features or points can be features present in or on scribing surface 802 or in environment 804. These features are not shown since many exemplary features that can be used have been discussed above in detail. In some embodiments, where scribing surface 802 is a screen, the high contrast features can be graphical elements drawn or displayed on scribing surface 802 by the display controller. Again, many examples of such features, ranging from individual illuminated pixels acting as beacons to entire shapes and illuminated regions have been discussed in the patents referenced above in the teachings.

In some embodiments, the pose of stylus 800 is recovered in order to reconstruct an ink trace 810, sometimes called "digital ink", produced by nib 808 as stylus is moved by a user over scribing surface 802. Thus, digital ink is the virtual item in such cases. In FIG. 32 three poses assumed by stylus 800 at different points in time during its surface-constrained motion are shown for clarity. In some other embodiments, pose of stylus 800 is recovered in order to recover a path 812 or gesture traced by a point 814 at the opposite end from nib 808. In yet other embodiments, a recovered path is the path traced out by the intersection point of the Z-axis of stylus 800 with a projection surface parallel to and above scribing surface 802.

FIG. 33 serves to illustrate the relationship between reduced representation and consonant motion for the stylus 800 of FIG. 32. During writing, the motion of stylus nib 808 remains in contact with scribing surface 802. This in turns imposes a motion constraint on inside-out device camera 806. Specifically, that the distance along the body Z-axis of stylus 800 between the camera and surface 802 is constant. In other words, the motion of inside-out device camera 806 is constrained by the physical act of writing. A reduced representation consonant with this physical constraint is thus advantageous.

Moreover, path 812 traced by the intersection point of the axis of stylus 800 with a projection surface parallel and above scribing surface 802 implies a motion redundancy on camera 806. When the projection surface is far above scribing surface 802, then one can assume that the distance along the Z axis between camera 806 and the projection surface remains constant. A reduced representation consonant with such motion redundancy is thus advantageous.

In some embodiments, where scribing surface 802 is a screen that displays features for camera 806 to see in order to recover pose, these features can be displayed such that their apparent locations as seen from camera 806 conform to a virtual feature plane parallel to and below scribing surface 802. One can then assume that the distance along the Z axis between camera 806 and the virtual feature plane remains constant. Again, a reduced representation consonant to such virtual constraint is thus advantageous.

A person skilled in the art should note that the relationship between reduced representation and consonant motion constitute a general framework as said consonant motion can arise in a number of ways. In some embodiments, the consonant motion constitutes physically constrained motion (e.g., motion of nib 808 as shown in FIG. 32 must remain in contact with scribing surface 802 while writing). In other embodiments, the consonant motion is inherent to the needs prescribed by the application (e.g., recovering path 812 or some other gesture as explained above). And in yet other applications, the consonant motion constitutes apparent motion arising from the appearance of virtual features as seen by camera 806. The teachings presented herein apply to all these cases.

It will be evident to a person skilled in the art that the present invention admits of various other embodiments. Therefore, its scope should be judged by the claims and their legal equivalents.

The invention claimed is:

1. A system for viewing and interacting with an environment, said system comprising:
   a) a viewing mechanism for a user for viewing said environment and a virtual item in said environment from a user viewpoint;
   b) a control device having an inside-out device camera with a control device viewpoint on said environment, said control device being manipulatable by said user for interacting with said environment and with said virtual item;
   c) at least one processor in communication with said viewing mechanism and with said control device for:
      1) determining a pose of said viewing mechanism;
      2) determining a pose of said control device in a full representation and in a reduced representation using data from said inside-out device camera;
      3) computing an interaction pose portion of said control device from said full representation and said reduced representation; and
   d) a projection mechanism for altering an appearance of said virtual item from said user viewpoint based on said interaction pose portion and based on said pose of said viewing mechanism.

2. The system of claim 1, wherein said reduced representation is a reduced homography consonant with a constrained motion of said control device and said interaction pose portion comprises said constrained motion.

3. The system of claim 2, wherein said constrained motion is in a predetermined plane, whereby said interaction pose portion used by said projection mechanism for altering an appearance of said virtual item comprises motion of said control device in said predetermined plane.

4. The system of claim 2, wherein said constrained motion is in a predetermined plane and said at least one processor computes an additional pose portion of said control device out of said predetermined plane, and wherein said additional pose portion is used as additional input by said user.

5. The system of claim 4, wherein said additional input is not related to said virtual item.

6. The system of claim 1, wherein said control device comprises an item selected from the group consisting of a smartphone, a tablet, a joystick, a stylus, a game controller, a gesture sensor and a digital pen.

7. The system of claim 1, wherein said viewing mechanism comprises an item selected from the group consisting of a virtual reality eyewear, an augmented reality eyewear and a mixed reality eyewear.

8. The system of claim 1, wherein said viewing mechanism comprises an auxiliary sensor for providing auxiliary pose data about said viewing mechanism to said at least one processor.

9. The system of claim 1, wherein said control device comprises an auxiliary sensor for providing auxiliary pose data about said control device to said at least one processor.

* * * * *